US008073898B2

(12) United States Patent
Kikkoji et al.

(10) Patent No.: US 8,073,898 B2
(45) Date of Patent: Dec. 6, 2011

(54) DISPLAY DEVICE, DISPLAY METHOD, AND DISPLAY CONTROL PROGRAM

(75) Inventors: Hiroyuki Kikkoji, Tokyo (JP); Nozomu Okuzawa, Tokyo (JP); Jun Moriya, Tokyo (JP); Shinsuke Yamashita, Kanagawa (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 10/557,207

(22) PCT Filed: May 18, 2004

(86) PCT No.: PCT/JP2004/007020

§ 371 (c)(1), (2), (4) Date: Nov. 17, 2005

(87) PCT Pub. No.: WO2005/006610

PCT Pub. Date: Jan. 20, 2005

(65) Prior Publication Data

US 2007/0074262 A1 Mar. 29, 2007

(30) Foreign Application Priority Data

| | | |
|---|---|---|
| Jul. 14, 2003 | (JP) | 2003-274302 |
| Aug. 11, 2003 | (JP) | 2003-291741 |
| Sep. 4, 2003 | (JP) | 2003-313167 |
| Sep. 29, 2003 | (JP) | 2003-337220 |

(51) Int. Cl.
*G06F 15/16* (2006.01)
*G06F 13/00* (2006.01)
*G06F 3/00* (2006.01)

(52) U.S. Cl. ............. 709/203; 709/208; 725/39; 725/40

(58) Field of Classification Search .................. 709/203, 709/208

See application file for complete search history.

(56) References Cited

U.S. PATENT DOCUMENTS 5,410,698 A 4/1995 Danneels et al.

(Continued)

FOREIGN PATENT DOCUMENTS

JP 5-219053 8/1993

(Continued)

OTHER PUBLICATIONS

U.S. Appl. No. 10/526,902, filed Aug. 16, 2005, Yamashita et al.

(Continued)

*Primary Examiner* — Kevin Bates
*Assistant Examiner* — Joe Chacko
(74) *Attorney, Agent, or Firm* — Oblon, Spivak, McClelland, Maier & Neustadt, L.L.P.

(57) ABSTRACT

The present invention provides a display device for retrieving and displaying the list information regarding the broadcast contents in which the list information corresponding to the program broadcast before or after can be displayed without making the complicate key operations. An information server 2 transmits a list of musical compositions broadcast in a designated time zone to a terminal unit 1, based on a retrieval key such as date and time zone from the terminal unit 1. The terminal unit 1 displays the received list of musical compositions on a display part 1*a*. At this time, the directive items for displaying the list of musical compositions broadcast before and after are displayed, together with the received list of musical compositions. The user is allowed to display the list of musical compositions broadcast in a preceding or succeeding time zone only by selecting a directive item by performing an operation in series with a selection operation for a musical composition within the list of musical compositions, without returning to other screen, or re-specifying the retrieval conditions.

17 Claims, 26 Drawing Sheets

U.S. PATENT DOCUMENTS

| | | | | | |
|---|---|---|---|---|---|
| 5,557,724 | A | | 9/1996 | Sampat et al. | |
| 5,822,123 | A | * | 10/1998 | Davis et al. | 725/43 |
| 5,822,537 | A | * | 10/1998 | Katseff et al. | 709/231 |
| 6,240,555 | B1 | * | 5/2001 | Shoff et al. | 725/110 |
| 6,317,784 | B1 | * | 11/2001 | Mackintosh et al. | 709/219 |
| 7,076,202 | B1 | * | 7/2006 | Billmaier | 455/3.04 |
| 7,296,283 | B2 | * | 11/2007 | Hrastar et al. | 725/30 |
| 7,366,461 | B1 | * | 4/2008 | Brown | 455/3.06 |
| 2001/0037360 | A1 | * | 11/2001 | Ekkel | 709/203 |
| 2002/0013950 | A1 | * | 1/2002 | Tomsen | 725/109 |
| 2002/0157100 | A1 | | 10/2002 | Kitsukawa et al. | |
| 2002/0174438 | A1 | * | 11/2002 | Cleary et al. | 725/100 |
| 2003/0172108 | A1 | * | 9/2003 | Paul et al. | 709/203 |
| 2004/0080673 | A1 | * | 4/2004 | Townsend et al. | 348/563 |
| 2004/0117831 | A1 | * | 6/2004 | Ellis et al. | 725/53 |
| 2004/0138910 | A1 | * | 7/2004 | Matsuno et al. | 705/1 |
| 2004/0266336 | A1 | * | 12/2004 | Patsiokas et al. | 455/3.04 |
| 2005/0060701 | A1 | | 3/2005 | Murase | |
| 2005/0091679 | A1 | | 4/2005 | Tanaka et al. | |
| 2008/0046951 | A1 | * | 2/2008 | Hrastar et al. | 725/122 |

FOREIGN PATENT DOCUMENTS

| | | |
|---|---|---|
| JP | 08-214282 | 8/1996 |
| JP | 8-214282 | 8/1996 |
| JP | 9-51314 | 2/1997 |
| JP | 9-051314 | 2/1997 |
| JP | 10-336169 | 12/1998 |
| JP | 2000-222360 | 8/2000 |
| JP | 2001-320645 | 11/2001 |
| JP | 2002-077075 | 3/2002 |
| JP | 2002-142166 | 5/2002 |
| JP | 2002-358283 | 12/2002 |
| JP | 2002-369094 | 12/2002 |
| JP | 2003-503907 | 1/2003 |
| JP | 2003-044477 | 2/2003 |
| JP | 2003-44477 | 2/2003 |
| JP | 2003-46459 | 2/2003 |
| JP | 2003-046459 | 2/2003 |
| JP | 2004-501430 | 1/2004 |
| JP | 2004-525576 | 8/2004 |
| WO | 00/65835 | 11/2000 |
| WO | WO 00/65835 | 11/2000 |
| WO | WO 01/86493 | 11/2001 |
| WO | WO 02/86691 | 10/2002 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murse et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U. S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

DISPLAY DEVICE, DISPLAY METHOD, AND DISPLAY CONTROL PROGRAM

TECHNICAL FIELD

The present invention relates to a communication apparatus for acquiring the information regarding broadcast contents through a communication line, and a display method and a display control program for displaying the information. More particularly, this invention relates to a communication apparatus, a display method and a display control program in which the list information of the broadcast contents can be acquired and displayed by making a request for retrieving the list information.

BACKGROUND ART

In recent years, a broadcasting station for FM broadcast or the like increasingly provides the information regarding the program, along with the normal broadcast, through a Web site to the user. For example, a service for publicizing a list of numbers or artist names of musical compositions broadcast or scheduled to broadcast in the program on the Web site is well known. The user viewing the broadcast can make access to the Web site to know the number or artist name of the musical composition by designating the broadcast date and time or program name, when there is any favorite musical composition in the broadcast musical compositions. For example, a music CD (Compact Disc) containing the musical composition can be purchased at a CD shop.

Recently, it is conceived that a home audio apparatus or portable information processing terminal or the like capable of receiving the radio broadcast has a function of gaining access to the server for providing the above service to acquire and display the musical composition information. In this case, for example, the user makes a predetermined operation on the audio apparatus to enable the audio apparatus to gain access to the server, when there is any favorite musical composition broadcast in the radio program being received by the audio apparatus. Thereby, the audio apparatus acquires the information regarding the musical composition, displays it on the screen, and notifies it to the user. It is also suggested that, when it is desired to know the information of musical composition broadcast in the past, the user designates the date and time zone on the audio apparatus, and the audio apparatus receives the information of musical composition or its list retrieved on the server side in accordance with this designation, and displays it on the screen.

As a technology related with the prior art, there was a following retrieval apparatus in which the retrieval operation was simplified to shorten the time required for retrieval. This retrieval apparatus has retrieving means for retrieving an explanatory sentence for a retrieval word input by inputting means from the storage medium, and displays a list for the retrieval word. And the explanatory sentence corresponding to the retrieval word selected by the user is retrieved from the list, and displayed. When the user performs an input operation on a specific input part while the explanatory sentence is displayed, the display means is switched from the display screen of explanatory sentence to the input screen of retrieval word (e.g., refer to patent document 1).

[Patent Document 1] Published Unexamined Patent Application No. 10-105569 (paragraphs [0021] to [0026], FIG. 1)

By the way, when the user accesses the server to retrieve the musical composition and its list by designating the date and time zone, the information of the musical composition may not be obtained as the retrieval result. For example, when the user remembers the broadcast time zone falsely, this situation occurs, in which it is natural that the retrieval key such as date or time zone is changed, and retransmitted to the server. This operation is easily performed on the PC. However, the audio apparatus, portable information terminal or the like has a smaller number of input keys than the PC or the like and does not allow the character input, resulting in a problem that this operation is not easily made.

DISCLOSURE OF THE INVENTION

This invention has been achieved in the light of the above-mentioned problems, and it is an object of the invention to provide a display device for retrieving and displaying the list information regarding the broadcast contents in which the list information corresponding to a program broadcast before or after can be displayed without making the complicate key operations.

Also, it is another object of the invention to provide a display method for retrieving and displaying the list information regarding the broadcast contents in which the list information corresponding to a program broadcast before or after can be displayed without making the complicate key operations.

Also, it is another object of the invention to provide a display control program for retrieving and displaying the list information regarding the broadcast contents in which the list information corresponding to a program broadcast before or after can be displayed without making the complicate key operations.

In order to accomplish the above object, this invention provides a display device for displaying the information regarding the broadcast contents acquired through a communication line, comprising transmitting means for transmitting a retrieval key specifying a part of the list information from the list information of the broadcast contents, receiving means for receiving at least a part of the list information according to the retrieval key, and display means for displaying the part of the list information received by the receiving means and a directive item for requesting to display the list information corresponding to a program broadcast before/after the part of the list information.

Herein, the transmitting means transmits the retrieval key specifying the part of the list information from the list information of the broadcast contents to an external information server, for example. The receiving means receives at least the part of the list information according to the retrieval key from a transmission destination of the retrieval key. For example, at least the list information of a program conforming to the retrieval key is received, and additionally the list information corresponding to the programs broadcast before/after the program of interest may be received. And the display means displays the list information received by the receiving means, according to the retrieval key. Along with this list information, the directive item for requesting to display the list information corresponding to the program broadcast before/after the list information of interest is displayed. On this display of screen, the user can select the directive item by an operation in series with the operation for selecting the list information displayed on the display means and instruct to display the list information corresponding to the program broadcast before/after the displayed list information.

The display device of the invention displays at least the part of the list information according to the transmitted retrieval key and the directive item for requesting to display the list information corresponding to the program broadcast before/after the part of the list information on the display means, whereby the user can select the directive item by an operation in series with the operation for selecting the displayed list information and instruct to display the list information corresponding to the program broadcast before/after the displayed list information. Accordingly, the display device can display the list information corresponding to the program broadcast before or after in which the user does not need to make the complicate key operations such as returning to the step for specifying the retrieval key again.

BEST MODE FOR CARRYING OUT THE INVENTION

The preferred embodiments of the present invention will be described below with reference to the accompanying drawings.

(1) Operation Principle of a Network System According to the Invention

Figure 1:
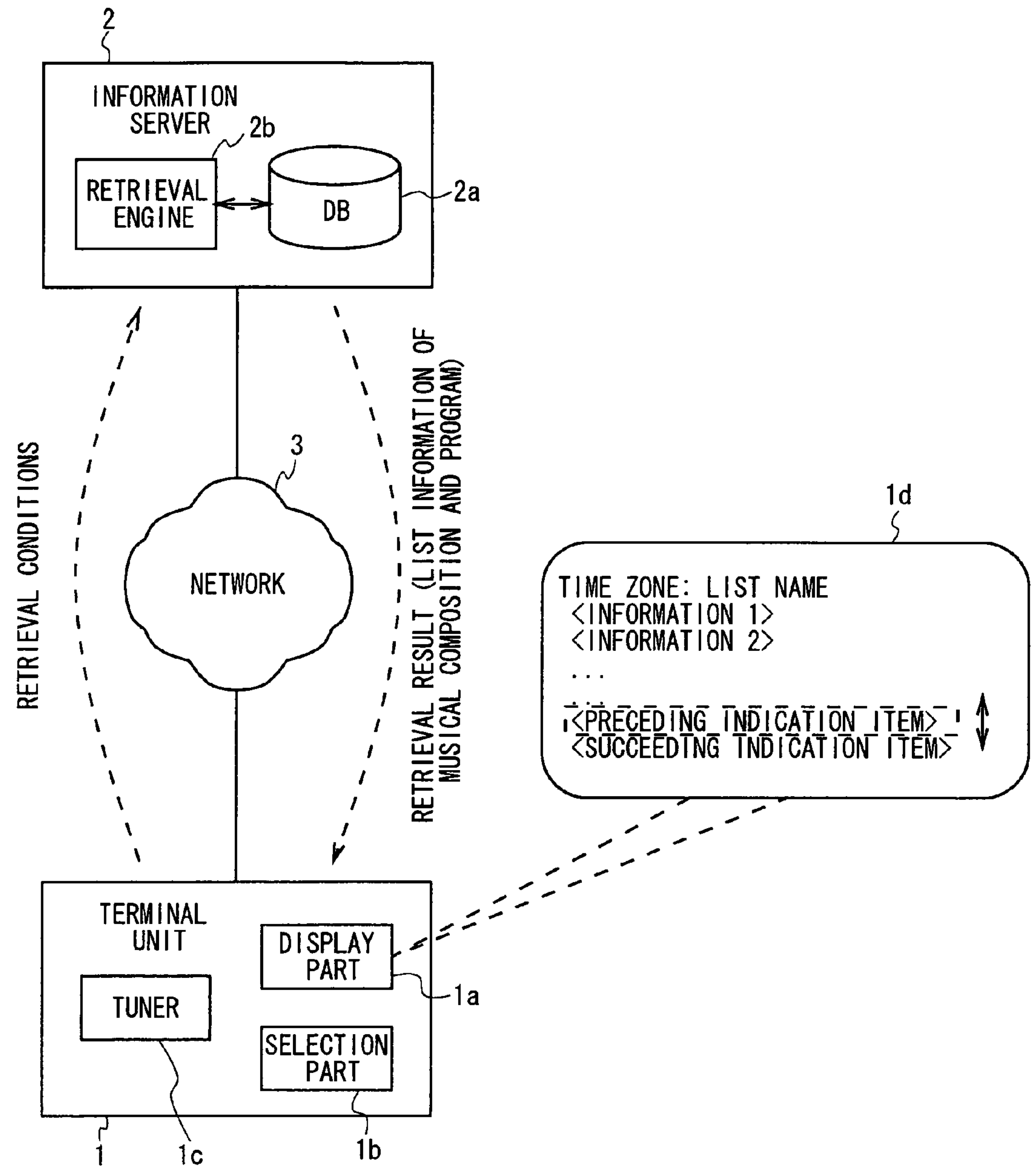
FIG. 1 is an explanatory diagram showing the operation principle of a network system according to this invention.

FIG. 1 is an explanatory diagram showing the operation principle of a network system according to this invention. Referring to FIG. 1, the invention is outlined.

The network system as shown in FIG. 1 has a terminal unit 1 according to the invention and an information server 2, both of which are connected via a network 3.

The terminal unit 1 comprises a display part 1*a* for displaying the information or the like received from the information server 2, and a selection part 1*b* for enabling the user to select a display item on the display part 1*a*. Also, the terminal unit 1 may comprise a tuner 1*c* or the like for receiving the broadcast of FM radio or the like, for example. This terminal unit 1 may be an audio apparatus or a portable information processing apparatus or the like such as a PDA. The terminal unit 1 has a function of receiving the broadcasting through the tuner 1*c* and outputting the audio or image, and a function of requesting the information server 2 to retrieve the information by designating the retrieval conditions such as broadcast date and time input by the user, and receiving and displaying the retrieved information on the display part 1*a*.

The information server 2 comprises a database (DB) 2*a* storing the information regarding the musical composition broadcast from a predetermined broadcasting station and the information regarding the broadcast program, and a retrieval engine 2*b* for retrieving the DB 2*a*. The information server 2 extracts the predetermined information regarding the musical composition or program and its list from the DB 2*a*, employing the retrieval conditions transmitted from the terminal unit 1, and transmits them to the terminal unit 1. Each of the terminal unit 1 and the information server 2 comprises a communication interface (I/F), not shown, for transmitting and receiving data via the network 3.

In this network system, the user can view the broadcasting, employing the terminal unit 1. Also, if there is any favorite musical composition among the broadcast musical compositions, the user can request the information server 2 to retrieve the information according to the retrieval conditions by designating the broadcast date and time zone, and view the retrieval result from the information server 2 on the display part 1*a*. At this time, if the unintended retrieval result is obtained (e.g., the information of intended musical composition is not obtained because the user remembers the broadcast date or time zone falsely), the user needs to change the retrieval conditions.

Herein, a list of information obtained by retrieval is displayed on a screen 1*d* of the terminal unit 1 to display the retrieval result from the information server 2. Examples of this list include the list of programs broadcast on the designated date, the list of musical compositions broadcast in each program and the list of musical compositions broadcast in the designated time zone.

In addition, the terminal unit 1 displays concurrently, on the screen 1*d*, the directive items for displaying the preceding list and the succeeding list in the designated temporal range as the retrieval conditions. When the list of musical compositions broadcast in the program in the designated time zone is displayed, for example, the terminal unit 1 displays the directive items for displaying the list of musical compositions broadcast in the program in the previous and next time zones of the designated time zone, or the directive items for displaying the list of musical compositions broadcast at the previous and next time for the program in the designated time zone, together with the list of musical compositions in the designated time zone. Also, when the list of programs broadcast on the designated date is displayed, the terminal unit 1 displays the directive items for displaying the list of broadcast programs on the previous and next dates of the present date.

The user selects and decides desired information from the displayed list of musical compositions or programs by operating two upper and lower directional keys on the selection part 1*b*, for example, whereby the more detailed information can be displayed on the terminal unit 1. The terminal unit 1 acquires this information from the information server 2, for example. Also, when there is no desired musical composition or program in the displayed list of musical compositions or programs, the user may select and decide the directive item for displaying the preceding list or succeeding list by performing a series of operations, employing the above keys, thereby further displaying the preceding list or succeeding list according to the selected directive item.

When the directive item for displaying the preceding list or succeeding list is selected and decided, the terminal unit 1 re-specifies the retrieval conditions such as the date and time zone to those before or after the present time, requests the information server 2 to re-retrieve the information, and reads and displays the new retrieval result from the information server 2.

Or when receiving the retrieval result, the terminal unit 1 also receives the retrieval results according to the temporally preceding and succeeding conditions before and after the present retrieval conditions every time, displays only the information conforming to the retrieval conditions at the present time on the display part 1*a*, and temporarily stores the retrieval result according to the preceding and succeeding conditions. And if the directive item for displaying the preceding list or succeeding list is selected and decided, the terminal unit 1 may read the information according to the directive item from the temporarily stored information and display it on the display part 1*a*.

In this way, the terminal unit 1 displays the directive items for displaying the preceding list and succeeding list together with the list of retrieval result, and allows the user to select the item by performing one series of operations for selecting the list, whereby the user obtains the retrieval result as desired. And through the network system, the user easily obtains the retrieval result, as desired, by configuring an apparatus such as audio apparatus and portable information processing apparatus in which the character can not be inputted and there are only a small number of input keys, like the terminal unit 1.

(2) First Embodiment

A first embodiment of the invention will be described in more detail by way of example of the network system. In the following example, a process for saving (storing) the information regarding the musical composition or musical composition set in a secondary storage device is called a clip. Also, the information saved by the clip is called the clip information.

Figure 2:
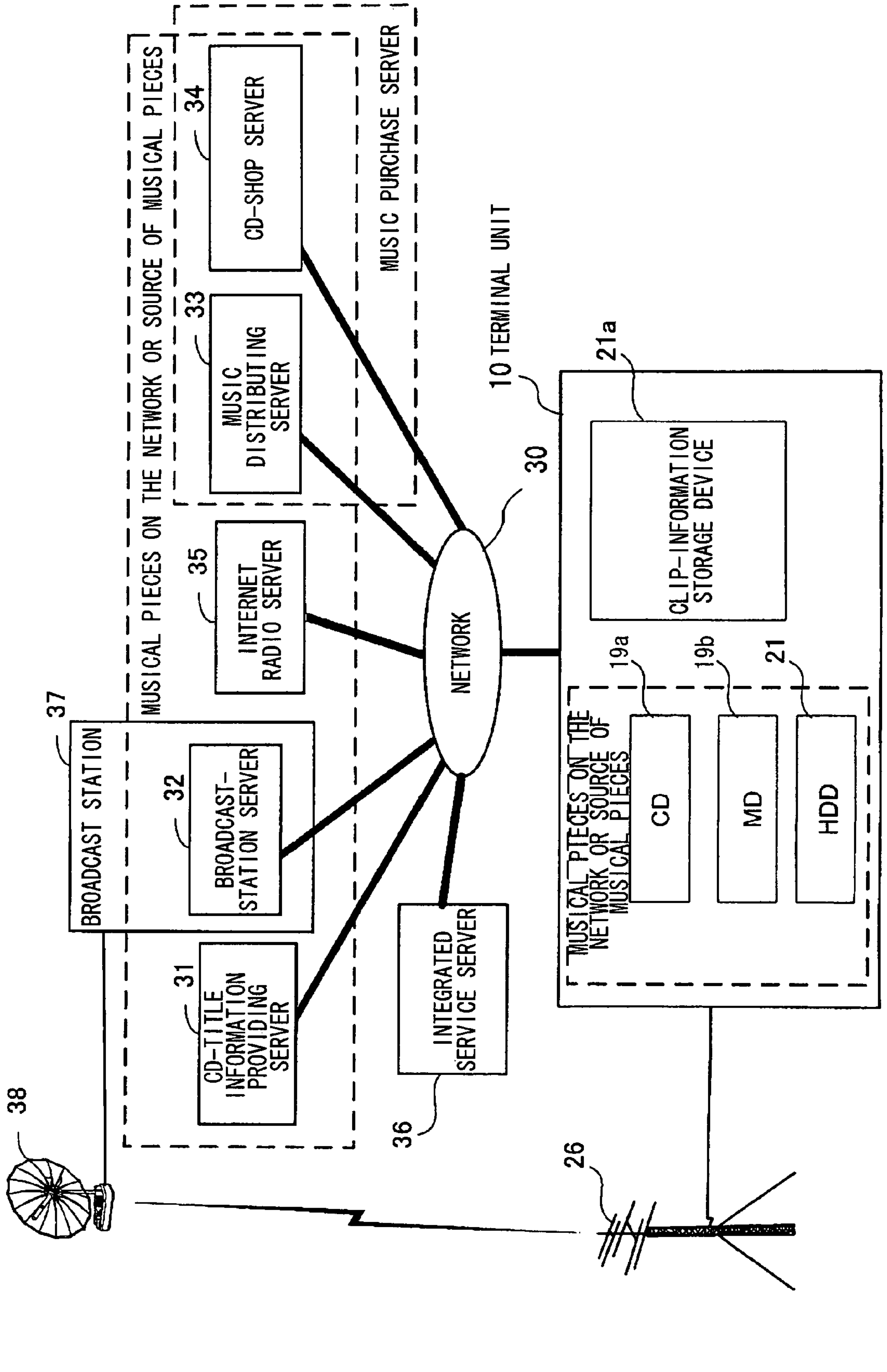
FIG. 2 is a diagram showing a configuration example of the network system according to a first embodiment of the invention.

FIG. 2 is a diagram showing a configuration example of the network system according to the embodiment of the invention.

The terminal unit 10 is connected to various servers via the network 30. The network 30 is the Internet, for example. The servers include a CD title information providing server 31, a broadcasting station server 32, a music distribution server 33, a CD shop server 34, an internet radio server 35, and a total service server 36.

The CD title information providing server 31 makes a service for distributing the title of musical composition or the album title of musical compositions recorded on the music CD available on the market.

The broadcasting station server 32 is managed by a broadcasting station 37 for FM broadcasting or television (TV) broadcast or the like and makes a service (now-on-air) of providing the information related with the broadcast musical composition or program. The relevant information provided from the broadcasting station server 32 is the information broadcast in each program, or the information about the musical composition scheduled to broadcast. More specifically, the broadcasting station server 32 provides the information by retrieving the list of musical compositions broadcast or scheduled to broadcast within a desired program, the musical composition name or artist name of each musical composition, and the name or identification (ID) of CD album on which the musical composition is recorded, for example. In the following explanation, the list of musical compositions broadcast or scheduled to broadcast is called an on-air list.

The music distribution server 33 makes a service of distributing the digital audio data (musical composition data) of the musical composition. For example, the music distribution server 33 provides the musical composition data to the terminal unit 10 of the user who has performed a purchasing procedure for the musical composition. Also, the music distribution server 33 can provide the relevant information of the musical composition to be distributed, or the audio data for audition.

The CD shop server 34 accepts an order for the mail-order sale of the music CD. The CD shop server 34 also makes a distribution service of the audio data for audition, and a service of providing the relevant information of the musical composition recorded on the CD to be sold.

The internet radio server 35 provides an audio program via the wide area network such as the Internet.

The total service server 36 functions as a window (portal site) for providing the services via the network 30, and mediates various kinds of total services through the use of each server or the like. For example, the total service server 36 distributes the information indicating a distribution source of the relevant information of the broadcast musical composition (e.g., URL: Uniform Resource Locator) to the terminal unit 10. Also, the total service server 36 distributes a call sign of the broadcasting station corresponding to the frequency over the receiving district to the terminal unit 10. Moreover, the total service server 36 makes a registration procedure for the user to employ various kinds of total services as above mentioned and an authentication procedure for the user at the time of use.

In this way, a plurality of servers make the services of providing the information regarding the musical composition or musical composition set on the network 30. That is, each server functions as a source of the musical composition or musical composition set on the network 30.

The music distribution server 33 and the CD shop server 34 are musical composition purchasable servers. Accordingly, if the user makes access to the musical composition purchasable server by operating the terminal unit 10, the user can actually purchase the musical composition or musical composition set via the network 30. The user of the terminal unit 10 can download the musical composition data from the music distribution server 33 by performing a purchasing procedure for the music distribution server 33. Also, the user of the terminal unit 10 can get the music CD by home delivery by performing a purchasing procedure for the CD shop server 34.

The terminal unit 10 holds a local source of musical composition or musical composition set on the recording medium such as a CD 29*a*, an MD (Mini Disc) 29*b*, or a hard disk drive (HDD: Hard Disk Drive) 21. The CD 29*a* and the MD 29*b* are portable recording media, and easily mounted or dismounted on or from the terminal unit 10. Which local source is prepared for the terminal unit 10 depends on the kind of the terminal unit 10 and the purposes. Also, the terminal unit 10 can receive the broadcast contents at an antenna 26.

The local source of musical composition or musical composition set is illustrated in FIG. 2. That is, the terminal unit 10 allows the recording medium to function as the local source of musical composition or musical composition set by recording the musical composition or musical composition set on the recording medium, if the recording medium resides locally in the terminal unit 10.

The terminal unit 10 comprises a clip information storage device 21*a* for storing the clipped relevant information (clip information). The clip information storage device 21*a* is a secondary storage device for the terminal unit 10. For example, the terminal unit 10 enables a part of the storage area of the HDD 21 to function as the clip information storage device 21*a*. The terminal unit 10 can clip the musical composition and the musical composition set. Thereby, the relevant information of the favorite musical composition set is recorded by one clip operation of clipping the whole FM program, CD album or the like containing plural favorite musical compositions.

Figure 3:
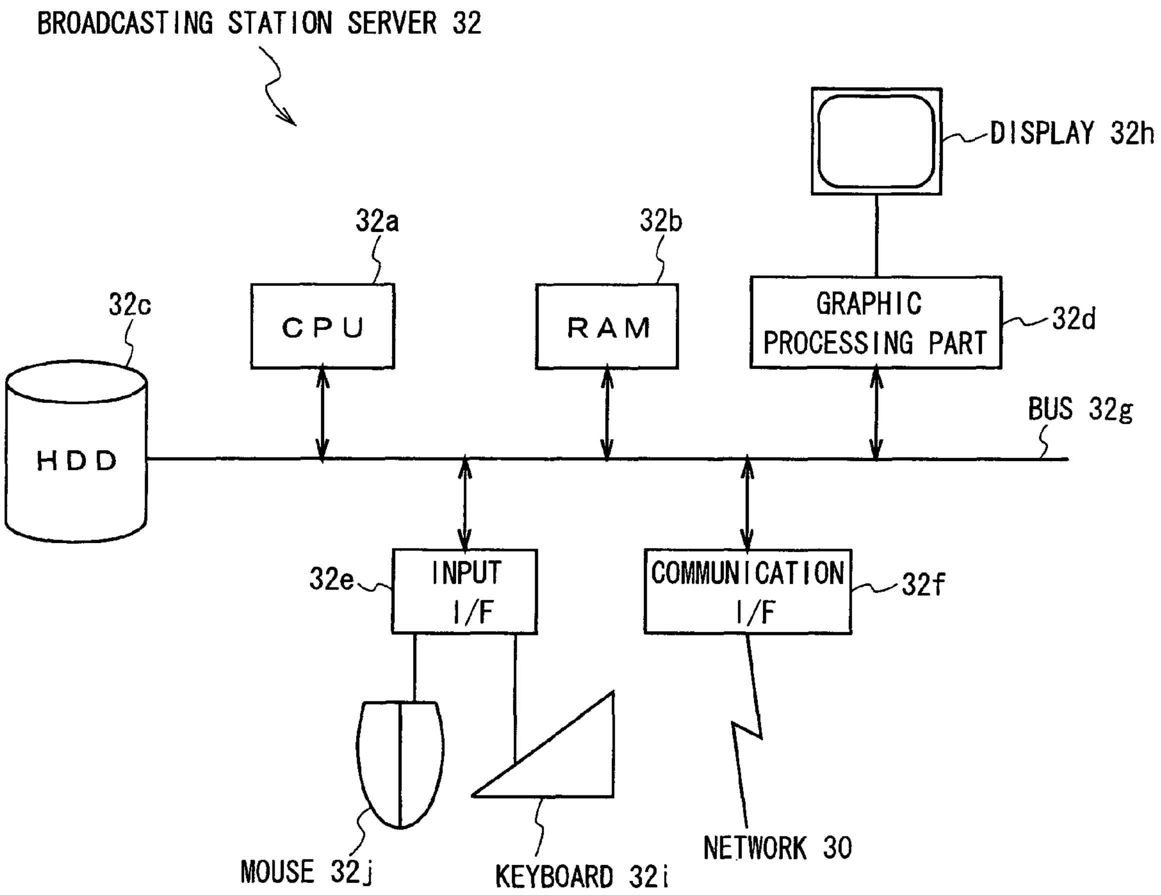
FIG. 3 is a diagram showing a hardware configuration example of a broadcasting station server.

FIG. 3 is a block diagram showing a hardware configuration example of the broadcasting station server 32.

The broadcasting station server 32 is controlled as a whole by a CPU (Central Processing Unit) 32*a*. The CPU 32*a* is connected via a bus 32*g* to a RAM (Random Access Memory) 32*b*, a hard disk drive (HDD) 32*c*, a graphic processing part 32*d*, an input interface (I/F) 32*e*, and a communication interface (I/F) 32*f*.

The RAM 32*b* temporarily stores an OS (Operating System) program and at least part of the application programs to be executed by the CPU 32*a*. Also, the RAM 32*b* stores various kinds of data required for the processing by the CPU 32*a*. The HDD 32*c* stores the OS and the application programs. Also, the HDD 32*c* stores the audio data provided for the terminal unit 10.

The graphic processing part 32*d* is connected to a display 32*h*. The graphic processing part 32*d* displays the image on the screen of the display 32*h* in accordance with an instruction from the CPU 32*a*. The input interface 32*e* is connected to a keyboard 32*i* and a mouse 32*j*. The input interface 32*e* sends a signal passed from the keyboard 32*i* or the mouse 32*j* via the mouse 32*g* to the CPU 32*a*.

The communication interface 32*f* is connected to the network 30. The communication interface 32*f* enables data to be transmitted or received to or from another computer via the network 30.

With the above hardware configuration, the processing functions of this embodiment can be implemented. Though the hardware configuration of the broadcasting station server 32 is typically described in FIG. 3, other servers may be constructed with the same hardware configuration.

By the way, the terminal unit 10 according to this embodiment also has a reproduction function of reproducing the musical composition as the audio apparatus.

Figure 4:
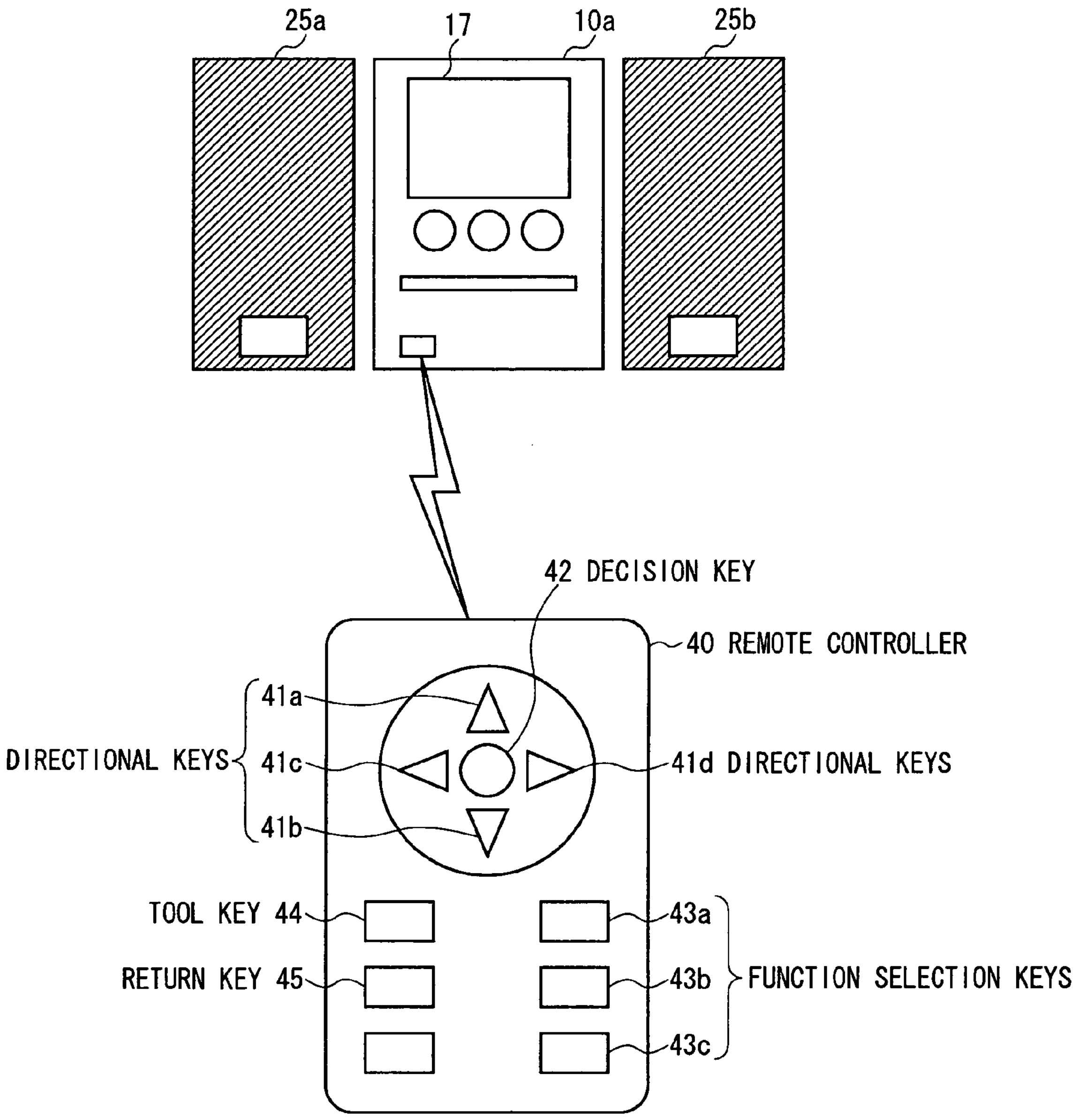
FIG. 4 is a diagram showing the appearance of a terminal unit according to the embodiment of the invention.

FIG. 4 is a view showing the appearance of the terminal unit 10.

As shown in FIG. 4, the terminal unit 10 according to this embodiment has a similar appearance to the typical system composition. The terminal unit 10 is composed of an apparatus main body 10*a*, speakers 25*a*, 25*b*, and a remote controller 40. The apparatus main body 10*a* has a CD reproduction function, an MD recording/reproducing function, and a receiving function for FM broadcasting and TV broadcasting. An audio signal generated in the apparatus main body 10*a* is sent to the speakers 25*a*, 25*b*, so that the sound is output from the speakers 25*a*, 25*b*.

Also, the apparatus main body 10*a* is provided with a display 17. On the display 17, the musical composition information of the musical composition being reproduced and the clip information of the musical composition saved by clip are displayed.

The remote controller 40 is an input device for remotely operating the apparatus main body 10. The remote controller 40 is provided with a plurality of operation keys. The remote controller 40 sends a signal corresponding to a pressed operation key to the apparatus main body 10*a*, using communication means such as infrared ray, if the operation key is pressed by the user.

The operation keys include the directional keys 41*a* to 41*d*, a decision key 42, the function selection keys 43*a* to 43*c*, a tool key 44 and a return key 45.

The directional keys 41*a* to 41*d* are employed to move a cursor displayed on the display 17 or a focused location, for example. Four directional keys 41*a* to 41*d* correspond to upper, lower, left and right directions, respectively. Thereby, the cursor is moved in a direction corresponding to the pressed directional key.

The decision key 42 is employed to decide the substance displayed on the display 17.

The function selection keys 43*a* to 43*c* are employed to select the function. For example, three function selection keys 43*a* to 43*c* are associated with a total service use function, a tuner function and a local contents management function, respectively. And if the function selection key is pressed, the apparatus main body 10*a* is placed in an operation mode of the function corresponding to the pressed function selection key.

The tool key 44 is a button for displaying a tool menu on the display 17. Within the tool menu, the commands corresponding to the substance displayed on the display 17 are displayed. The terminal unit 10 performs a process corresponding to a selected command, if the user selects the command by operating the directional keys 41*a* to 41*d*, and presses the decision key.

The return key 45 is a button for returning the display substance of the display 17 to the previous state.

The remote controller 40 may be provided with various operation keys other than those shown in FIG. 4. For example, such operation keys include a volume adjustment key, a CD or MD reproduction key and a stop key.

An internal configuration of the terminal unit 10 will be described below.

Figure 5:
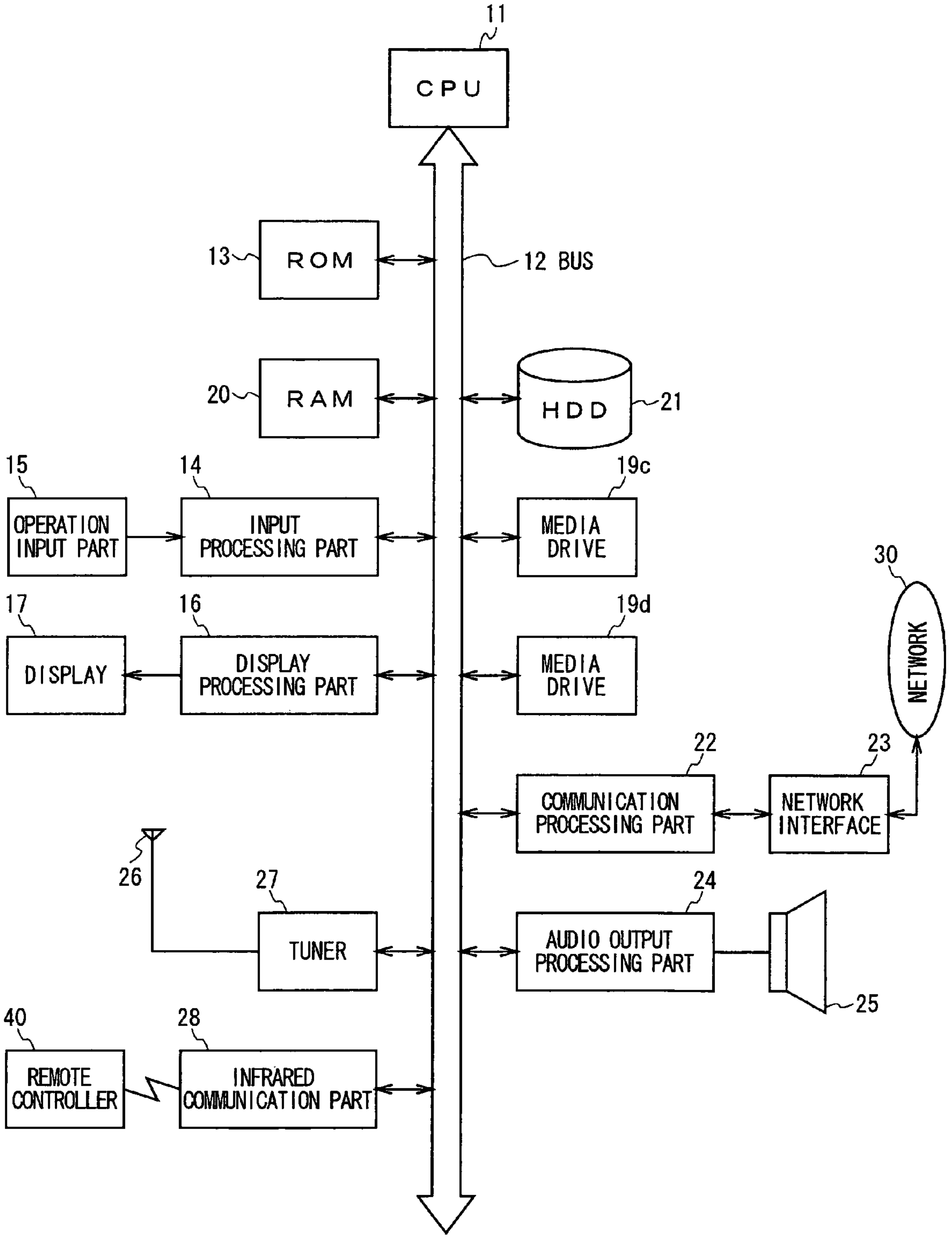
FIG. 5 is a block diagram showing a hardware configuration of the terminal unit according to the embodiment of the invention.

FIG. 5 is a block diagram showing the hardware configuration of the terminal unit 10. The terminal unit 10 as shown in FIG. 5 can manage, record and reproduce various sources of musical composition and so on.

The CPU (Central Processing Unit) 11 performs the overall control for the terminal unit 10 and the arithmetical operation in accordance with a started program. For example, the CPU 11 performs the communication operation via the network 30, the input/output operation for the user, the contents reproduction and clip operation from the media, the contents storage into the HDD 21 and its management, and the information retrieval via the network 30 based on the clip information. The contents data that can be recorded or reproduced by the terminal unit 10 of this embodiment include the audio contents data and the moving picture contents data. The CPU 11 sends or receives the control signal and data to or from each circuit part via the bus 12.

The ROM (Read Only Memory) 13 stores an operation program executed by the CPU 11, a program loader, various arithmetical operation coefficients, and the parameters for use in the program. Also, the program executed by the CPU 11 is expanded in the RAM (Random Access Memory) 20. Also, the RAM 20 is employed as a data area and a task area which are required for the CPU 11 to perform various kinds of processings.

An operation input part 15 has the operation keys, a jog dial, and a touch panel and the like with various kinds of operators provided on a housing of the terminal unit 10. The terminal unit 10 may be provided with a keyboard or a mouse for operating a GUI (Graphical User Interface) as the operation input part 15. The information inputted by the operation input part 15 undergoes a predetermined processing in an input processing part 14, and is transferred as an operation command to the CPU 11. The CPU 11 operates the apparatus by performing the required arithmetical operation and control in response to an input operation command.

A display processing part 16 is connected to a display device such as a liquid crystal display as the display 17. And various kinds of information are displayed on the display 17. If the CPU 11 supplies the display information to the display processing part 16 in response to the operation state, input state and communication state, the display processing part 16 displays the supplied display data on the display 17. For example, the substance of musical composition information distributed from the server or the like or the substance of clip information is displayed on the display 17. Also, the display 17 displays the retrieval result in retrieving the musical composition via the network 30.

The media drives 19*c* and 19*d* are drives for recording or reproducing (or only reproducing in several recording media) the contents of musical composition recorded on the portable recording medium. The number of kinds of recording medium that each of the media drives 19*c* and 19*d* can record or reproduce is not limited to one. That is, the media drive 19*c* and 19*d* can record and reproduce data for plural kinds of recording medium. For example, a media drive 19*c* may reproduce CD and DVD (Digital Versatile Disc), and a media drive 19*d* may record and reproduce MD.

The portable recording medium for recording the contents of musical composition is not limited to the optical recording medium such as CD or DVD. For example, such recording medium may be constituted of a semiconductor memory such as a flash memory storing the contents. In this case, a reader/writer for the flash memory is connected to the bus 12.

The user inserts the recording medium (CD, DVD, MD, etc.) recording any contents into the media drives 19*c*, 19*d*, and performs a predetermined operation on the remote controller 40, to appreciate the musical composition. For example, the user operates the remote controller 40 to issue a reproduction instruction with the media drive 19*c*, the CPU 11 instructs the media drive 19*c* to reproduce the contents. In response, the media drive 19*c* accesses and reads the specified contents from the mounted recording medium.

When the contents read in this way are the audio contents, the contents are subjected to a decoding process under the control of the CPU 11, as needed, and transferred to an audio output processing part 24. The audio output processing part 24 performs a sound field processing such as equalizing and other processings of volume adjustment, D/A conversion, amplification or the like for the audio data to be outputted from a speaker part 25. The speaker part 25 may be composed of plural speakers 25*a*, 25*b* to output the sound in stereo, as shown in FIG. 4.

The contents reproduced by the media drives 19*c* and 19*d* may be accumulated as an audio data file in the HDD 21 under the control of the CPU 11. The format of the audio data file may be a CD format of digital audio data 16-bit quantized in which the sampling frequency is 44.1 KHz. Also, such contents may be compressed audio data subjected to a predetermined compression process to save the capacity of the HDD 21. Though the compression method is not limited, ATRAC (Advanced Transform Acoustic Coding, trademark) or MP3 (MPEG Audio Layer-3) method, for example, may be employed.

A tuner part 27 is an AM/FM radio tuner to demodulate the broadcast signal received at the antenna 26 under the control of the CPU 11. Of course, the tuner part 27 may be a television tuner, a satellite broadcasting tuner, or a digital broadcasting tuner. A demodulated broadcast audio signal is subjected to a predetermined processing in the audio output processing part 24, and output as the broadcast audio from the speaker part 25.

A communication processing part 22 performs an encode processing for the transmit data and a decode processing for the received data under the control of the CPU 11. A network interface 23 transmits the transmit data encoded by the communication processing part 22 via the network to a predetermined external network dealing apparatus. Also, the network interface 23 passes a signal transmitted via the network from the external network dealing apparatus to the communication processing part 22. The communication processing part 22 transfers the received information to the CPU 11. The information received via the network 30 may include the musical composition information of a program being broadcast on the FM broadcasting or the like or the musical composition information contained in the title of CD or the like.

An infrared communication part 28 communicates with the remote controller 40 by wireless communication means with infrared or the like. And the infrared communication part 28 performs a predetermined processing for a signal sent from the remote controller 40, and transfers it as an operation command to the CPU 11. The CPU performs the required arithmetical operations and control to operate the apparatus in response to the input operation command.

The configuration of the terminal unit 10 is not limited to that of FIG. 5, but may be modified in various ways. For example, the terminal unit 10 may be provided with the interfaces with the peripheral devices in accordance with the communication methods such as USB (Universal Serial Bus), IEEE (Institute of Electrical and Electronic Engineers) 1394, and Bluetooth. And in the terminal unit 10, the audio contents downloaded via the network 30 through the network interface 23, or the audio contents transferred through the USB or IEEE1394 interface can be stored in the HDD 21. Also, the terminal unit 10 may be provided with a terminal used for connecting a microphone or an external headphone, a video output terminal for use in reproducing the DVD, a line connecting terminal, an optical digital connecting terminal, and the like. Also, the terminal unit 10 may be formed with a PCMCIA (Personal Computer Memory Card International Association) slot, a memory card slot and the like to enable communication of data with the external information processing apparatus or audio apparatus.

The configuration of program modules in the system of this embodiment will be described below. The program module is the information describing the processing performed by the terminal unit 10. Thereby, the terminal unit 10 implements the predetermined function based on the program module. In the following explanation, the function implemented by performing the program module is referred to with a name of the program module.

Figure 6:
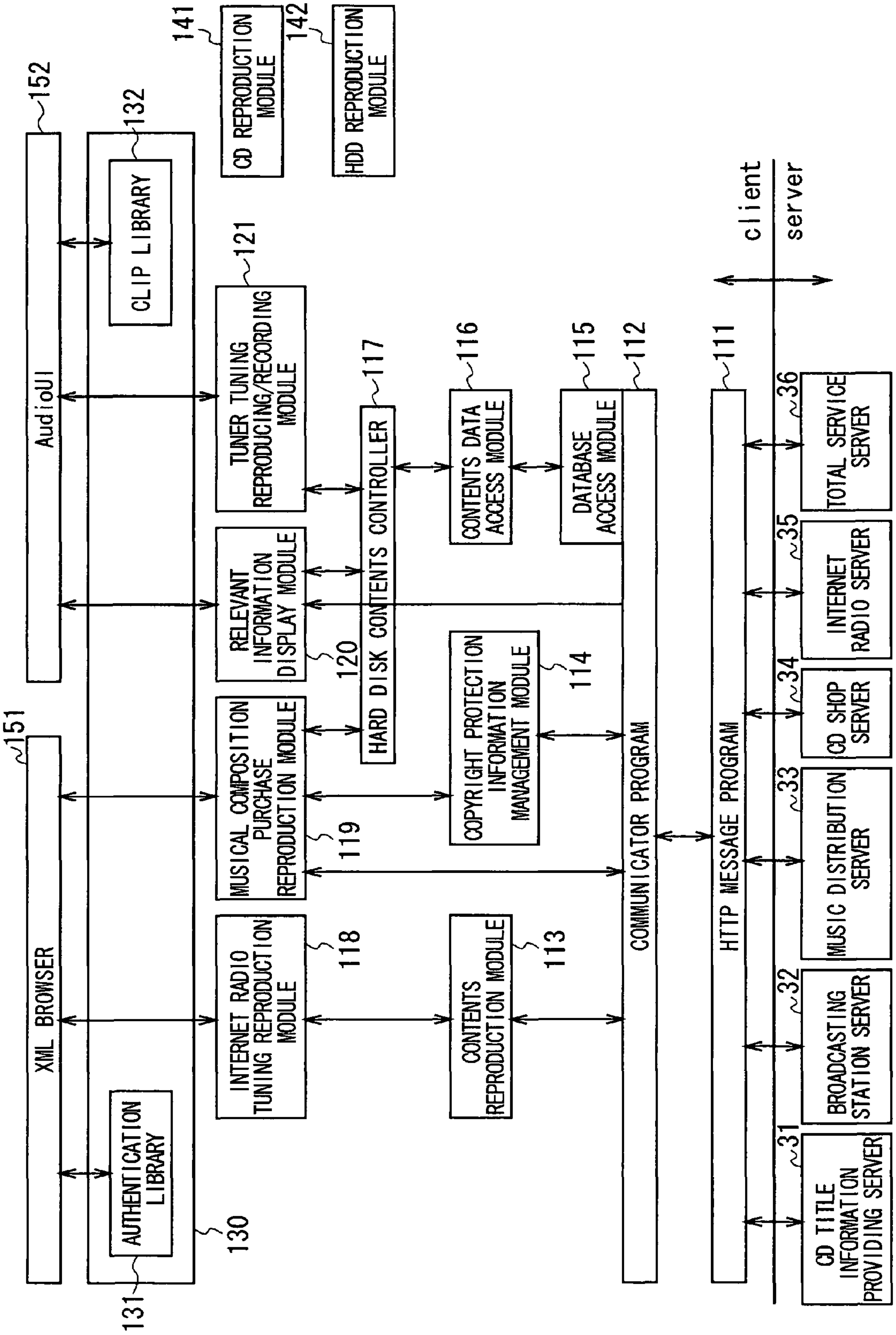
FIG. 6 is a diagram showing a program configuration of a system according to the embodiment of the invention.

FIG. 6 is a diagram showing the program module configuration of the terminal unit 10.

As shown in FIG. 6, the program module of the terminal unit 10 operates on the OS. The terminal unit 10 communicates with the CD title information providing server 31, the broadcasting station server 32, the music distribution server 33, the CD shop server 34, the internet radio server 35, the total service server 36, and other various kinds of servers, employing the function of each program module.

An HTTP (Hyper Text Transfer Protocol) message program 111 enables the HTTP communication with various servers, including the CD title information providing server 31, the broadcasting station server 32, the CD shop server 34, and the total service server 36. A communicator program 112 is a communication module for making various communications with the total service server 36 and the like.

At the upper level (function similar to the user interface) of the communicator program 112, a contents reproduction module 113 for interpreting and reproducing the codec of the contents and a copyright protection information management module 114 for handling the information regarding the copyright protection are located. At the upper level of the contents reproduction module 113, an internet radio selection reproduction module 118 for selecting and reproducing the internet radio is provided. At the upper level of the copyright protection information management module 114, a musical composition purchase reproduction module 119 for administering the purchase of musical composition and reproduction of audition music is provided.

At the upper level of the internet radio selection reproduction module 118 and the musical composition purchase reproduction module 119, an XLM (extensible Markup Language) browser 151 is provided. The XML browser 151 interprets the substance of an XML file transmitted from various servers, and displays it on the screen of the display 17. Also, when the terminal unit 10 is a total service use mode, the XML browser 151 interprets the input substance into the terminal unit 10 by the user. And a processing request and the like according to the input substance is passed from the XML browser 151 to another module. For example, the musical composition selected via the XML browser 151 by the user is purchased in the musical composition purchase reproduction module 119 and written into the HDD 21 via a hard disk controller 117.

An authentication library 131 of a library 130 is connected to the communicator program 112. The authentication library 131 performs the authentication process for the total service server 36 and other servers.

Further, at the upper level of the communicator program 112, a database access module 115, a contents data access module 116 and a hard disk contents controller 117 are provided. The database access module 115 gains access to various kinds of database constructed in the HDD 21. The contents data access module 116 gains access to the contents stored in the HDD 21. The hard disk contents controller 117 manages the contents stored in the HDD 21.

At the upper level of the hard disk contents controller 117, a relevant information display module 120, a tuner selection reproducing/recording module 121, and a musical composition purchase reproduction module 119 are provided. The relevant information display module 120 displays the title, artist name and the like of the musical composition broadcast by the radio station on the display 17. The tuner selection reproducing/recording module 121 selects the radio station, and records the contents of the musical composition received from the radio station in the HDD 21.

For example, the musical composition received from the radio station selected via an audio user interface (AudioUI) 152 is written into the HDD 21 via the contents data access module 116.

The relevant information display module 120 receives the title artist name and the like of the musical composition being currently broadcast by the radio station, as the relevant information, in the tuner selection reproducing/recording module 121 from the CD title information providing server 31, the broadcasting station server 32 and the like via the HTTP message program 111, and displays the relevant information on the display 17 via the audio user interface 152.

The relevant information displayed on the display 17 via the audio user interface 152 can be temporarily stored in the clip library 132 of the library 130. Also, the relevant information may be finally stored in the HDD 21 via the database access module 115.

Moreover, the program modules of the terminal unit 10 include a CD reproduction module 141 for reproducing the CD, and an HDD reproduction module 142 for reproducing the HDD 21. And the CD reproduction module 141 and the HDD reproduction module 142 output the reproduction result from the CD and HDD to the audio data processing part 24 and the speaker part 25, respectively.

A clip processing with the terminal unit 10 will be described below.

The terminal unit 10 allows the information regarding the musical composition or musical composition set residing on each storage medium within the terminal unit 10 or on the network 30 to be clipped, and saved as the clip information. The most fundamental clip processing is to acquire the relevant information regarding the musical composition being broadcast from the corresponding broadcasting station server 32, while receiving the FM broadcasting or the like. In this case, for example, the terminal unit 10 acquires the latest relevant information (information regarding the musical composition already broadcast or scheduled to broadcast) by gaining access to the broadcasting station server 32 corresponding to the broadcasting station during reception at a regular interval of, e.g., 30 seconds. And if a clip operation from the user is detected, the relevant information received at that time is saved as the clip information.

The clipped relevant information includes the music name and artist name of the musical composition, the album name recording the musical composition, and the identification number ID of the album. For example, the user gains access to the music distribution server 33 or the CD shop server 34 employing the terminal unit 10, and notifies the identification number ID of the album in the clip information to the server to make a purchase procedure for the album.

In the clip processing, the relevant information can be saved as the clip information in a unit of musical composition or musical composition set. For example, in the clip processing of receiving the broadcast, one clip information can be saved in a unit of list (on-air list) of musical composition broadcast in the program during broadcasting at the time of clipping.

Also, the information that can be acquired and saved through the clip processing employing the information from the broadcasting station server 32 is not limited to the musical composition or musical composition set including the information being currently broadcast. The user designates the date, time zone and the like as the retrieval conditions at the terminal unit 10, transmits them to the broadcasting station server 32, and acquires the musical composition or musical composition set as the retrieval result. And the desired information is selected and clipped from among the acquired information, and saved as clip information.

The processing for retrieving data from the broadcasting station server 32 and clipping will be described below in detail.

First of all, the overall processing will be outlined.

Figure 7:
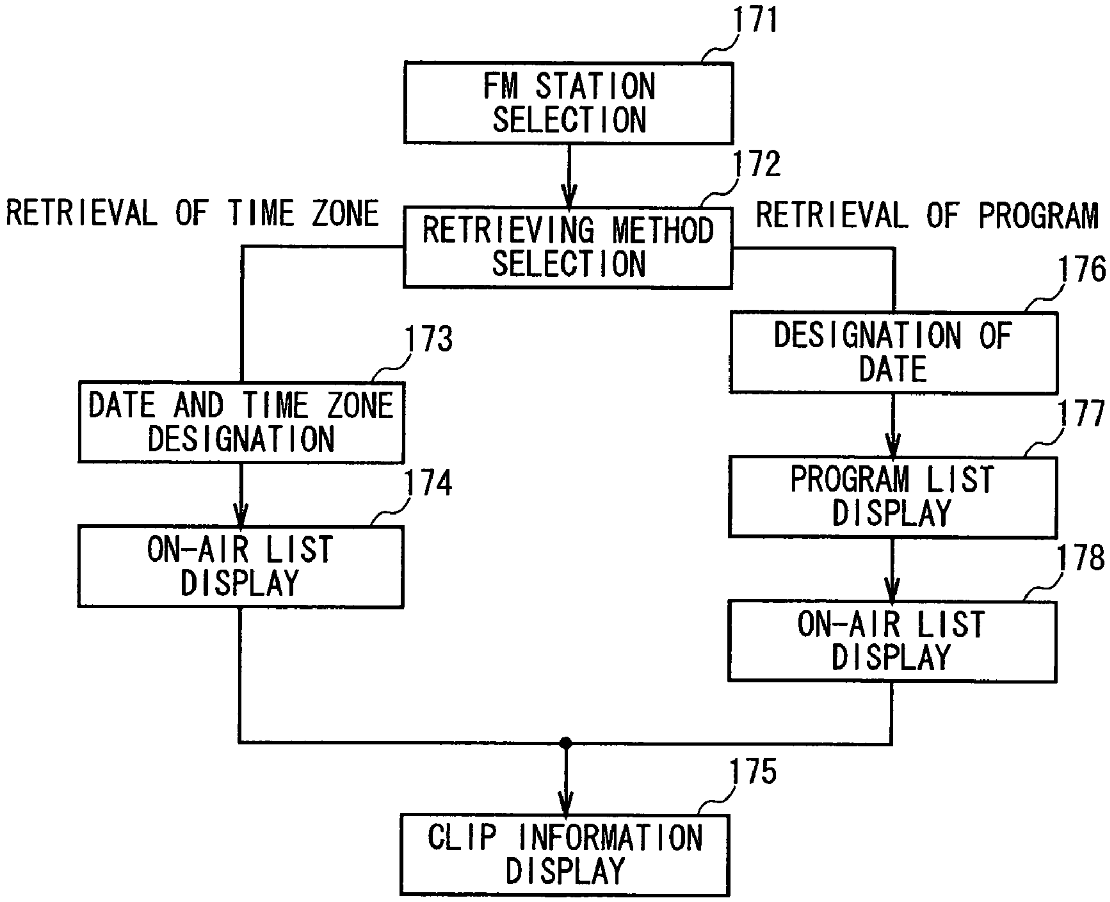
FIG. 7 is a diagram showing the flow of the screen display in the terminal unit in making a process for retrieving and clipping information in the broadcasting station server.

FIG. 7 is a block diagram showing the flow of display screens at the terminal unit 1 in the processing for retrieving data from the broadcasting station server 32 and clipping At the terminal unit 10, a function selection key 43*c* of the remote controller 40 is pressed to set up a function of retrieving data from the broadcasting station server 32. Herein, as an example, if the information for the FM broadcasting is retrieved, a screen 171 for selecting the FM station appears on the display 17.

If the FM station is selected on the screen 171 by the operation of the user, a screen 172 for selecting the retrieving method appears on the display 17. The retrieving methods include a method for retrieving the musical composition broadcast in the time zone by designating the date and time zone and a method for retrieving the musical composition after designating the date and selecting the program broadcast on that date. In the following, the former method is called a "time zone retrieval" and the latter method as a "program retrieval".

If the time zone retrieval is selected on the screen 172, a screen 173 for designating the date and time zone appears on the display 17. And the CPU 11 retrieves data from the broadcasting station server 32 with the date and time zone designated on the screen 173 as the retrieval key, and displays a list of retrieval results on a screen 174. The list (on-air list) of musical compositions broadcast on the designated date and time zone is displayed on the screen 174.

The CPU 11 can select (clips) one musical composition from among those displayed on the screen 174, and save the information regarding that musical composition. Also, the CPU 11 may clip a total list of musical compositions displayed, viz., an on-air list itself, and save the information regarding each musical composition. Also, the CPU 11 displays the saved clip information on a screen 175 after clipping.

On the other hand, the CPU 11 displays a screen 176 for designating the date on the display 17, if the program retrieval is selected on the screen 172. And the CPU 11 retrieves data from the broadcasting station server 32 with the date designated on the screen 176 as the retrieval key, and displays a list of programs broadcast on that date on a screen 177.

Moreover, if the user selects any program on the screen 177, the CPU 11 further retrieves data from the broadcasting station server 32, and displays a list of musical compositions broadcast within the program on a screen 178. On the screen 178, like the screen 174, the user can clip any one of musical compositions displayed, or on-air list itself, whereby the clip information is displayed on the screen 175.

Figure 8:
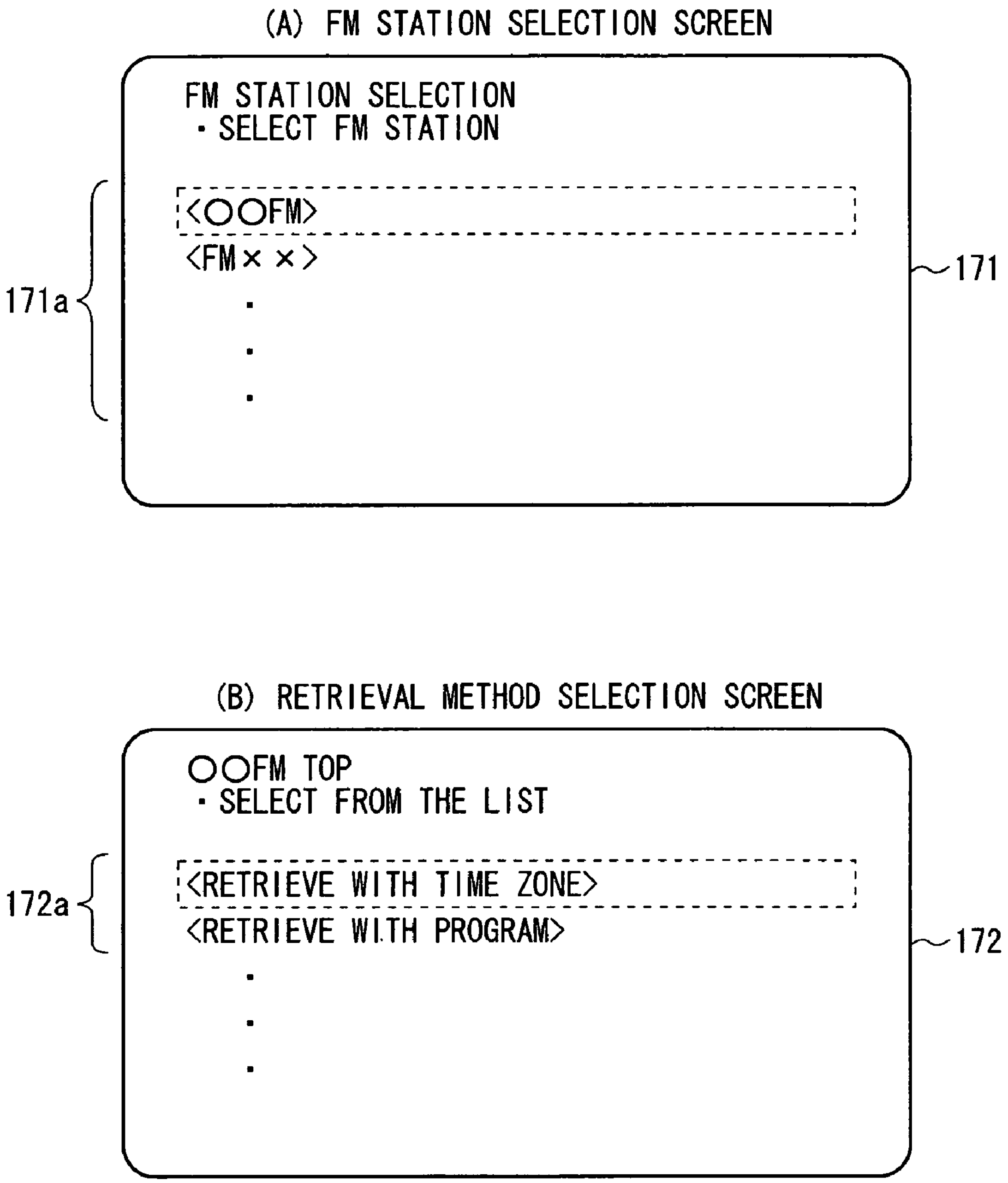
FIG. 8 is a diagram showing a screen display example in the terminal unit from the retrieval start to selection of the retrieval method.

Herein, a specific screen display example of each screen is shown. First of all, FIG. 8 is a view showing a screen display example from the start of retrieval to selection of the retrieval method.

FIG. 8A shows an example of the screen 171 for selecting the FM station. On this screen 171, a list of FM broadcasting station names is displayed in a selection part 171*a*. The user selects an item of desired broadcasting station name from the selection part 171*a*, employing the directional keys 41*a* and 41*b* of the remote controller 40, and decides it by pressing the decision key 42.

Also, FIG. 8B shows an example of the screen 172 for selecting the retrieval method. The user selects either the time zone retrieval or program retrieval item in the selection part 172*a* of the screen 172, employing the directional keys 41*a* and 41*b*, and decides it by pressing the decision key 42 in the same manner as above.

Figure 9:
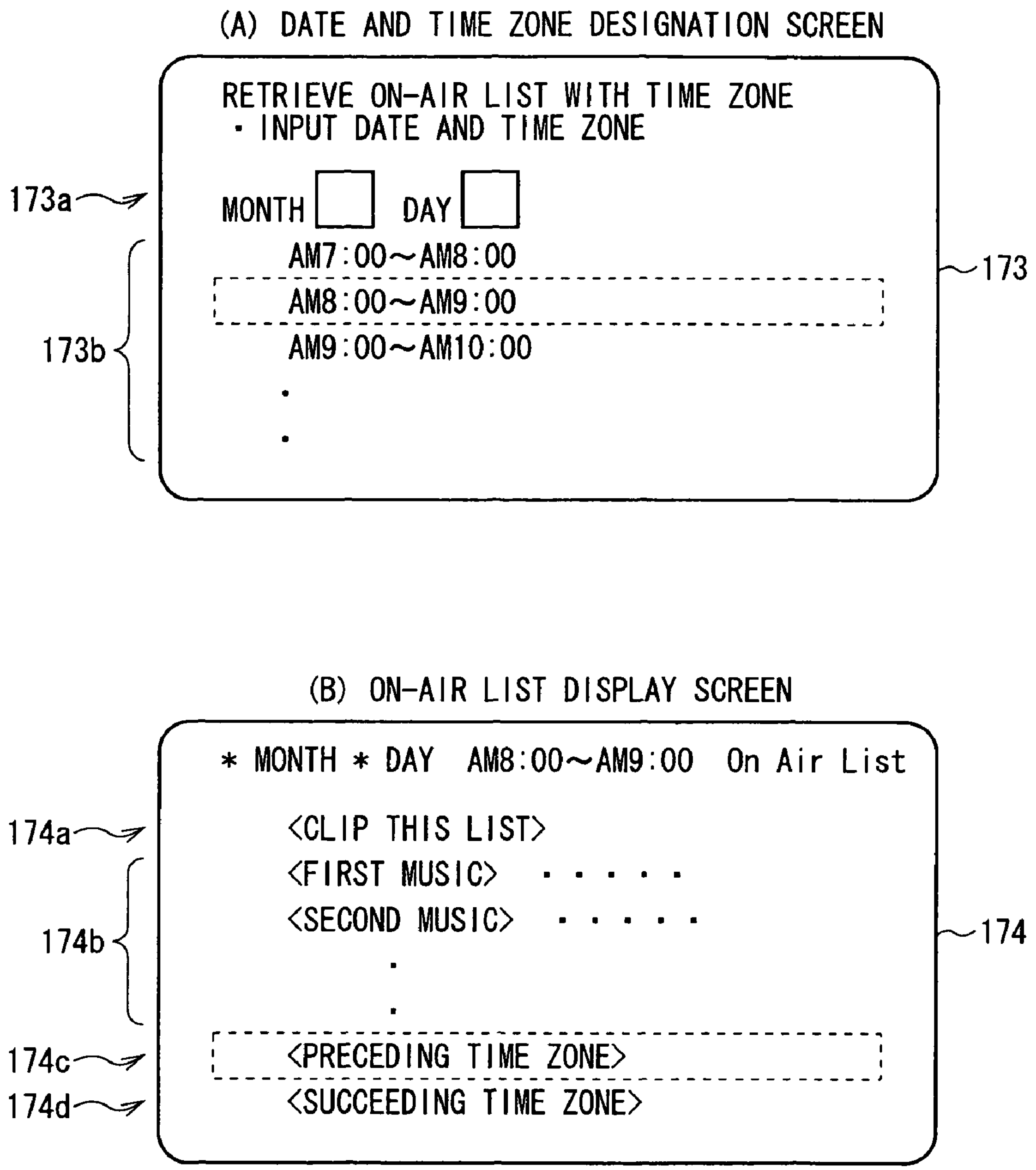
FIG. 9 is a diagram showing a screen display example in the terminal unit when the time zone retrieval is selected.

FIG. 9 is a view showing a screen display example when the time zone retrieval is selected.

FIG. 9A shows an example of the screen 173 for designating the date and time zone. The user designates a desired date in an input part 173*a* of the screen 173 by selecting the number displayed on a pull-down screen with the directional keys 41*c* and 41*d* after positioning the cursor employing the directional keys 41*a* and 41*b*, and pressing the decision key 42. In the input part 173*a*, the current date may be displayed as the initial indication.

Then the CPU 11 performs the retrieval, if the user selects and decides an item of desired time zone from the selection part 173*b* where the list of time zones is displayed after designating the date. A method for designating the time zone is not limited to that as described above, but the user may input the numerical value, for example. Also, the time zone may not be designated in a unit of hour.

The retrieval result is displayed as shown in FIG. 9B, for example. If the user selects and decides a directive item 174*a* on this screen 174, the CPU 11 can clip the on-air list itself displayed. Also, in a selection part 174*b*, a list of musical compositions broadcast in the designated time zone is displayed as the on-air list. The user can select and decide an item of desired musical composition in the selection part 174*b*, requesting to clip the musical composition and display and save the information regarding the musical composition.

By the way, in many cases, the user may uncertainly remember the date and time zone when the musical composition of retrieval object is broadcast at the time of retrieval. Therefore, the probability that the musical composition of intent is not displayed on the screen 174 because the user erroneously inputs the date or time zone on the screen 173 may be relatively high. Also, there is an action that the user failing to hear the broadcasting confirms the musical composition broadcast in the time zone where the user fails to hear by changing the time zone sequentially. In such a case, it is required that the operation returns from the screen 174 to the screen 173, and the date or time zone are designated again.

The re-specification of the retrieval conditions is made relatively easily on the PC or the like with the numeric keys, for example. However, since the terminal unit 10 has only a limited number of input keys, the operation for re-specifying the retrieval conditions is not easy.

Thus, the CPU 11 displays the directive items 174*c* and 174*d* for requesting the display in the preceding time zone and the succeeding time zone of the designated time zone together with the retrieval result on the screen 174 for displaying the retrieval result (here on-air list). The CPU 11 enables the directive item 174*c* or 174*d* to be selected by one series of operations including the selection operation of each musical composition in the selection part 174*b*. That is, the user can select each item of the selection part 174*b* and any one of the directive items 174*c* and 174*d*, employing only the directional keys 41*a* and 41*b*. The CPU 11 can display the on-air list corresponding to the preceding or succeeding time zone of the designated time zone, when the user selects and decides the directive item 174*c* or 174*d*.

The re-specification of the retrieval conditions is often made to request the information in the preceding or succeeding time zone. Accordingly, since the directive items 174*c* and 174*d* are displayed, the retrieving apparatus allows the user to re-specify the retrieval conditions and display the new information, without lowering the operability of the user, even when a limited number of input keys are provided.

Figure 10:
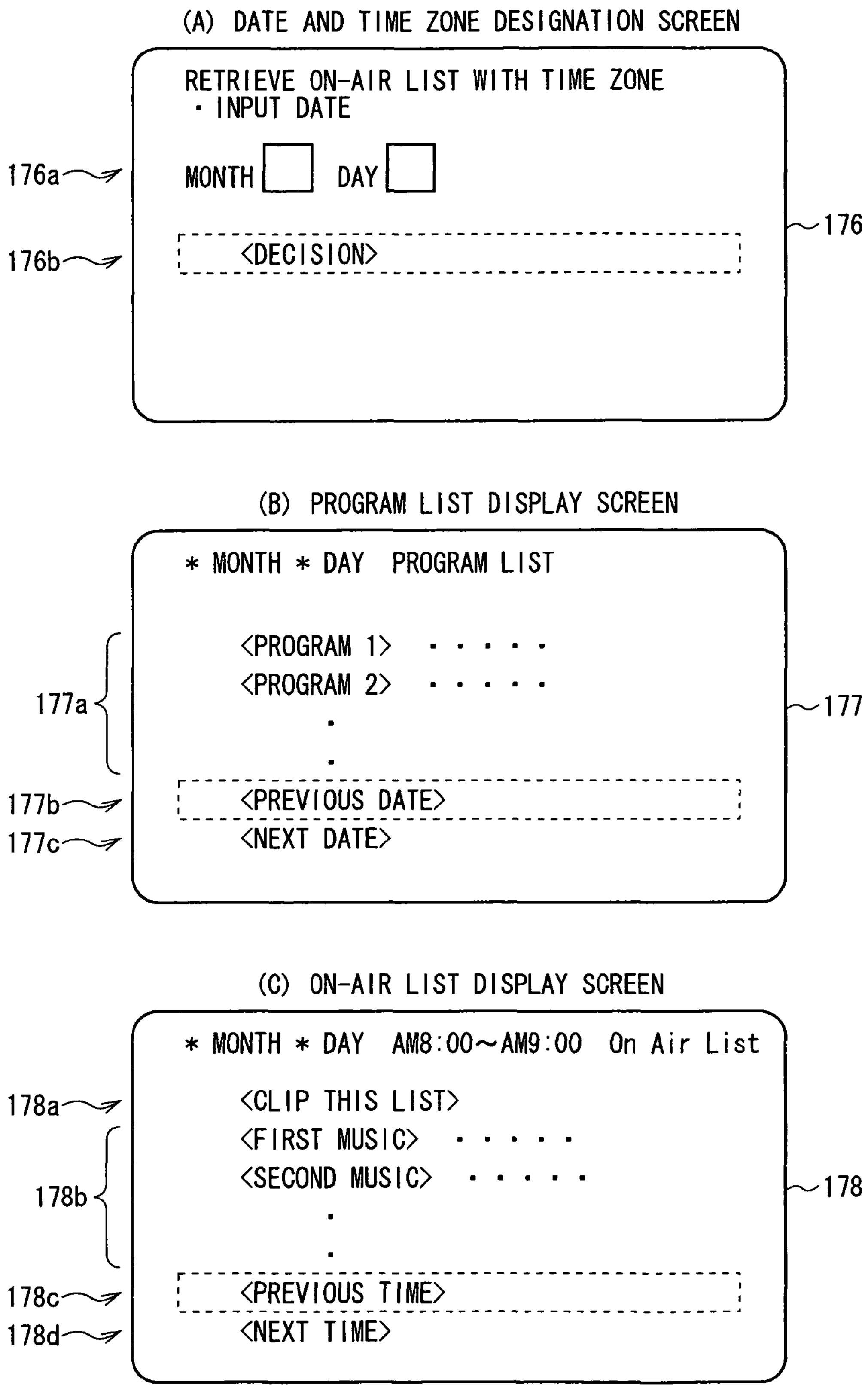
FIG. 10 is a diagram showing a screen display example in the terminal unit when the program retrieval is selected.

FIG. 10 is a view showing a screen display example when the program retrieval is selected.

FIG. 10A shows an example of the screen 176 for designating the date. On the screen 176, the user designates a desired date in an input part 176*a*, like the input part 173*a* on the screen 173, employing the directional keys 41*a* to 41*d* and the decision key 42. Then the CPU 11 performs the retrieval, if the user selects and decides the directive item 176.

The retrieval result is displayed as shown in FIG. 10B, for example. FIG. 10B shows the screen 177 for displaying a list of programs broadcast on the designated date. The user can select and decides a desired program item from a selection part 177*a* where the list of program names is displayed, thereby requesting the list (on-air list) of musical compositions broadcast within the program.

Also, on this screen 177, like the screen 174, the date previously inputted on the screen 176 may be false in some cases. Therefore, the CPU 11 displays the directive items 177*b* and 177*c* for displaying the program lists on the previous and next dates, together with the program list, on the screen 177, and enables the directive item 177*b* or 177*c* to be selected by an operation in series with the selection operation of each program in the selection part 177*a*. Thereby, the user can change the date for retrieval without performing any operation for inputting the date again by returning to the previous screen.

On selecting and deciding any item of program name in the selection part 177*a*, the CPU 11 transfers the display screen to the screen 178 for displaying the on-air list for the program, as shown in FIG. 10C. If the user selects and decides a directive item 178*a* on the screen 178, the CPU 11 can clip the on-air list itself displayed. Also, a list of musical compositions broadcast in the designated program is displayed as the on-air list in the selection part 178*b*. The user can select and decide any item of musical composition in the selection part 178*b*, clip the musical composition, and request to display and save the information regarding the musical composition.

Moreover, the CPU 11 displays, for that program, the directive items 178*c* and 178*d* for displaying the list of musical compositions broadcast in the program at the previous time and the list of musical compositions scheduled to broadcast in the program at the next time, together with the retrieved on-air list. The CPU 11 enables the directive item 178*c* or 178*d* to be selected by an operation in series with the selection operation of each musical composition in the selection part 178*b*. Thereby, the CPU 11 enables the user to display the on-air list of the same program at the previous or next time and clip the musical composition, in which it is unnecessary for the user to change the date or select the program by switching the screen.

A specific processing example from selecting the retrieval method to the clipping of the on-air list will be described below.

Figure 11:
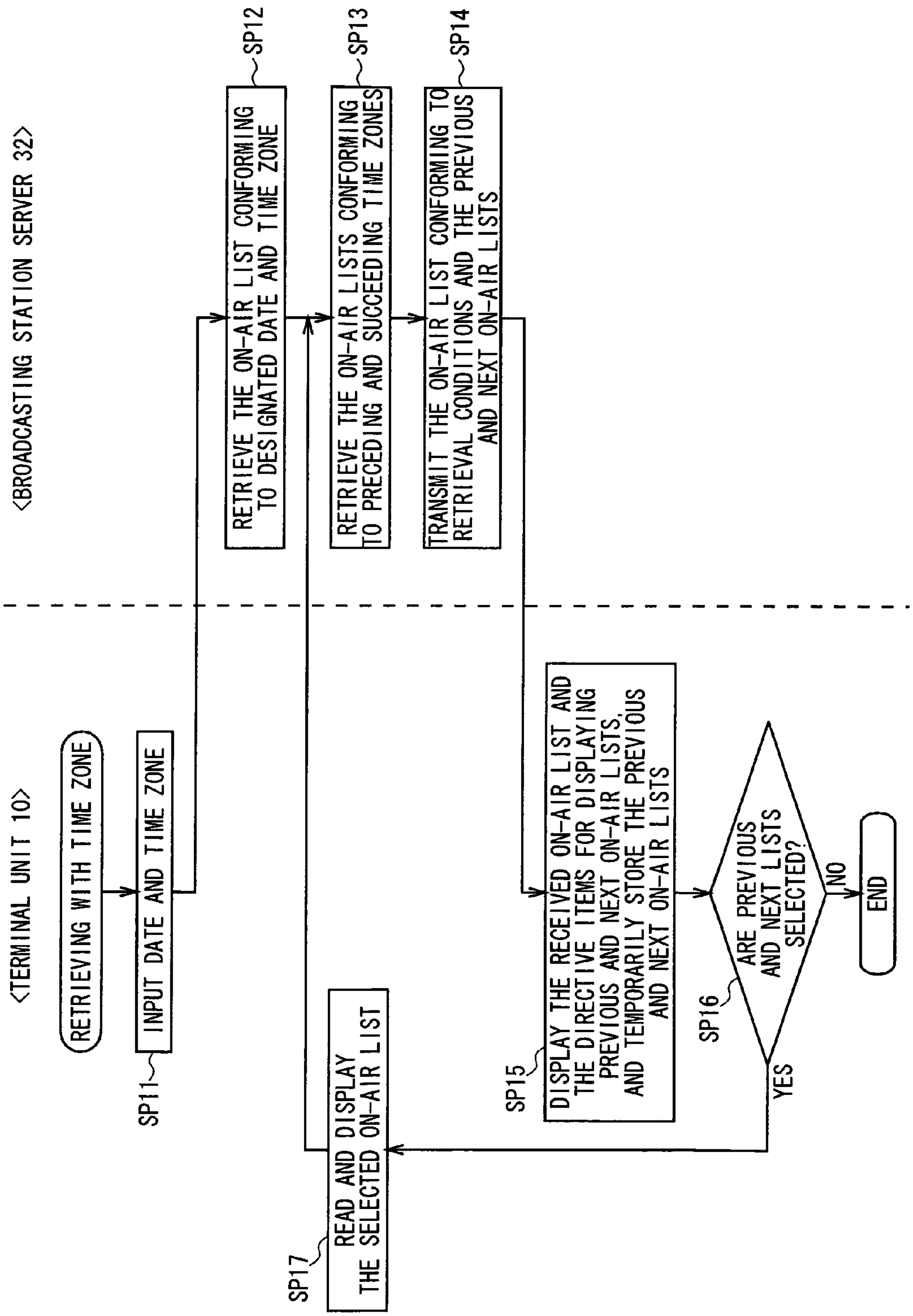
FIG. 11 is a flowchart showing the flow of an information retrieval process between the terminal unit and the broadcasting station server, when the time zone retrieval is selected.

FIG. 11 is a flowchart showing the flow of an information retrieval processing between the terminal unit 10 and the broadcasting station server 32 when the time zone retrieval is selected.

The flowchart of FIG. 11 is started by the user selecting the time zone retrieval, when the screen 172 for selecting the retrieval method is displayed on the display 17 of the terminal unit 10. At step S11, the terminal unit 10 displays the screen 173 for designating the date and time zone, and accepts the input date and time zone from an input operation of the user employing the remote controller 40. And the terminal unit 10 transmits the input information as the retrieval conditions to the broadcasting station server 32.

At step S12, the broadcasting station server 32 having received the retrieval conditions retrieves the on-air list on the designated date and time zone from the database. Also, at step S13, the broadcasting station server 32 retrieves the on-air list conforming to the time zone before and after the designated time zone. And the broadcasting station server 32 transmits the on-air list conforming to the designated time zone and the on-air list in the time zone before and after it to the terminal unit 10 at step S14.

At step S15, the terminal unit 10 displays the on-air list conforming to the designated time zone and the directive items for displaying the on-air lists conforming to the time zone before and after it among the information received from the broadcasting station server 32 on the display 17 (corresponding to the screen 174). Also, the terminal unit 10 temporarily stores the on-air list in the preceding and succeeding time zone, which has been received from the broadcasting station server 32, in the RAM 20, for example.

At step S16, if a directive item for displaying the on-air list in the preceding or succeeding time zone is selected on the displayed screen by the user, the terminal unit 10 goes to step S17. At step S17, the terminal unit 10 displays the on-air list corresponding to the selection at step S16 among the on-air list temporarily stored in the RAM 20 at step S15 on the display 17. And the terminal unit 10 designates the time zone selected at step S16 as the new retrieval conditions, and transmits it to the broadcasting station server 32.

In this way, the terminal unit 10 receives and temporarily stores the on-air list before and after the designated time zone, together with the on-air list conforming to the designated time zone, whereby when there is a display request for the on-air list in the preceding and succeeding time zone, the stored on-air list can be displayed at once.

The broadcasting station server 32 retrieves the on-air list in the preceding and succeeding time zone of the time zone newly designated at step S17, and transmits the retrieval result to the terminal unit 10 (corresponding to step S13 and step S14). The terminal unit 10 temporarily stores the received on-air list in the RAM 20 (corresponding to step S15). At this time, the displayed on-air list is not changed.

If an item of musical composition in the on-air list is selected, viz., the clipping is made, at step S16, the terminal unit 10 ends the retrieval process. And the terminal unit 10 requests the broadcasting station server 32 to transmit the information regarding the specified musical composition, receives this information, and stores it as the clip information in the HDD 21, as well as displaying it on the display 17.

Through the above process, it is possible to display the on-air list in the preceding and succeeding time zone at once, and clip it, in which it is unnecessary for the user to switch the screen to change the date or time zone.

Figure 12:
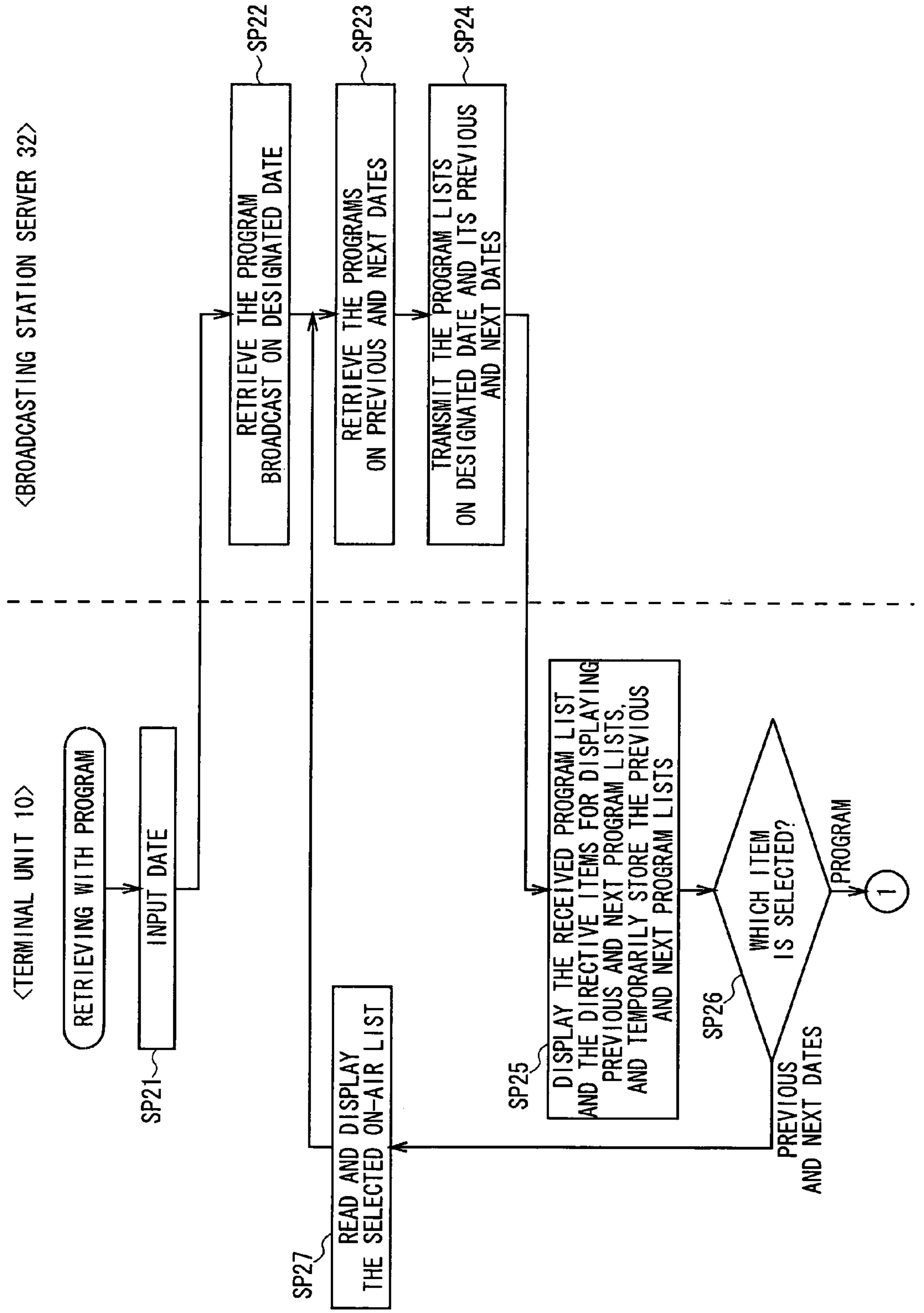
FIG. 12 is a first flowchart showing the flow of the information retrieval process between the terminal unit and the broadcasting station server, when the program retrieval is selected.
Figure 13:
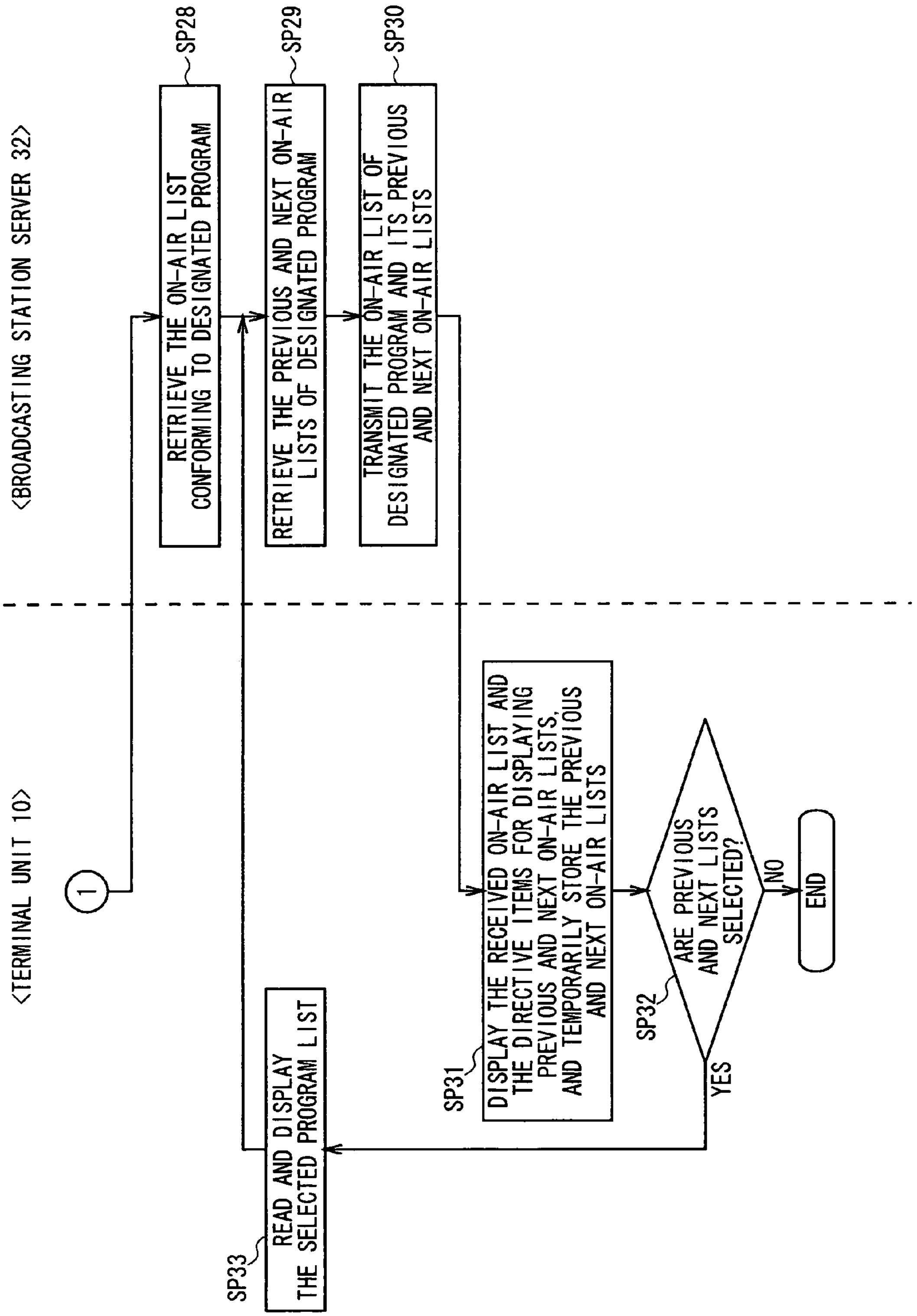
FIG. 13 is a second flowchart showing the flow of the information retrieval process between the terminal unit and the broadcasting station server, when the program retrieval is selected.

FIGS. 12 and 13 are flowcharts showing the flow of the information retrieval process between the terminal unit 10 and the broadcasting station server 32 when the program retrieval is selected.

A flowchart of FIG. 12 is started by the user selecting the program retrieval, when the screen 172 for selecting the retrieval method is displayed on the display 17 of the terminal unit 10. At step S21, the terminal unit 10 displays the screen 176 for designating the date. The terminal unit 10 transmits the input information as the retrieval conditions to the broadcasting station server 32, when the date is input by the input operation of the user.

At step S22, the broadcasting station server 32 receiving the retrieval conditions retrieves the program broadcast on the designated date from the database. Also, at step S23, the broadcasting station server 32 retrieves the program broadcast on the date before and after the designated date. And the broadcasting station server 32 transmits the program lists on the designated date and its preceding and succeeding dates to the terminal unit 10 at step S24.

At step S25, the terminal unit 10 displays the program list on the designated date and the directive items for displaying the program lists on its preceding and succeeding dates among the information received from the broadcasting station server 32 on the display 17 (corresponding to the screen 177). Also, the terminal unit 10 temporarily stores the program lists on the preceding and succeeding dates, which have been received from the broadcasting station server 32, in the RAM 20.

At step S26, if a directive item for displaying the program list on the preceding or succeeding date is selected by the user, the terminal unit 10 goes to step S27. At step S27, the terminal unit 10 displays the program list corresponding to the selection at step S26 among the program lists temporarily stored in the RAM 20 at step S25 on the display 17. Then the terminal unit 10 designates the time zone selected at step S26 as the new retrieval conditions, and transmits it to the broadcasting station server 32. In this way, the terminal unit 10 receives and temporarily stores the program lists before and after the designated date, together with the program list on the designated date, whereby when there is a display request for the program list on the preceding or succeeding date, the stored program list can be displayed at once The broadcasting station server 32 retrieves the program on the dates before and after the date newly designated at step S27, and transmits the retrieval results to the terminal unit 10 (corresponding to step S23 and step S24). The terminal unit 10 temporarily stores the received program lists in the RAM 20.

If an item of the program is selected from the program list at step S26, the terminal unit 10 requests the broadcasting station server 32 to retrieve the program as the retrieval key, and goes to step S28 in FIG. 13. At step S28, the broadcasting station server 32 retrieves the list of musical compositions broadcast in the newly designated program, viz., the on-air list conforming to the designated date and the designated program. Also, at step S29, the broadcasting station server 32 retrieves the on-air list broadcast at the previous time for the designated program. Also, the broadcasting station server 32 retrieves the on-air list, if the on-air list scheduled to broadcast at the next time for the same program is accumulated in the database. At step S30, the broadcasting station server 32 transmits the on-air list of the designated program and the on-air list at the previous and next time to the terminal unit 10.

At step S31, the terminal unit 10 displays the on-air list of the designated program and the directive items for displaying the on-air lists at the previous and next time among the information received from the broadcasting station server 32 on the display 17 (corresponding to the screen 178). Also, the terminal unit 10 temporarily stores the on-air lists at the previous and next time, which have been received from the broadcasting station server 32, in the RAM 20.

At step S32, if a directive item for displaying the on-air list at the previous or next time is selected on the display screen by the user, the terminal unit 10 goes to step S33. At step S33, the terminal unit 10 displays the on-air list corresponding to the selection at step S32 among the on-air lists temporarily stored in the RAM 20 at step S32 on the display 17. And the terminal unit 10 transmits the control information such as flag information to the broadcasting station server 32, and requests the on-air list of the program at the time corresponding to the selection at step S32.

In this way, the terminal unit 10 receives and temporarily stores the on-air lists at the previous and next time, together with the on-air list of the program on the designated date, whereby when there is a display request for the on-air list at the previous and next time for the same program, the stored on-air list can be displayed at once.

The broadcasting station server 32 retrieves the on-air lists of the program at the time before and after the time designated at step S33, and transmits the retrieval results to the terminal unit 10 (corresponding to step S29 and step S30). The terminal unit 10 temporarily stores the received on-air lists in the RAM 20 (corresponding to step S31).

If the musical composition in the on-air list is clipped at step S32, the terminal unit 10 ends the retrieval processing. And the terminal unit 10 requests the broadcasting station server 32 to transmit the information regarding the specified musical composition, receives this information, and stores it as the clip information in the HDD 21, as well as displaying it on the display 17.

Through the above process, the user can display the program lists on the previous and next dates, and the on-air lists of the same program at the previous and next time at once, without changing the date or program name by switching the screen, and perform the selection operation.

In the above flowcharts, when there is a retrieval request for the broadcasting station server 32, the list conforming to the retrieval conditions, as well as its preceding and succeeding lists, are received at the terminal unit 10 simultaneously, but, of course only the list conforming to the retrieval conditions may be received. In this case, when any of the directive items for displaying its preceding and succeeding lists that are displayed together with the list is selected, the terminal unit 10 requests again the broadcasting station server 32 for the list conforming to the retrieval conditions that have been changed in accordance with the selection. Accordingly, when the directive item is selected, the terminal unit 10 receives the corresponding list from the broadcasting station server 32 and then displays the list on the display 17. Accordingly, there is possibly a delay from the time of selecting the directive item to the time of displaying the list in the processing of the terminal unit 10 depending on the condition of the network 30 or the broadcasting station server 32.

The processing function of the terminal unit 10 is implemented by a program describing the substance of processing that is executed in the CPU 11 of the terminal unit 10. Also, the processing function may be implemented in the computer by executing the same program in the CPU for the computer. The program describing the substance of processing may be recorded in a recording medium readable in the terminal unit 10 or the computer. Examples of such recording medium include a magnetic recording device, an optical disk, an optical magnetic recording medium and a semiconductor memory. Examples of the magnetic recording device include HDD, a flexible disk (FD), and a magnetic tape. Examples of the optical disk include DVD, DVD-RAM, CD-ROM, and CD-R (Recordable)/RW (ReWritable). An example of the optical magnetic recording medium is MO (Magneto-Optical disk).

In circulating the program, the portable recording media recording the program, such as DVD or CD-ROM, for example, are sold. Also, the program may be stored in the storage device of a server computer and transferred via the network from the server computer to another computer.

The terminal unit 10 or the computer that executes the program stores the program recorded in the portable recording medium or the program transferred from the server computer in the storage device of its own. In the case of the terminal unit 10, the program is stored in the HDD 21, for example. And the terminal unit 10 or the computer reads the program from the storage device of its own and performs the processings in accordance with the program. The terminal unit 10 or the computer may read the program directly from the portable recording medium, and perform the processings in accordance with the program. Also, every time the program is transferred from the server computer, the processing may be made in accordance with the received program.

(3) Second Embodiment

A service system in which a service of the broadcasting station server 32 providing the program list or on-air list is implemented through one of a plurality of service servers will be described below in detail according to a second embodiment of the invention. The present service system has a single sign-on function.

(3-1) System Configuration of Music Related Service Providing System

Figure 14:
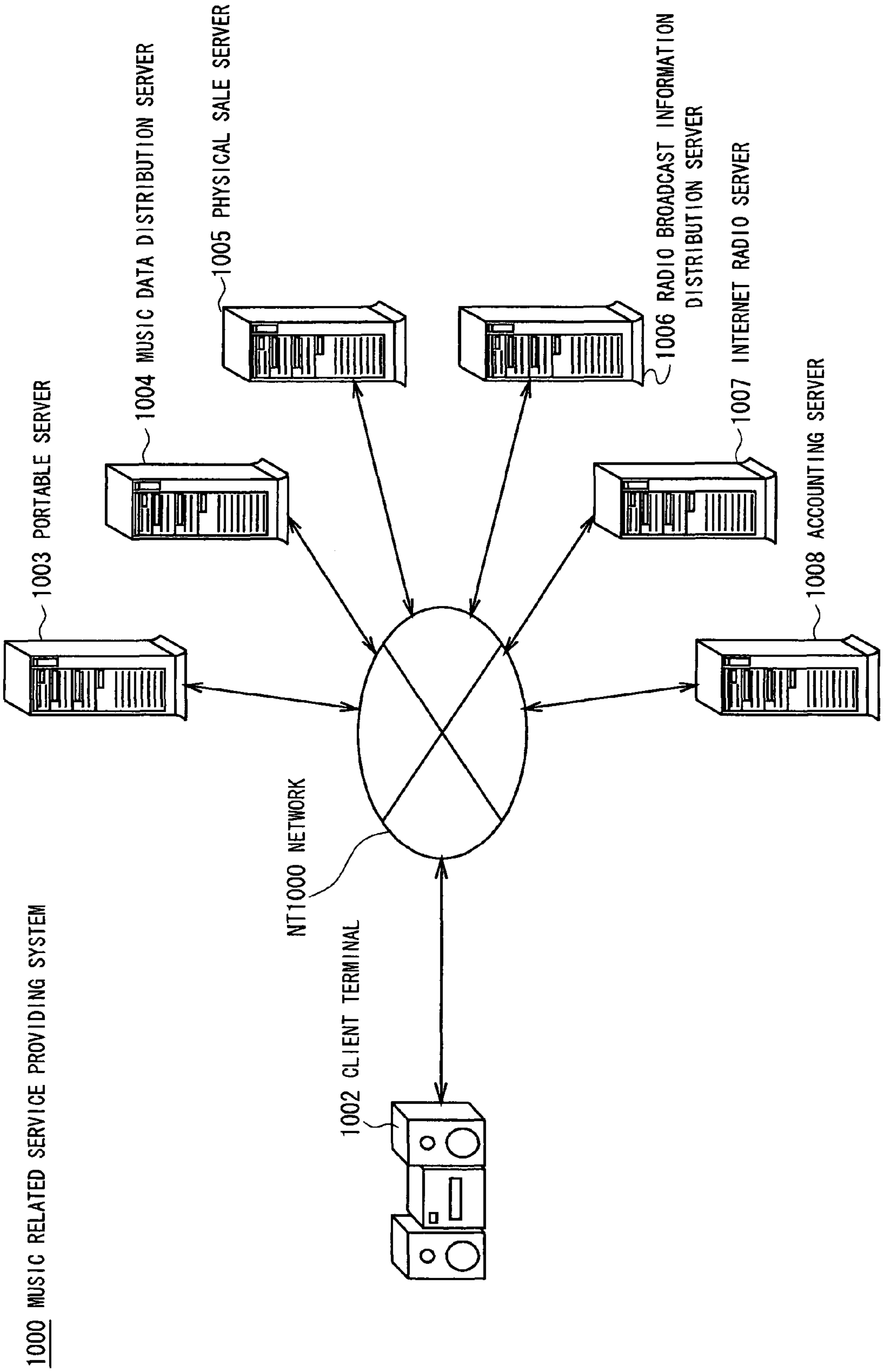
FIG. 14 is a diagrammatic view showing the overall configuration of a music related service providing system according to a second embodiment of the invention.

In FIG. 14, reference numeral 1000 denotes a music related service providing system as a whole, which comprises a client terminal 1002 of the user contracting with an operation agent of the music related service providing system 1000, a portable server 1003 administrating the client terminal 1002, and a plurality of servers 1004 to 1008 providing various kinds of services regarding the music to the client terminal 1002.

In this embodiment, a music data distribution server 1004 provides a music data distribution service for distributing the music data in the format of ATRAC3 (Adaptive Transform Acoustic Coding 3), AAC (Advanced Audio Coding), WMA (Window Media Audio), RealAUDIO G2 Music Codec, MP3 (MPEG Audio Layer-3) to the client terminal 1002.

Also, a physical sale server 1005 provides a physical sale service for selling CD (Compact Disc), DVD (Digital Versatile Disc) and the like to the user at the client terminal 1002.

Moreover, a radio broadcasting information distribution server 1006 provides a radio broadcasting information distribution service for distributing a radio program of radio broadcasting or the radio broadcasting information concerning the music that is broadcast from the radio station to the client terminal 1002.

Moreover, an internet radio server 1007 provides an internet radio broadcasting service for broadcasting the radio broadcasting data in the form of stream distribution via the network NT 1000 corresponding to the Internet to the client terminal 1002.

In addition, an accounting server 1008 performs a charging process for charging various fees to the user in response to a request from the portable server 1003 or the like.

(3-2) Functional Circuit Block Configuration of Client Terminal 1002

Figure 15:
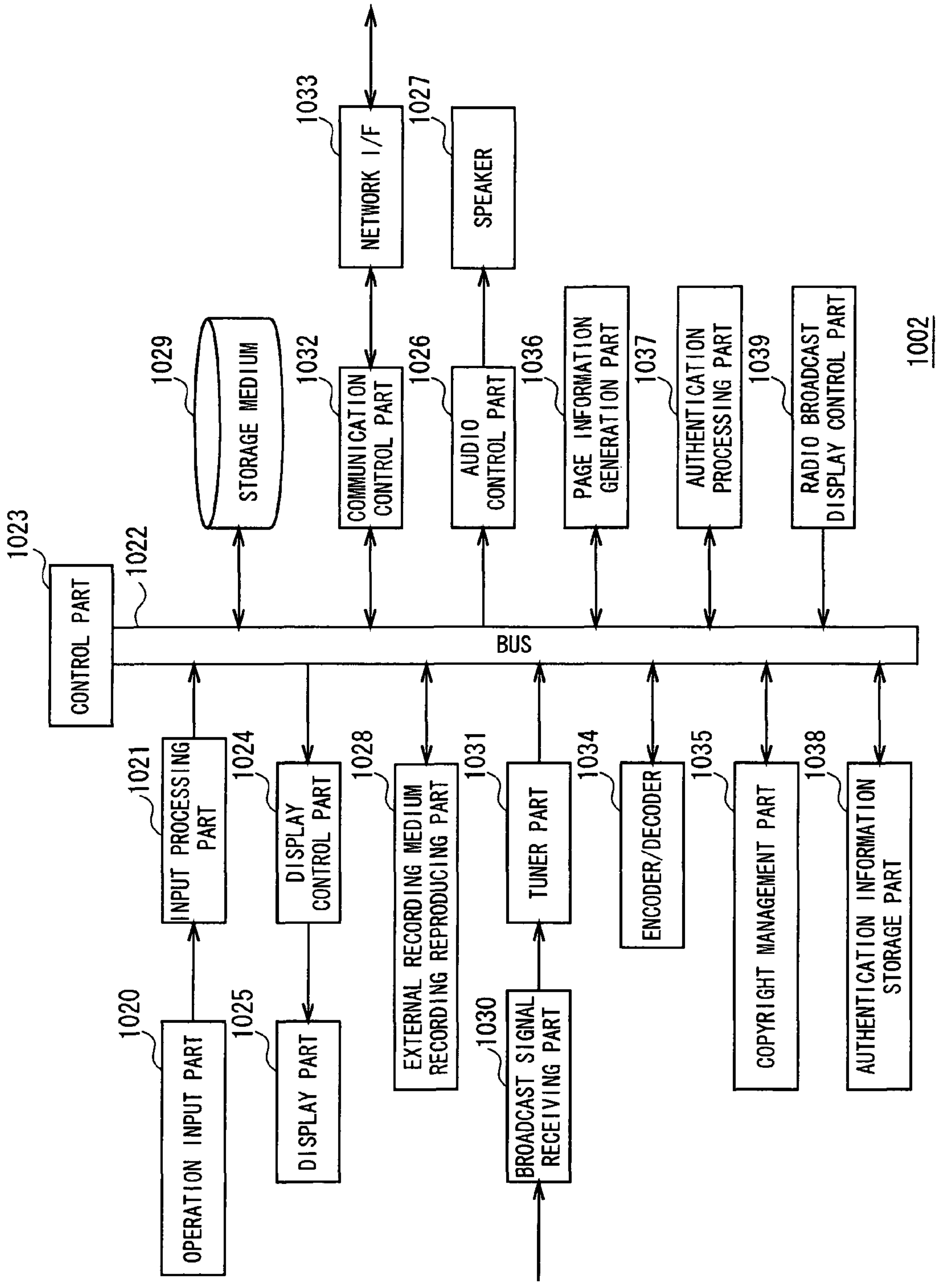
FIG. 15 is a block diagram showing a hardware configuration of a client terminal with functional circuit blocks.

A hardware configuration of the client terminal 1002 with the functional circuit blocks will be described below. The client terminal 1002 has an operation input part 1020 having various kinds of operation buttons provided on the surface of a housing and in a remote controller (not shown), in which when the operation input part 1020 is operated by the user, the operation input part 1020 recognizes the operation performed by the user, and sends an operation input signal according to the operation to an input processing part 1021, as shown in FIG. 15.

The input processing part 1021 converts the operation input signal given from the operation input part 1020 into a specific operation command and sends the operation command via a bus 1022 to a control part 1023.

The control part 1023 controls the operation of each circuit, based on the operation command given from each circuit connected via the bus 1022.

A display control part 1024 makes a digital-analog conversion process for the video data supplied via the bus 1022, and sends an analog video signal resulted from the process to a display part 1025.

The display part 1025 is a display device such as a liquid crystal display, for example, and may be mounted directly or externally on the surface of the housing.

And the display part 1025 displays a video based on an analog video signal when the processing result of the control part 1023 or various kinds of video data is supplied as the analog video signal via the display control part 1024.

An audio control part 1026 makes the digital-analog conversion process for the audio data supplied via the bus 1022, and sends an analog audio signal resulted from the process to a speaker 1027. The speaker 1027 outputs the audio based on the analog audio signal supplied from the audio control part 1026.

An external recording medium recording-reproducing part 1028 is a recording-reproducing unit for reading and reproducing the contents data recorded in an external recording medium such as a CD or a memory stick (registered trademark) having a flash memory contained in an outer casing, or recording the contents data of recording object in the external recording medium.

The external recording medium recording-reproducing part 1028 supplies the read video data via the bus 1022 to the display control part 1024, when reading the video data as the contents data from the external recording medium.

Thereby, the display control part 1024 converts the video data as the contents data read from the external recording medium by the external recording medium recording-reproducing part 1028 into an analog video signal and supplies it to the display part 1025.

Also, the external recording medium recording-reproducing part 1028 supplies the read audio data via the bus 1022 to the audio control part 1026, when reading the audio data as the contents data from the external recording medium.

Thereby, the audio control part 1026 converts the video data as the contents data read from the external recording medium by the external recording medium recording-reproducing part 1028 into an analog audio signal and supplies it to the speaker 1027.

Moreover, the control part 1023 may send the contents data read from the external recording medium by the external recording medium recording-reproducing part 1028 via the bus 1022 to a storage medium 1029 within the client terminal 1002, and store the contents data in the storage medium 1029 (hereinafter storing the contents data in the storage medium 1029 is referred to as ripping).

And the control part 1023 supplies the read video data via the bus 1022 to the display control part 1024, when reading the video data such as image data or video data as the contents data from the storage medium 1029.

Also, the control part 1023 supplies the read audio data via the bus 1022 to the audio control part 1026, when reading the audio data such as audio data as the contents data from the storage medium 1029.

In addition, the control part 1023 may read the music data from the storage medium 1029 and transfer it to the external recording medium recording-reproducing part 1028 to enable the external recording medium recording-reproducing part 1028 to record the music data in the external recording medium.

A broadcast signal receiving part 1030 receives a radio broadcast wave transmitted from each radio broadcasting station, and supplies it to a tuner part 1031.

The tuner part 1031 extracts a radio broadcast signal at a broadcast frequency corresponding to the radio station specified via the operation input part 1020 from among the radio broadcast wave received via the broadcast signal receiving part 1030 under the control of the control part 1023 and makes a predetermined receiving process for the radio broadcast signal to send the resulted audio data via the bus 1022 to the audio control part 1026.

The audio control part 1026 converts the audio data given from the tuner part 1031 into an analog audio signal and sends it to the speaker 1027 to output the program audio of radio program broadcast at the radio station, so that the user can hear the program audio of radio program.

Also, the control part 1023 may record the program audio of radio program by sending the audio data acquired from the tuner part 1031 to the storage medium 1029 and storing it in the storage medium 1029.

Moreover, the control part 1023 gains access to the portable server 1003 and other servers 1004 to 1007 by connecting via a communication control part 1032 and a network interface 1033 in succession to the network NT 1000. Thereby, various kinds of information and data are transmitted or received to or from the portable server 1003 or other servers 1004 to 1007.

An encoder/decoder part 1034 decodes the compressed and encoded contents data received via the network interface 1033 and the communication control part 1032 in succession from the network NT 1000, or the compressed and encoded contents data read from the storage medium 1029 or the external recording medium and sends the decoded data to the display control part 1024 or the audio control part 1026.

Also, the encoder/decoder part 1034 compresses and encodes the contents data not compressed and encoded that has been read from the external recording medium, the audio data given from the tuner part 1031, or the like and sends the compressed and encoded contents data to the storage medium 1029.

Thereby, the contents data compressed and encoded by the encoder/decoder part 1034 is stored in the storage medium 1029 under the control of the control part 1023.

A copyright management part 1035 generates the copyright management information corresponding to the contents data downloaded from the network NT 1000 via the network interface 1033 and the communication control part 1032 in succession, or read from the external recording medium by the external recording medium recording-reproducing part 1028.

The copyright management information generated by the copyright management part 1035 is registered in association with the contents data in the storage medium 1029 under the control of the control part 1023.

Also, the copyright management part 1035 protects the copyright for the contents data by appropriately updating the substance of the copyright management information corresponding to the contents data, when checking out the contents data in association with the copyright management information between the storage medium 1029 and the specific external recording medium, or checking in the contents data in association with the copyright management information between the specific external recording medium and the storage medium 1029.

A page information generation part 1036 generates the video data to be displayed on the display part 1025 by interpreting the page information of an XML (extensible Markup Language) file, an HTML (Hyper Text Markup Language) file, or the like received from the network NT 1000 via the network interface 1033 and the communication control part 1032 in succession, and sends the generated video data to the display control part 1024.

An authentication processing part 1037 performs an authentication process for transmitting the authentication information to the portable server 1003 and other servers 1004 to 1007 on the network NT 1000 connected via the network interface 1033 via the communication control part 1032 and the network interface 1033 in succession.

An authentication information storage part 1038 stores the authentication information required when the authentication processing part 1037 gains access to the portable server 1003 and other servers 1004 to 1007.

A radio broadcast display control part 1039 transmits a request signal for requesting the radio broadcast information concerning the radio broadcast being currently received for the user to hear to the radio broadcast information distribution server 1006 corresponding to the radio station broadcasting the radio program being received via the communication control p art 1032 and the network interface 1033 in succession.

As a result, the radio broadcast display control part 1039 displays the radio broadcast information, on the display part 1025 including the program name of radio program being currently received and the title and artist name of musical composition being currently received by receiving the radio broadcast information transmitted from the radio broadcast information distribution server 1006 on the network NT 1000 via network interface 1033 and the communication control part 1032 in succession and passing the received radio broadcast information to the display control part 1024.

Figure 16:
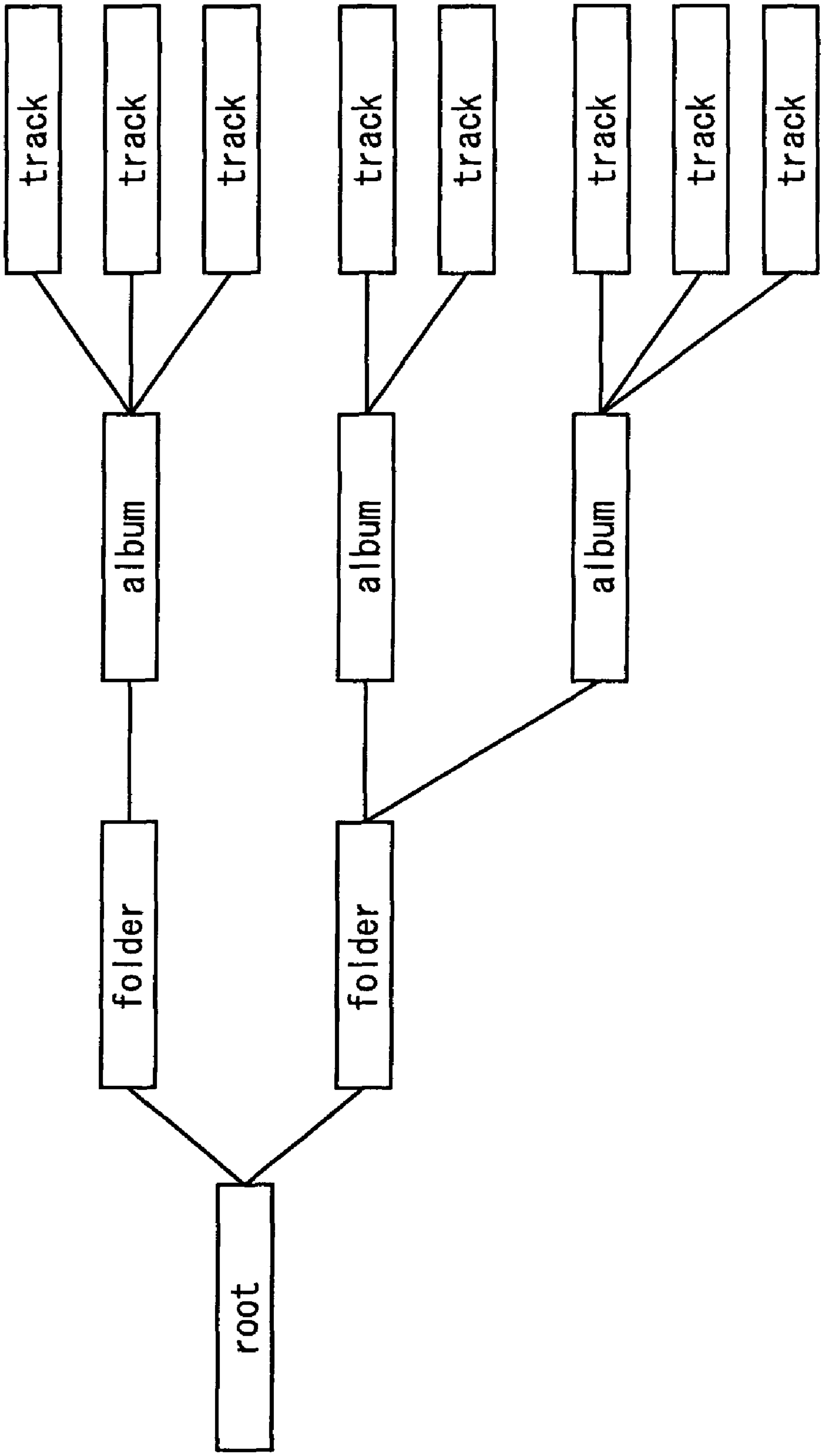
FIG. 16 is a diagrammatic view showing a directory configuration.

The control part 1023 in the client terminal 1002 manages the contents data stored in the storage medium 1029 in a directory configuration as shown in FIG. 16. First of all, any number of "folder" directories are created on a lower layer of a "root" directory, wherein the number is within a specified range. This "folder" directory is created corresponding to the genre of the contents or the owner user.

On a lower layer of the "folder" directory, any number of "album" directories is created, wherein the number is within a specified range. The "album" directory corresponds to one album title, for example. On a lower layer of the "album" directory, one or more "track" files belonging to the "album" directory are stored, in which this "track" file becomes one musical composition or contents.

The directory management for the contents data is made based on a database file stored in the storage medium 1029.

(3-3) Functional Circuit Block Configuration of Portable Server 1003

Figure 17:
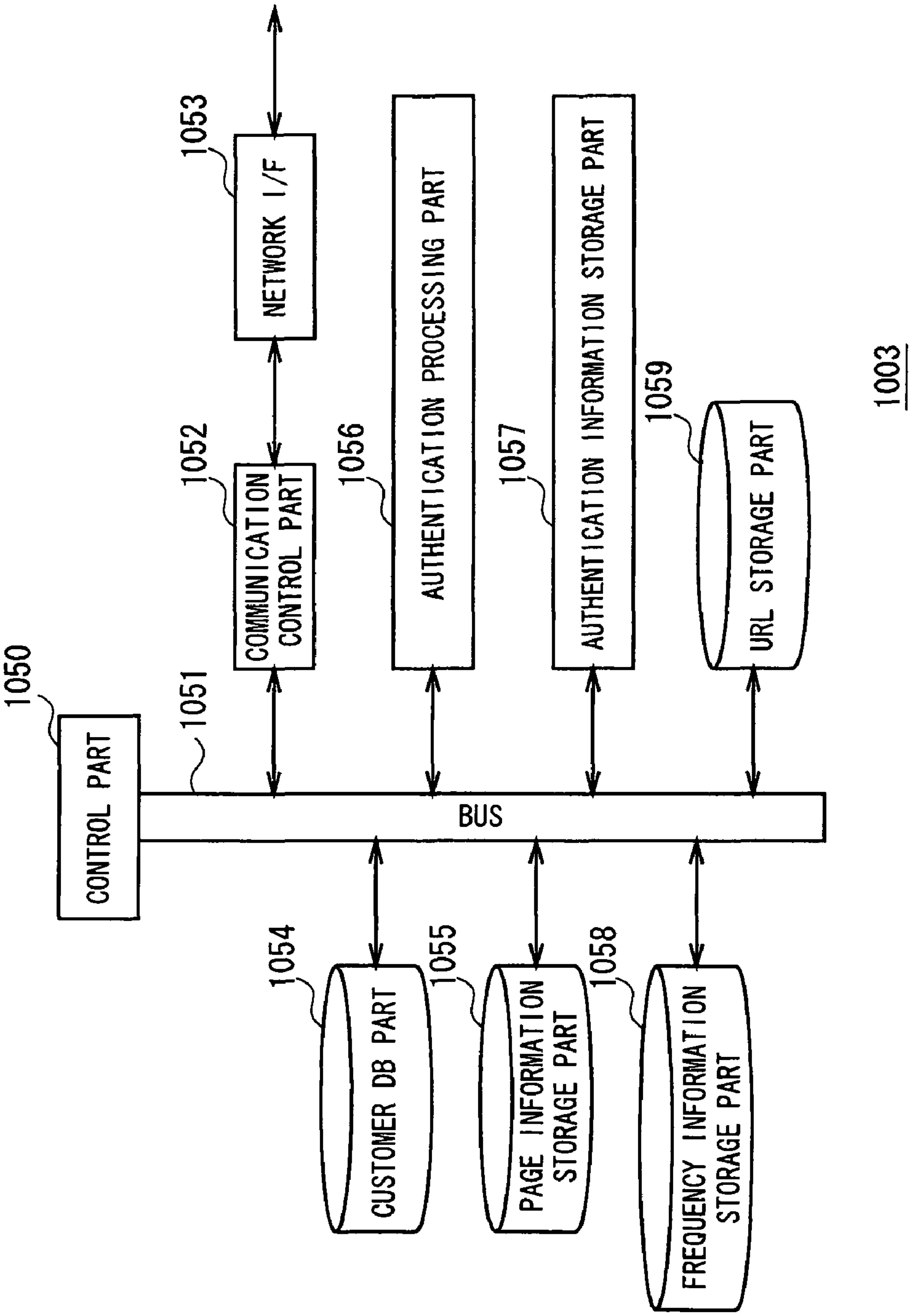
FIG. 17 is a block diagram showing a hardware configuration of a portable server with functional circuit blocks.

Referring to FIG. 17, a hardware configuration of the portable server 1003 with the functional circuit blocks will be described below. A control part 1050 within the portable server 1003 controls the operation of each circuit connected via a bus 1051.

A communication control part 1052 transmits or receives various kinds of information to or from the client terminal 1002 and other servers 1004 to 1008 via a network interface 1053 under the control of the control part 1050.

A customer database part 1054 registers, as the customer information, the user ID (Identification) information of the user who has already completed a contract with the operation agent of the music related service providing system 1000 and the password information associated therewith.

A page information storage part 1055 stores the page information and the like managed by the operation agent of the music related service providing system 1000.

The page information is described in an XML language or the like, and includes the URL (Uniform Resource Locator) information for gaining access to the music data distribution server 1004, the physical sale server 1005, the radio broadcast information distribution server 1006 and the internet radio server 1007.

An authentication processing part 1056 receives the user ID information and password information transmitted from the client terminal 1002 via the network interface 1053 and the communication control part 1052 in succession, and confirms, as a user authentication process, whether or not the received user ID information and password information are registered as the customer information in the customer database part 1054.

Then the authentication processing part 1056 issues the portable authentication result information (authentication session ID information as will be described later) indicating the result of the user authentication process, if the user authentication process is ended, and temporarily stores the issued portable authentication result information in the authentication information storage part 1057.

At this time, the control part 1050 transmits the page information for contractor stored in the page information storage part 1055, together with the portable authentication result, to the client terminal 1002 via the communication control part 1052 and the network interface 1053 in succession, when the user is authenticated as the regular user as a result of the user authentication process by the authentication processing part 1056.

The control part 1050 may transmit the authentication error information, together with the authentication failure notification page information indicating a failure of authentication stored in the page information storage part 1055, to the client terminal 1002 via the communication control part 1052 and the network interface 1053 in succession, when the user is not authenticated as the regular user as a result of the user authentication process by the authentication processing part 1056.

Also, the authentication processing part 1056 compares the received portable authentication result information and the portable authentication result information corresponding to the user that is temporarily stored in the authentication information storage part 1057, if receiving the portable authentication result information (an authentication ticket as will be described later) acquired and transmitted from the client terminal 1002 of the user as a result of performing the user authentication process from the music data distribution server 1004, the physical sale server 1005 and the radio broadcast information distribution server 1006 via the network interface 1053 and the communication control part 1052 in succession.

Thereby, the authentication processing part 1056 performs a confirmation process for confirming whether or not the portable authentication result information is normal, as the authentication process for the portable authentication result information received from the music data distribution server 1004, the physical sale server 1005 and the radio broadcast information distribution server 1006, and returns the confirmation result information indicating its confirmation result via the communication control part 1052 and the network interface 1053 in succession to the music data distribution server 1004, the physical sale server 1005 and the radio broadcast information distribution server 1006.

A frequency information storage part 1058 stores relationally the frequency information indicating a district code such as postal code capable of specifying the district, the broadcasting frequency of radio broadcast receivable in the district indicated by its district code, the name of radio station broadcasting the radio program (hereinafter referred to as a radio station name), and a call sign that is identification information unique to each radio station.

A URL storage part 1059 stores relationally the call sign for each radio station for radio broadcasting, and the URL information capable of acquiring the radio broadcasting information (hereinafter particularly referred to as now-on-air information) consisting of the program name of the radio program and the title of musical composition being currently put on the air within the radio program, regarding the radio program being currently broadcast that is provided from the radio station corresponding to the call sign.

(3-4) Functional Circuit Block Configuration of Music Data Distribution Server 1004

Figure 18:
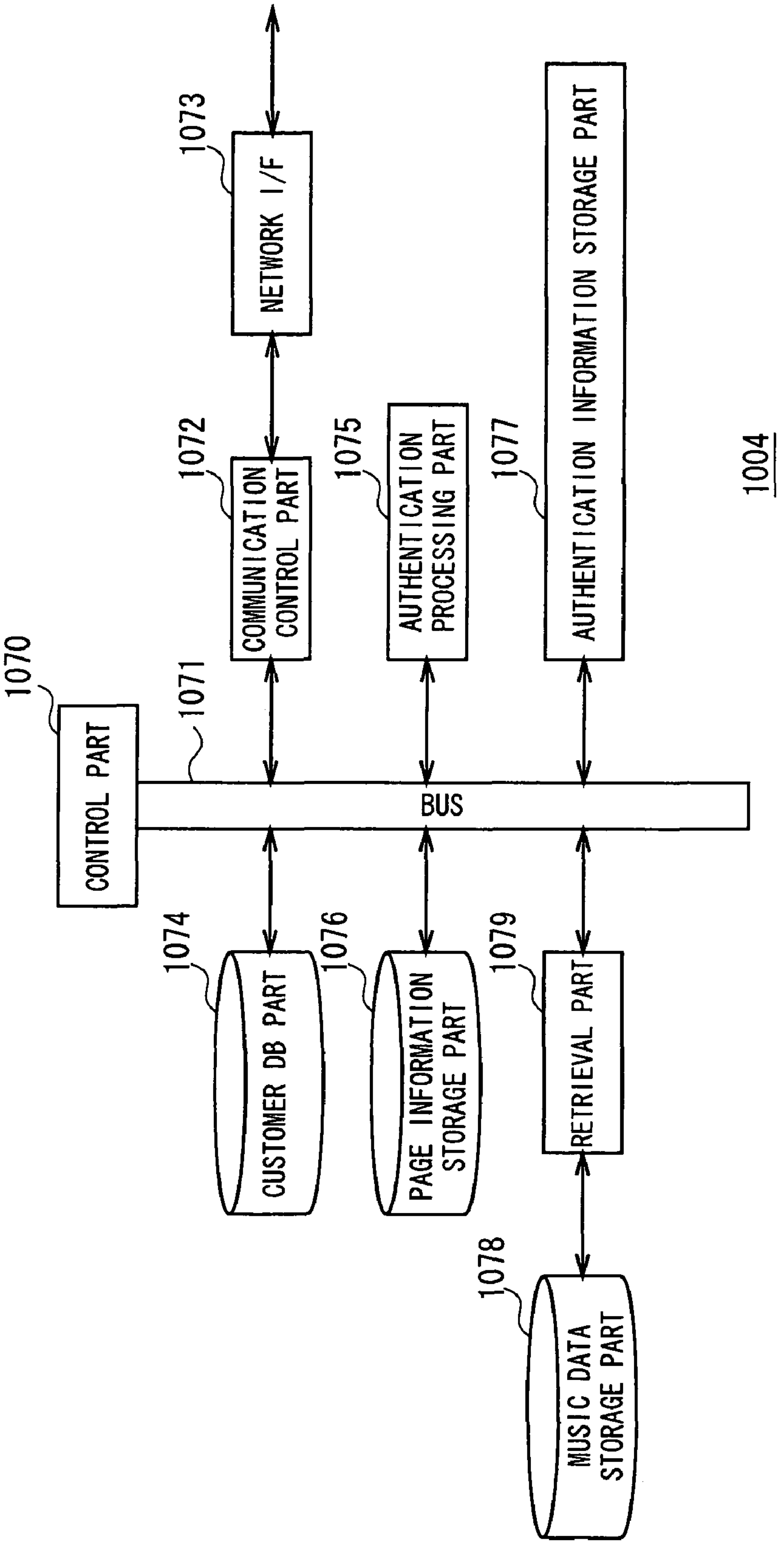
FIG. 18 is a block diagram showing a hardware configuration of a music data distribution server with functional circuit blocks.

Referring to FIG. 18, a hardware configuration of the music data distribution server 1004 with the functional circuit blocks will be described below. A control part 1070 within the music data distribution server 1004 controls the operation of each circuit connected via a bus 1071.

A communication control part 1072 transmits or receives various kinds of information and data such as contents data to or from the client terminal 1002 and the portable terminal 1003 via a network interface 1073 under the control of the control part 1070.

A customer database part 1074 registers, as the customer information, the user ID information of the user who has already completed a contract with the operation agent of the music data distribution server 1004 and the password information associated therewith. If an authentication processing part 1075 has a function of authenticating the user based on the portable authentication result information issued by the portable server 1003 and transmitted from the client terminal 1002, the customer database part 1074 may not be provided.

A page information storage part 1076 stores the page information and the like for music data distribution to introduce the music data that can be downloaded, the page information and the like being managed by the music data distribution server 1004.

In this connection, the page information for music data distribution is described in an XML language, and allows the user using the client terminal 1002 to select the music data desired to download.

And the control part 1070 transmits the page information for music data distribution stored in the page information storage part 1076 via the communication control part 1072 and the network interface 1073 in succession to the client terminal 1002 in response to a page information acquisition request signal, if receiving the page information acquisition request signal of requesting the page information for music data distribution that is transmitted from the client terminal 1002 via the network interface 1073 and the communication control part 1072 in succession.

The authentication processing part 1075 receives the user ID information and password information of the user using the client terminal 1002, which are transmitted from the client terminal 1002 via the network interface 1073 and the communication control part 1072 in succession, and confirms, as a user authentication process, whether or not the received user ID information and password information are registered as the customer information in the customer database part 1074.

Also, the authentication processing part 1075 receives the portable authentication result information (an authentication ticket as will be described later) issued by the portable server 1003 and transmitted from the client terminal 1002 via the network interface 1073 and the communication control part 1072 in succession and transmits the received portable authentication result information via the communication control part 1072 and the network interface 1073 in succession to the portable server 1003, as a user authentication process different from the user authentication process employing the user ID information and password information.

And the authentication processing part 1075 receives the confirmation result information via the network interface 1073 and the communication control part 1072 in succession, the confirmation result information being returned from the portable server 1003 as a result of performing the authentication process (i.e., the confirmation process) for the portable authentication result information in response to transmitting the portable authentication result information to the portable server 1003, and confirms whether or not the user is the regular user who has already contracted with the operation agent of the music related service providing system 1000, based on the received confirmation result information.

In this way, the authentication processing part 1075 issues the server authentication result information (service session ID information as will be described later) indicating the result of the user authentication process, if the user authentication process is ended.

At this time, the control part 1070 transmits the page information for music data distribution stored for the contractor in the page information storage part 1076, together with the server authentication result information, to the client terminal 1002 via the communication control part 1072 and the network interface 1073 in succession, when the user is authenticated as the regular user as a result of the user authentication process by the authentication processing part 1075.

On the contrary, the control part 1070 may transmit the authentication error information, together with the authentication failure notification page information indicating a failure of authentication stored in the page information storage part 1076, to the client terminal 1002 via the communication control part 1072 and the network interface 1073 in succession, when the user is not authenticated as the regular user as a result of the user authentication process by the authentication processing part 1075.

By the way, an authentication information storage part 1077 temporarily stores the server authentication result information issued by the authentication processing part 1075, and various kinds of authentication information required when the authentication processing part 1075 makes the user authentication process for the user who uses the client terminal 1002.

A music data storage part 1078 stores a plurality of music data compressed and encoded in the ATRAC3 or MP3 format and the retrieval key such as the contents ID information associated with each music data.

A retrieval part 1079 receives a download request signal requesting to download the desired music data and storing a retrieval key for retrieval of the music data desired to download, via the network interface 1073 and the communication control part 1072 in succession, the download request signal being transmitted from the client terminal 1002 as a result of transmitting the page information for music data distribution to the client terminal 1002, and extracts the retrieval key from the received download request signal.

And the retrieval part 1079 retrieves the music data desired to download, according to the retrieval conditions indicated by the retrieval key, from among a plurality of music data within the music data storage part 1078, based on the retrieval key.

Thereby, the control part 1070 transmits the retrieved music data desired to download via the communication control part 1072 and the network interface 1073 in succession to the client terminal 1002.

Also, the control part 1070 transmits the accounting information for accounting process for the user caused by downloading the music data to the client terminal 1002 via the communication control part 1072 and the network interface 1073 in succession to the accounting server 1008 to perform the accounting process for downloading the music data to the user.

(3-5) Functional Circuit Block Configuration of Physical Sale Server 1005

Figure 19:
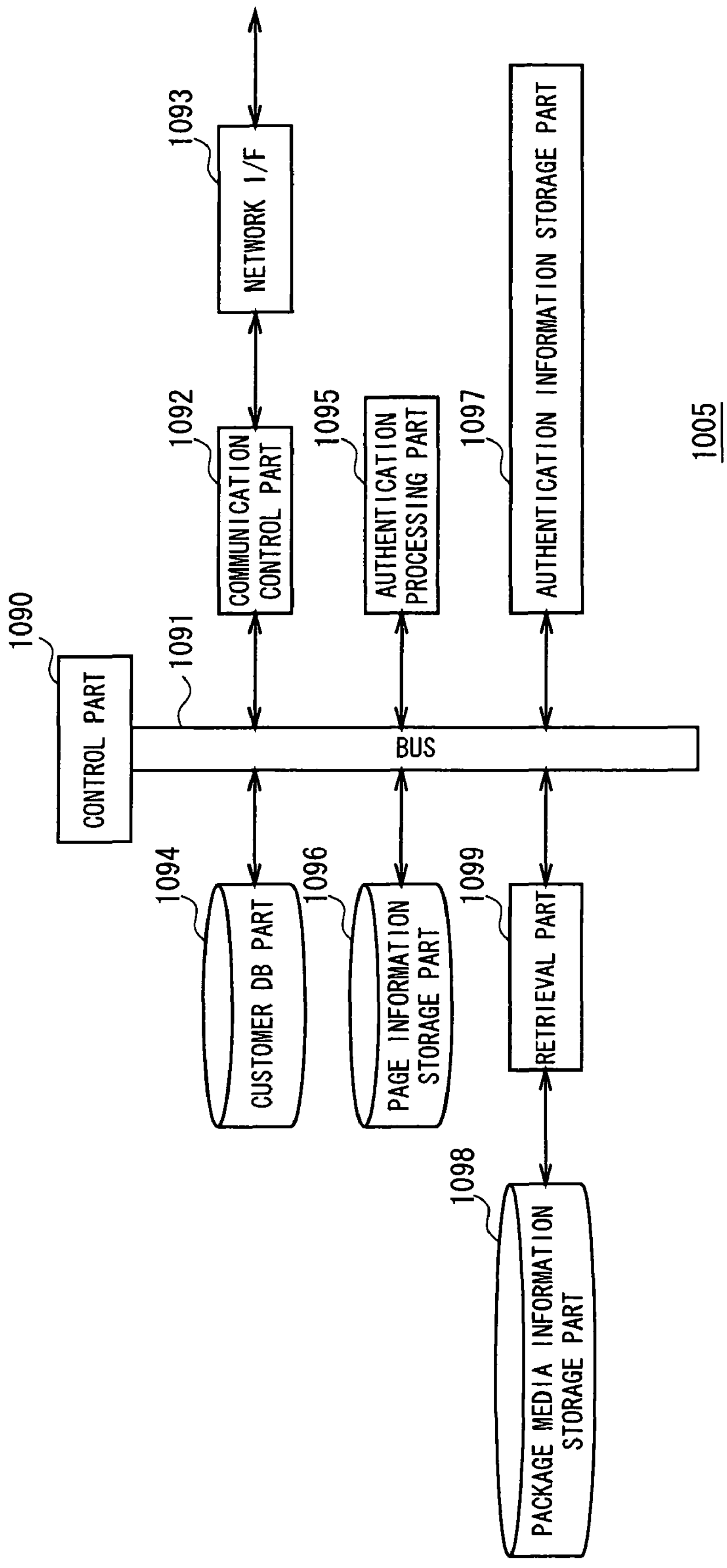
FIG. 19 is a block diagram showing a hardware configuration of a physical sale server with functional circuit blocks.

Referring to FIG. 19, a hardware configuration of the physical sale server 1005 with the functional circuit blocks will be described below. A control part 1090 within the physical sale server 1005 controls the operation of each circuit connected via a bus 1091.

A communication control part 1092 transmits or receives various kinds of information to or from the client terminal 1002, the portable terminal 1003 and the like via a network interface 1093 under the control of the control part 1090.

A customer database part 1094 registers, as the customer information, the user ID information of the user who has already completed a contract with the operation agent of the physical sale server 1005 and the password information associated therewith. If an authentication processing part 1095 has a function of authenticating the user based on the portable authentication result information issued by the portable server 1003 and transmitted from the client terminal 1002, the customer database part 1094 may not be provided.

A page information storage part 1096 stores the page information and the like for package media sales to introduce the package media of sales object such as CD or DVD, the page information being managed by the physical sale server 1005.

In this connection, the page information for package media sales is described in an XML language, and allows the user using the client terminal 1002 to select the package media such as CD or DVD desired to purchase.

And the control part 1090 receives a page information acquisition request signal of requesting the page information for package media sales to be transmitted from the client terminal 1002 via the network interface 1093 and the communication control part 1092 in succession, and then transmits the page information for package media sales stored in the page information storage part 1096 via the communication control part 1092 and the network interface 1093 in succession to the client terminal 1002 in response to the received page information acquisition request signal.

The authentication processing part 1095 receives the user ID information and password information of the user using the client terminal 1002, which are transmitted from the client terminal 1002 via the network interface 1093 and the communication control part 1092 in succession, and confirms, as a user authentication process, whether or not the received user ID information and password information are registered as the customer information in the customer database part 1094.

Also, the authentication processing part 1095 receives the portable authentication result information (an authentication ticket as will be described later) issued by the portable server 1003 and transmitted from the client terminal 1002 via the network interface 1093 and the communication control part 1092 in succession and transmits the received portable authentication result information via the communication control part 1092 and the network interface 1093 in succession to the portable server 1003, as a user authentication process different from the user authentication process employing the user ID information and password information.

And the authentication processing part 1095 receives the confirmation result information via the network interface 1093 and the communication control part 1092 in succession, the confirmation result information being returned from the portable server 1003 as a result of performing the authentication process (i.e., the confirmation process) for the portable authentication result information in response to transmitting the portable authentication result information to the portable server 1003, and confirms whether or not the user is the regular user who has already contracted with the operation agent of the music related service providing system 1000, based on the received confirmation result information.

In this way, the authentication processing part 1095 issues the server authentication result information (service session ID information as will be described later) indicating the result of the user authentication process, if the user authentication process is ended.

At this time, the control part 1090 transmits the page information for package media sales stored for the contractor in the page information storage part 1096, together with the server authentication result information, to the client terminal 1002 via the communication control part 1092 and the network interface 1093 in succession, when the user is authenticated as the regular user as a result of the user authentication process by the authentication processing part 1095.

On the contrary, the control part 1090 may transmit the authentication error information, together with the authentication failure notification page information indicating a failure of authentication stored in the page information storage part 1096, to the client terminal 1002 via the communication control part 1092 and the network interface 1093 in succession, when the user is not authenticated as the regular user as a result of the user authentication process by the authentication processing part 1095.

By the way, an authentication information storage part 1097 temporarily stores the server authentication result information issued by the authentication processing part 1095, and various kinds of authentication information required when the authentication processing part 1095 makes the user authentication process for the user who uses the client terminal 1002.

A package media information storage part 1098 stores a plurality of package media information of sales object such as CD or DVD (hereinafter referred to as package media information) and the retrieval key such as the package media ID information associated with each package media information.

A retrieval part 1099 receives a media information request signal requesting the package media information regarding the specific package media such as CD or DVD via the network interface 1093 and the communication control part 1092 in succession, the media request signal being transmitted from the client terminal 1002 as a result of transmitting the page information for package media sales to the client terminal 1002, and extracts the retrieval key for retrieval of the specific package media from the received media information request signal.

And the retrieval part 1099 retrieves the package media information of the specific package media according to the retrieval conditions indicated by the retrieval key from among a plurality of package media information within the package media information storage part 1098, based on the retrieval key.

Thereby, the control part 1090 transmits the retrieved package media information via the communication control part 1092 and the network interface 1093 in succession to the client terminal 1002, and presents the package media information regarding the specific package media to the user.

Consequently, the control part 1090 receives a purchase request signal for requesting to purchase the specific package media transmitted from the client terminal 1002 via the network interface 1093 and the communication control part 1092 in succession, and then performs a purchase process including delivering the specific package media to the user using the client terminal 1002.

Also, the control part 1090 transmits the accounting information for accounting process for the user purchasing the specific package media via the communication control part 1092 and the network interface 1093 in succession to the accounting server 1008 to perform the accounting process for purchasing the specific package media to the user.

Moreover, the control part 1090 transmits the purchase completion page information indicating that the purchase process for the package media is completed via the communication control part 1092 and the network interface 1093 in succession to the client terminal 1002, if the accounting process for the user is completed by the accounting server 1008.

(3-6) Functional Circuit Block Configuration of Radio Broadcast Information Distribution Server 1006

Figure 20:
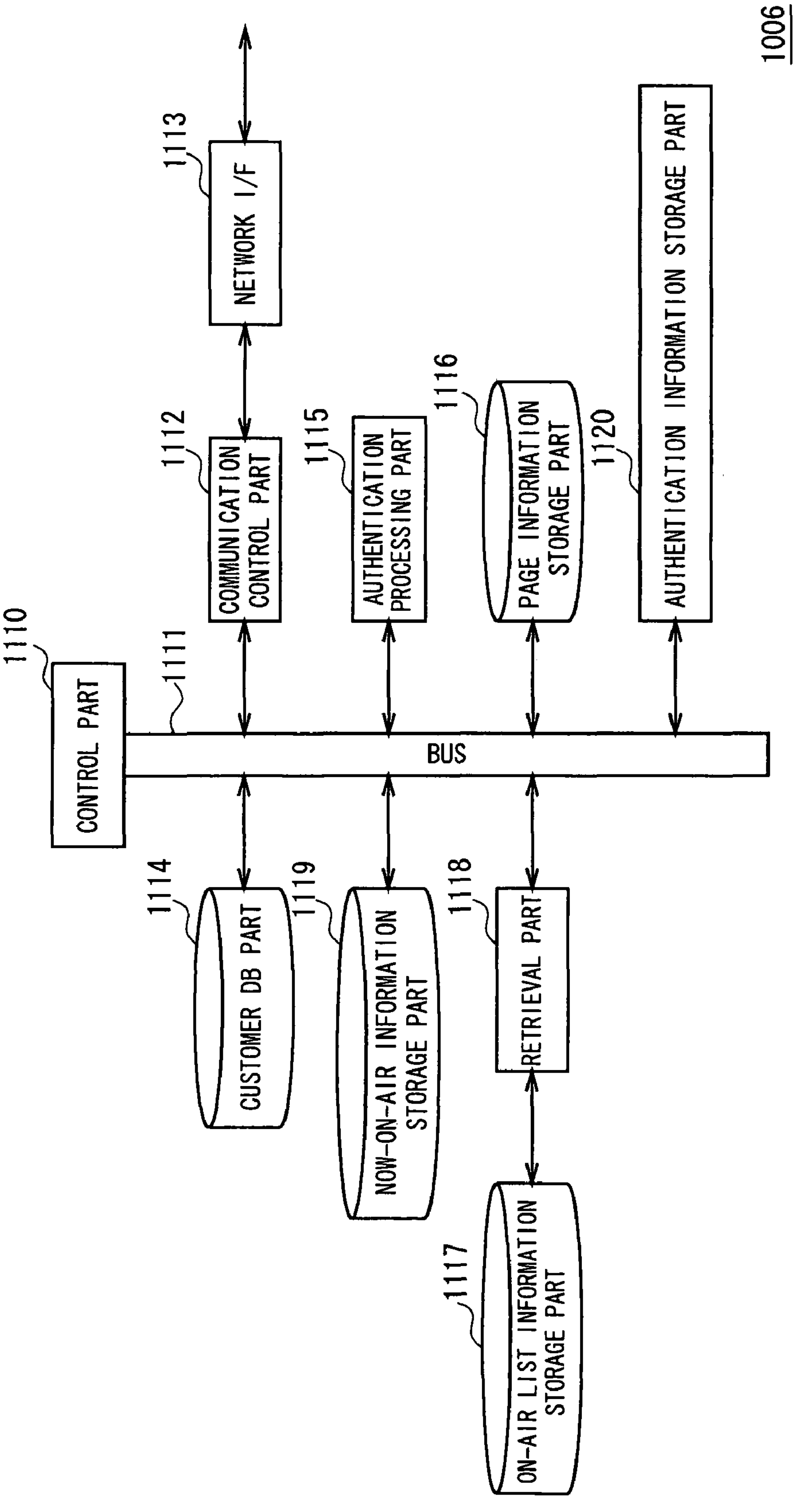
FIG. 20 is a block diagram showing a hardware configuration of a radio broadcast information distribution server with functional circuit blocks.

Referring to FIG. 20, a hardware configuration of the radio broadcast information distribution server 1006 with the functional circuit blocks will be described below. A control part 1110 within the radio broadcast information distribution server 1006 controls the operation of each circuit connected via a bus 1111.

A communication control part 1112 transmits or receives various kinds of information to or from the client terminal 1002 and the portable terminal 1003 via a network interface 1113 under the control of the control part 1110.

A customer database part 1114 registers, as the customer information, the user ID information of the user who has already completed a contract with the operation agent of the radio broadcast information distribution server 1006 and the password information associated therewith. If an authentication processing part 1115 has a function of authenticating the user based on the portable authentication result information issued by the portable server 1003 and transmitted from the client terminal 1002, the customer database part 1114 may not be provided.

A page information storage part 1116 stores the page information and the like for distribution of on-air list information useful to acquire the radio broadcast information regarding the radio program (hereinafter referred to as on-air list information) broadcast at the radio station corresponding to the radio broadcast information distribution server 1006, and managed by the radio broadcast information distribution server 1006.

In this connection, the page information for distribution of on-air list information is described in an XML language, and has an input box and the like for allowing the user using the client terminal 1002 to input the on-air list information desired to acquire with the broadcast date and time information of radio program or program name as the retrieval key.

An on-air list information storage part 1117 stores the on-air list information generated by listing the program name, program broadcast start time, program broadcast end time, and the like of the radio program that has been already broadcast at the radio station corresponding to the radio broadcast information distribution server 1006, and the title, artist name, musical composition broadcast start time of the musical composition, and the like put on the air within the radio program.

And the control part 1110 receives a page information acquisition request signal of requesting the page information for distribution of on-air list information to be transmitted from the client terminal 1002 via the network interface 1113 and the communication control part 1112 in succession, and then transmits the page information for distribution of on-air list information stored in the page information storage part 1116 via the communication control part 1112 and the network interface 1113 in succession to the client terminal 1002 in response to the received page information acquisition request signal.

Consequently, a retrieval part 1118 receives an on-air list information request signal via the network interface 1113 and the communication control part 1112 in succession, the on-air list information request signal for requesting to download the on-air list information being transmitted from the client terminal 1002, and storing the retrieval key for retrieval of the on-air list information desired to acquire and inputted on the page information for distribution of on-air list information, and extracts the retrieval key from the received on-air list information request signal.

And the retrieval part 1118 retrieves, as the on-air list information, a predetermined range portion of on-air list information according to the retrieval conditions indicated by the retrieval key from the entire on-air list information within the on-air list information storage part 1117, based on the retrieval key.

Thereby, the control part 1110 transmits the retrieved on-air list information desired to acquire via the communication control part 1112 and the network interface 1113 in succession to the client terminal 1002.

Also, a now-on-air information storage part 1119 stores the now-on-air information consisting of the program name, program broadcast start time and program broadcast end time of the radio program being currently broadcast at the radio station corresponding to the radio broadcast information distribution server 1006, and the title, artist name, and musical composition broadcast start time of the musical composition currently put on the air within the radio program, and the like.

And the authentication processing part 1115 receives the user ID information and password information of the user using the client terminal 1002, which are transmitted together with the now-on-air information request signal requesting to acquire the now-on-air information from the client terminal 1002, via the network interface 1113 and the communication control part 1112 in succession, and confirms, as a user authentication process, whether or not the received user ID information and password information are registered as the customer information in the customer database part 1114.

Also, the authentication processing part 1115 receives the portable authentication result information (an authentication ticket as will be described later) issued by the portable server 1003 and transmitted from the client terminal 1002, via the network interface 1113 and the communication control part 1112 in succession, and transmits the received portable authentication result information via the communication control part 1112 and the network interface 1113 in succession to the portable server 1003, as a user authentication process different from the user authentication process employing the user ID information and password information.

And the authentication processing part 1115 receives the confirmation result information via the network interface 1113 and the communication control part 1112 in succession, the confirmation result information being returned from the portable server 1003 as a result of performing the authentication process (i.e., the confirmation process) for the portable authentication result information in response to transmitting the portable authentication result information to the portable server 1003, and confirms whether or not the user is the regular user who has already contracted with the operation agent of the music related service providing system 1000, based on the received confirmation result information.

In this way, the authentication processing part 1115 issues the server authentication result information (service session ID information as will be described later) indicating the result of the user authentication process, if the user authentication process is ended.

At this time, the control part 1110 transmits the now-on-air information stored in the now-on-air information storage part 1119, together with the server authentication result information, to the client terminal 1002 via the communication control part 1112 and the network interface 1113 in succession, when the user is authenticated as the regular user as a result of the user authentication process by the authentication processing part 1115.

On the contrary, the control part 1110 may transmit the authentication error information, together with the authentication failure notification page information indicating a failure of authentication stored in the page information storage part 1116, to the client terminal 1002 via the communication control part 1112 and the network interface 1113 in succession, when the user is not authenticated as the regular user as a result of the user authentication process by the authentication processing part 1115.

In this way, when acquisition of the now-on-air information is requested by the user, the control part 1110 distributes the now-on-air information, if the user is authenticated as the regular user, whereas it disables the radio broadcast information distribution service provided by the radio broadcast information distribution server 1006, such as a distribution service for distributing the now-on-air information to the user to be received by the user, if the user is no authenticated as the regular user.

By the way, an authentication information storage part 1120 temporarily stores the server authentication result information issued by the authentication processing part 1115, and various kinds of authentication information required when the authentication processing part 1115 makes the user authentication process for the user who uses the client terminal 1002.

(3-7) Outline of Processing of Each Server

Referring to the sequence flowcharts as shown in FIGS. 21 to 26, the process performed between the client terminal 1002 and the portable server 1003, and the processes performed between the client terminal 1002 and the music data distribution server 1004, the physical sale server 1005 and the radio broadcast information distribution server 1006 will be outlined below.

Figure 21:
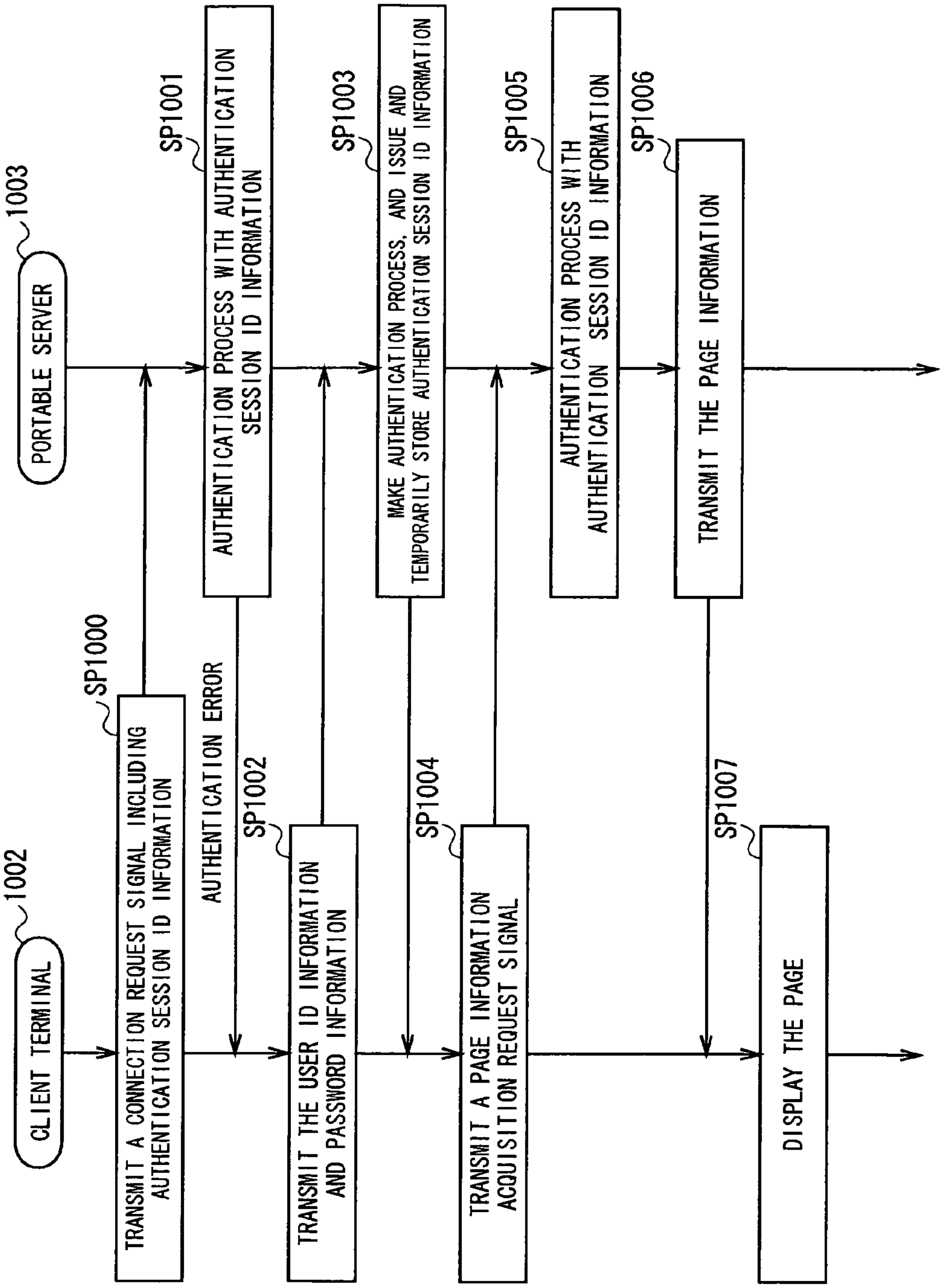
FIG. 21 is a sequence chart showing a user authentication procedure between the client terminal and the portable server.

Referring to FIG. 21, a user authentication procedure performed between the client terminal 1002 and the portable server 1003 will be firstly described.

At the client terminal 1002 of the user who contracts with the operation agent of the music related service providing system 1000, the control part 1023 starts an authentication request process by converting an operation input signal recognized by the operation input part 1020 into an operation command in the input processing part 1021 and giving it, when the user makes an operation of turning on the power of the client terminal 1002, or pressing a specific operation button of the operation input part 1020, for example.

If the authentication request process is started at the client terminal 1002, the control part 1023 generates a connection request signal storing the authentication session ID information and the like temporarily stored in the authentication information storage part 1038 and transmits the generated connection request signal via the communication control part 1032 and the network interface 1033 in succession to the portable server 1003 at step SP1000.

In this connection, the authentication session ID information is the identification information issued by the portable server 1003 for identification of an individual communication connection state (i.e., session), every time the client terminal 1002 is connected and communicated with the portable server 1003 to perform various kinds of processes, including the user authentication process.

For the authentication session ID information, a predetermined available period (e.g., about one minute) is set on the basis of the issuance time of the portable server 1003 to utilize it for the user authentication process or the like.

Accordingly, when the client terminal 1002 having acquired the authentication session ID information from the portable server 1003 can not present the authentication session ID information to the portable server 1003 within the available period, it is determined that the communication connection state specified by the authentication session ID information is disconnected, by the portable server 1003.

Thereby, the portable server 1003 prevents the authentication session ID information issued in the past from being employed illegally for the user authentication process or the like by the user who does not contract with the operation agent of the music related service providing system 1000.

Also, the authentication session ID information temporarily stored in the authentication information storage part 1038 is issued by the portable server 1003, when the client terminal 1002 is previously connected and communicated with the portable server 1003 to perform the user authentication process.

If the connection request signal is transmitted from the client terminal 1002, the control part 1050 of the portable server 1003 receives the connection request signal via the network interface 1053 and the communication control part 1052 in succession in response to it and sends out the authentication session ID information and the like stored in the received connection request signal to the authentication processing part 1056 at step SP1001.

And the authentication processing part 1056 performs the user authentication process based on the authentication session ID information received as the connection request signal from the client terminal 1002 under the control of the control part 1050.

Consequently, the control part 1050 transmits the authentication error information indicating an authentication error via the communication control part 1052 and the network interface 1053 in succession to the client terminal 1002, when the user using the client terminal 1002 is not authenticated as the regular user by the authentication processing part 1056 because the available period of the authentication session ID and the like information received by the client terminal 1002 has expired or the like.

At step SP1002, if the control part 1023 of the client terminal 1002 receives the authentication error information transmitted from the portable server 1003 via the network interface 1003 and the communication control part 1032 in succession, the control part 1023 reads the user ID information and password information stored in the authentication information storage part 1038 in response thereto, and transmits the read user ID information and password information via the communication control part 1032 and the network interface 1033 in succession to the portable server 1003.

At step SP1003, the control part 1050 of the portable server 1003 receives the user ID information, password information, and the like transmitted from the client terminal 1002 via the network interface 1053 and the communication control part 1052 in succession, and sends out the received user ID information, password information and the like to the authentication processing part 1056.

Thereby, the authentication processing part 1056 determines whether or not the user ID information and password information received by the client terminal 1002 is contained in the customer information registered in the customer database part 1054 under the control of the control part 1050, as the user authentication process.

Consequently, the authentication processing part 1056 issues, as the portable authentication result information, the authentication session ID information and the like for the communication connection state between the client terminal 1002 and the portable server 1003 at present under the control of the control part 1050, and temporarily stores the authentication session ID information and the like issued to the client terminal 1002 in the authentication information storage part 1057, if the user using the client terminal 1002 is authenticated as the regular user.

And the control part 1050 transmits the authentication session ID information and the like issued to the client terminal 1002 by the authentication processing part 1056 via the communication control part 1052 and the network interface 1053 in succession to the client terminal 1002.

At step SP1004, the control part 1023 of the client terminal 1002 receives the authentication session ID information and the like transmitted from the portable server 1003 via the network interface 1033 and the communication control part 1032 in succession, and sends out the received authentication session ID and the like information to the authentication processing part 1037.

And the authentication processing part 1037 temporarily stores the authentication session ID information and the like received from the portable server 1003 in the authentication information storage part 1038 under the control of the control part 1023.

Thereby, the control part 1023 transmits a page information acquisition request signal for requesting the portable server 1003 for the page information, together with the authentication session ID information and the like received from the portable server 1003 and temporarily stored in the authentication information storage part 1038, via the communication control part 1032 and the network interface 1033 in succession to the portable server 1003.

At step SP1005, the control part 1050 of the portable server 1003 receives the page information acquisition request signal and the authentication session ID information and the like transmitted from the client terminal 1002 via the network interface 1053 and the communication control part 1052 in succession, and sends out the received authentication session ID information and the like to the authentication processing part 1056.

Thereby, the authentication processing part 1056 performs the user authentication process by comparing the authentication session ID information and the like received from the client terminal 1002 and the authentication session ID information and the like issued to the client terminal 1002 at step SP1003 and temporarily stored in the authentication information storage part 1057 under the control of the control part 1050.

Consequently, at step SP1006, the authentication processing part 1056 determines that the page information acquisition request from the client terminal 1002 is valid, and extends the available period of the authentication session ID information and the like issued to the client terminal 1002, if the user using the client terminal 1002 is authenticated as the regular user.

Thereby, the control part 1050 reads the page information requested to acquire by the user from the page information storage part 1055, and transmits the read page information, together with the authentication session ID information in which the available period is extended by the authentication processing part 1056, via the communication control part 1052 and the network interface 1053 in succession to the client terminal 1002.

At step SP1007, the control part 1023 of the client terminal 1002 receives the page information transmitted from the portable server 1003 and the authentication session ID information having the available period extended via the network interface 1033 and the communication control part 1032 in succession, and sends out the received page information to the page information generation part 1036, and the authentication session ID information and the like having the available period extended to the authentication processing part 1037.

The page information generation part 1036 generates the video data of the page in which the links to the music data distribution server 1004, the physical sale server 1005 and the radio broadcast information distribution server 1006 are embedded, based on the page information given from the control part 1023, and sends out the generated video data to the display control part 1024.

Thereby, the display control part 1024 performs the digital-analog conversion process for the video data given from the page information generation part 1036, and sends out an acquired analog video signal to the display part 1025 to display the page of the portable server 1003 as the video based on the analog video signal on the display part 1025.

Also, the authentication processing part 1037 temporarily stores the authentication session ID information and the like having the available period extended that is received from the portable server 1003 in the authentication information storage part 1038 to overwrite on the authentication session ID information and the like before the available period is extended under the control of the control part 1023, and thereby updates the authentication session ID information and the like temporarily stored at step SP1004 with the authentication session ID information and the like having the available period extended.

(3-7-2) User Authentication Procedure of Client Terminal 1002 and Servers 1004 to 1006

Figure 22:
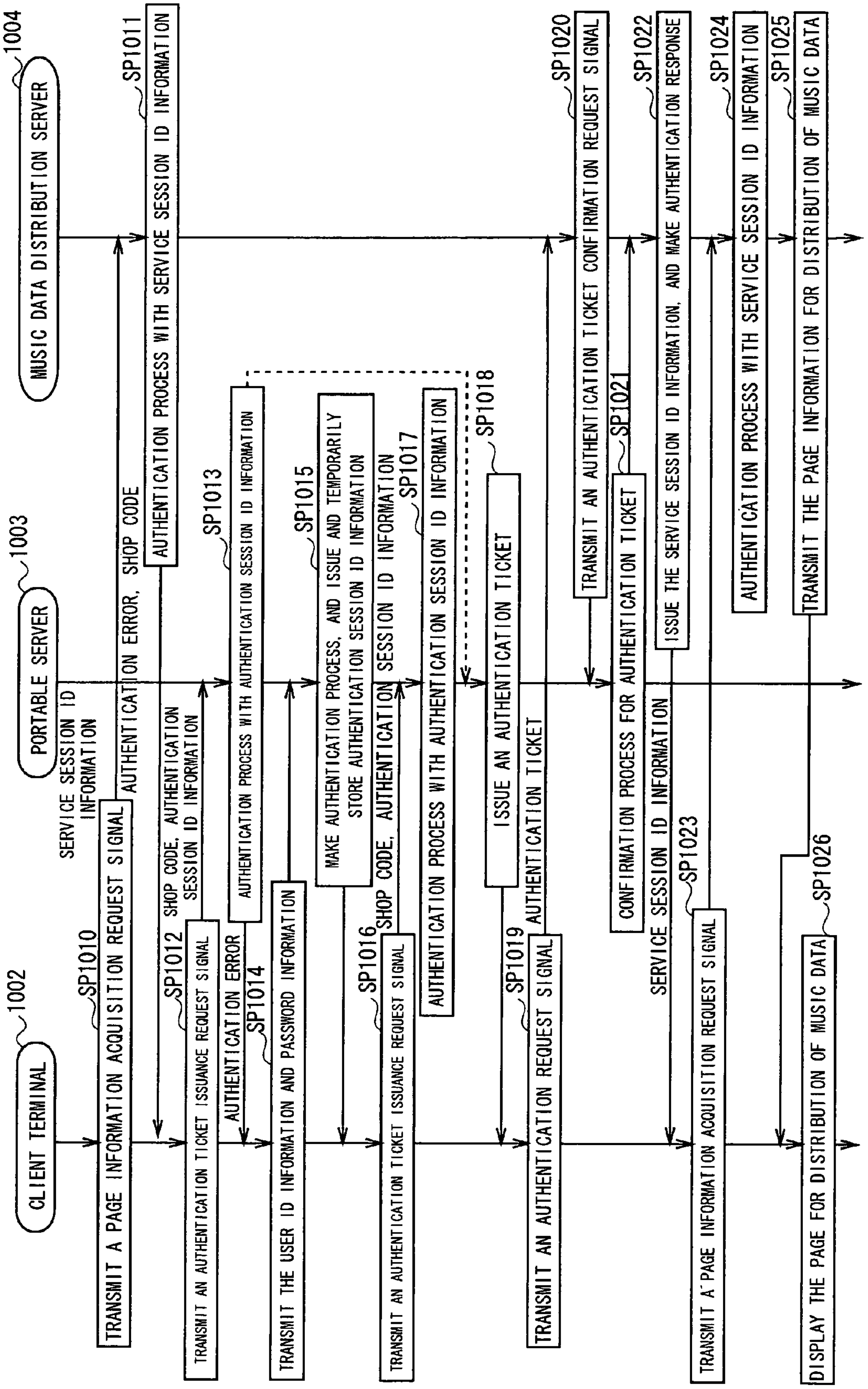
FIG. 22 is a sequence chart showing a user authentication procedure between the client terminal and the music data distribution server.

Referring to FIG. 22, the user authentication process made between the client terminal 1002 and the music data distribution server 1004, the physical sale server 1005 and the radio broadcast information distribution server 1006 will be described below.

In this case, the user authentication process is performed in such a way that the client terminal 1002 once acquires the page information from the portable server 1003 as described above and shown in FIG. 21, and subsequently gains access to the music data distribution server 1004, the physical sale server 1005 and the radio broadcast information distribution server 1006 according to the link embedded on the page information (this user authentication process is hereinafter referred to as an indirect access authentication process).

Also, another user authentication process is performed in such a way that the client terminal 1002 does not acquire the page information from the portable server 1003, and directly gains access to the music data distribution server 1004, the physical sale server 1005 and the radio broadcast information distribution server 1006 according to the URL information and the like registered beforehand as a book mark (hereinafter referred to as a direct access authentication process).

The indirect access authentication process is performed in accordance with the same procedure for any combination between the client terminal 1002 and the music data distribution server 1004, the physical sale server 1005 and the radio broadcast information distribution server 1006.

Also, the direct access authentication process is performed in accordance with the same procedure for any combination of the client terminal 1002 and the music data distribution server 1004, the physical sale server 1005 and the radio broadcast information distribution server 1006.

And the indirect access authentication process and the direct access authentication process are only different in the way that the client terminal 1002 acquires the URL information used to gain access to the music data distribution server 1004, the physical sale server 1005 and the radio broadcast information distribution server 1006, but are performed in accordance with the same procedure after acquiring the URL information.

In the following, for the simplicity of explanation, the music data distribution server 1004 is represented as the access destination of the client terminal 1002, and the indirect access authentication process and the direct access authentication process are collectively explained as one user authentication process.

First of all, at step SP1010, the control part 1023 of the client terminal 1002 transmits the service session ID information and the like read from the authentication information storage part 1038, together with the page information acquisition request signal for requesting to acquire the page information for distribution of music data (page information of sales of package media or page information for distribution of on-air list information in the physical sale server 1005 or radio broadcast information distribution server 1006), in accordance with the URL information embedded as the link in the page information, the URL information already registered as the book mark or the like via the communication control part 1032 and the network interface 1033 in succession to the music data distribution server 1004.

In this connection, the service session ID information is identification information issued by the music data distribution server 1004, the physical sale server 1005 or the radio broadcast information distribution server 1060 accessed by the client terminal 1002 for identification of individual communication connection state (i.e., session), every time the client terminal 1002 is connected and communicated with the music data distribution server 1004, the physical sale server 1005 or the radio broadcast information distribution server 1060 to perform various kinds of processes including the user authentication process.

For this service session ID information, like the authentication session ID information, a predetermined available period (e.g., about one minute) is set on the basis of the issuance time of the music data distribution server 1004, the physical sale server 1005 or the radio broadcast information distribution server 1060 to utilize it for the user authentication process and the like.

Accordingly, if the client terminal 1002, which has acquired the service session ID information from each of the servers 1004 to 1006, can not present the service session ID information to the music data distribution server 1004, the physical sale server 1005 or the radio broadcast information distribution server 1060 of issuance source within the available period, it is determined that the communication connection state specified by the service session ID information is disconnected by the music data distribution server 1004, the physical sale server 1005 or the radio broadcast information distribution server 1060, which has issued the service session ID information.

Thereby, the music data distribution server 1004, the physical sale server 1005 and the radio broadcast information distribution server 1060 prevent the service session ID information issued in the past from being illegally employed for the user authentication process by the user who does not contract with the operation agent of the music related service providing system 1000.

Also, the service session ID information temporarily stored in the authentication information storage part 1038 is issued by the music data distribution server 1004, the physical sale server 1005 or the radio broadcast information distribution server 1060, which is accessed by the client terminal 1002, when the client terminal 1002 is previously connected and communicated with the music data distribution server 1004, the physical sale server 1005 or the radio broadcast information distribution server 1060 to perform the user authentication process and the like.

At step SP1011, the control part 1070 of the music data distribution server 1004 receives the page information acquisition request signal and the service session ID information and the like transmitted from the client terminal 1002 via the network interface 1073 and the communication control part 1072 in succession, and sends the received service session ID information and the like to the authentication processing part 1075.

The authentication processing part 1075 performs the user authentication process by comparing the service session ID information and the like received from the client terminal 1002 and the service session ID information and the like already temporarily stored in the authentication information storage part 1077 under the control of the control part 1070.

Consequently, the authentication processing part 1075 determines that the acquisition request for the page information for distribution of music data from the client terminal 1002 is not valid, if the user using the client terminal 1002 is not authenticated as the regular user, because the available period of the service session ID information received from the client terminal 1002 has already expired, for example.

And the control part 1070 transmits the authentication error information indicating an authentication error and a shop code for identifying the music data distribution server 1004 via the communication control part 1072 and the network interface 1073 in succession to the client terminal 1002, if the user using the client terminal 1002 is not authenticated as the regular user by the authentication processing part 1075.

At step SP1012, the control part 1023 of the client terminal 1002 receives the authentication error information and the shop code transmitted from the music data distribution server 1004 via the network interface 1033 and the communication control part 1032 in succession, and recognizes that the user is not authenticated as the regular user in the music data distribution server 1004 according to the received authentication error information, and temporarily storing the shop code received from the music data distribution server 1004 in the authentication information storage part 1038.

Then the control part 1023 generates an authentication ticket issuance request signal for requesting the portable server 1003 to issue the authentication ticket for access to the music data distribution server 1004, and transmits the generated authentication ticket issuance request signal, together with the shop code of the music data distribution server 1004 and the authentication session ID information and the like already received from the portable server 1003 and temporarily stored in the authentication information storage part 1038, via the communication control part 1032 and the network interface 1033 in succession to the portable server 1003.

At step SP1013, the control part 1050 of the portable server 1003 receives the authentication ticket issuance request signal, the shop code, the authentication session ID information and the like issued from the client terminal 1002 via the network interface 1053 and the communication control part 1052 in succession and sends out them to the authentication processing part 1056.

Thereby, the authentication processing part 1056 performs the user authentication process by comparing the authentication session ID information and the like received from the client terminal 1002 and the authentication session ID information and the like already temporarily stored in the authentication information storage part 1057 under the control of the control part 1050.

Consequently, the authentication processing part 1056 determines that the issuance request for the authentication ticket from the client terminal 1002 is not valid, if the user using the client terminal 1002 is not authenticated as the regular user, because the available period of the authentication session ID information received from the client terminal 1002 has already expired, for example.

And the control part 1050 transmits the authentication error information indicating an authentication error via the communication control part 1052 and the network interface 1053 in succession to the client terminal 1002, if the user using the client terminal 1002 is not authenticated as the regular user by the authentication processing part 1056.

On the contrary, the authentication processing part 1056 determines that the issuance request for the authentication ticket from the client terminal 1002 is valid, if the user using the client terminal 1002 is authenticated as the regular user, because the available period of the authentication session ID information received from the client terminal 1002 has not yet expired, for example.

And the control part 1050 goes to step SP1018, if the user using the client terminal 1002 is authenticated as the regular user by the authentication processing part 1056.

At step SP1014, if receiving the authentication error information transmitted from the portable server 1003 via the network interface 1033 and the communication control part 1032 in succession, the control part 1023 of the client terminal 1002 reads the user ID information and password information and the like stored in the authentication information storage part 1038 and transmits the read user ID information and password information and the like via the communication control part 1032 and the network interface 1033 in succession to the portable server 1003.

At step SP1015, the control part 1050 of the portable server 1003 receives the user ID information and password information and the like transmitted from the client terminal 1002 via the network interface 1053 and the communication control part 1052 in succession, and sends out the received user ID information and password information and the like to the authentication processing part 1056.

Thereby, the authentication processing part 1056 performs the user authentication process by determining whether or not the user ID information and password information and the like received from the client terminal 1002 are contained in the customer information registered in the customer database part 1054 under the control of the control part 1050.

Consequently, the authentication processing part 1056 issues, as the portable authentication result information, the authentication session ID information and the like for the communication connection state between the client terminal 1002 and the portable server 1003 at the present time, and temporarily stores the authentication session ID information and the like issued to the client terminal 1002 in the authentication information storage part 1057 under the control of the control part 1050, if the user using the client terminal 1002 is authenticated as the regular user.

And the control part 1050 transmits the authentication session ID information and the like issued to the client terminal 1002 by the authentication processing part 1056 via the communication control part 1052 and the network interface 1053 in succession to the client terminal 1002.

At step SP1016, the control part 1023 of the client terminal 1002 receives the authentication session ID information and the like transmitted from the portable server 1003 via the network interface 1033 and the communication control part 1032 in succession and temporarily stores the received authentication session ID information and the like in the authentication information storage part 1038 by the authentication processing part 1037.

And the control part 1023 generates an authentication ticket issuance request signal for requesting the portable server 1003 to issue the authentication ticket again, and transmits the generated authentication ticket issuance request signal, together with the shop code already temporarily stored in the authentication information storage part 1038, the authentication session ID information temporarily stored at this time, and the like, via the communication control part 1032 and the network interface 1033 in succession to the portable server 1003.

Though in this embodiment, the shop code is temporarily stored in the authentication information storage part 1038 at the client terminal 1002, the shop code may be sequentially transmitted or received in performing the processings from step SP1012 to step SP1016 between the client terminal 1002 and the portable server 1003, whereby the shop code is transmitted to the portable server 1003 at step SP1016 without temporarily storing the shop code in the authentication information storage part 1038 at the client terminal 1002.

At step SP1017, the control part 1050 of the portable server 1003 receives the authentication ticket issuance request signal, the shop code and the authentication session ID information and the like that have been transmitted from the client terminal 1002 via the network interface 1053 and the communication control part 1052 in succession and sends them to the authentication processing part 1056.

Thereby, the authentication processing part 1056 performs the user authentication process by comparing the authentication session ID information and the like received from the client terminal 1002 and the authentication session ID information and the like already temporarily stored in the authentication information storage part 1057 under the control of the control part 1050.

Consequently, the authentication processing part 1056 determines that the issuance request of the authentication ticket from the client terminal 1002 is valid, if the user using the client terminal 1002 is authenticated as the regular user because the available period of the authentication session ID information received from the client terminal 1002 has not yet expired, for example.

Then the control part 1050 goes to step SP1018, if the user using the client terminal 1002 is authenticated as the regular user by the authentication processing part 1056.

At step SP1018, the authentication processing part 1056 issues, as the portable authentication result information, an authentication ticket for enabling access to the music data distribution server 1004 indicated by the shop code, based on the shop code and the authentication ticket issuance request signal received from the client terminal 1002 at step SP1017, under the control of the control part 1050.

Then the authentication processing part 1056 temporarily stores the issued authentication ticket and the like in the authentication information storage part 1057 and extends the available period of the authentication session ID information issued to the client terminal 1002 under the control of the control part 1050.

Thereby, the control part 1050 transmits the authentication ticket and the like, together with the authentication session ID information and the like having the available period extended by the authentication processing part 1056, via the communication control part 1052 and the network interface 1053 in succession to the client terminal 1002.

At step SP1019, the control part 1023 of the client terminal 1002 receives the authentication ticket and the like transmitted from the portable server 1003 and the authentication session ID information and the like having the available period extended via the network interface 1033 and the communication control part 1032 in succession, and sends out the received authentication session ID information to the authentication processing part 1037.

Then the control part 1023 transmits the authentication ticket and the like received from the portable server 1003, together with the authentication request signal, via the communication control part 1032 and the network interface 1033 to the music data distribution server 1004.

Also, the authentication processing part 1037 temporarily stores the authentication session ID information and the like having the available period extended that is received from the portable server 1003 in the authentication information storage part 1038 to overwrite on the authentication session ID information and the like before the available period is extended under the control of the control part 1023, and thereby updates the authentication session ID information and the like temporarily stored at step SP1016 with the authentication session ID information and the like having the available period extended.

At step SP1020, the control part 1070 of the music data distribution server 1004 receives the authentication request signal and authentication ticket and the like transmitted from the client terminal 1002 via the network interface 1073 and the communication control part 1072 in succession.

Then the control part 1070 transmits the authentication ticket and the like received from the client terminal 1002, together with an authentication ticket confirmation request signal requesting to confirm the authentication ticket, via the communication control part 1072 and the network interface 1073 in succession to the portable server 1003.

At step SP1021, the control part 1050 of the portable server 1003 receives the authentication ticket confirmation request signal transmitted from the music data distribution server 1004 and the authentication ticket and the like via the network interface 1053 and the communication control part 1052 in succession, and sends out the received authentication ticket confirmation request signal and the authentication ticket and the like to the authentication processing part 1056.

Then the authentication processing part 1056 performs the confirmation process for the authentication ticket received from the music data distribution server 1004 by comparing the authentication ticket and the like received from the music data distribution server 1004 and the authentication ticket and the like temporarily stored in the authentication information storage part 1057 under the control of the control part 1050 in response to the authentication ticket confirmation request signal.

Consequently, the control part 1050 transmits the confirmation result information indicating that the authentication ticket and the like is confirmed as the normal authentication ticket and the like via the communication control part 1052 and the network interface 1053 in succession to the music data distribution server 1004, if the authentication ticket and the like received from the music data distribution server 1004 is confirmed as the normal authentication ticket and the like by the authentication processing part 1056.

At step SP1022, the control part 1070 of the music data distribution server 1004 receives the confirmation result information transmitted from the portable server 1003, via the network interface 1073 and the communication control part 1072 in succession, and sends out the received confirmation result information to the authentication processing part 1075.

Thereby, the authentication processing part 1075 issues, as the server authentication result information, the service session ID information and the like for the communication connection state between the client terminal 1002 and the music data distribution server 1004 at the present time in accordance with the confirmation result information under the control of the control part 1070, and temporarily stores the issued service session ID information and the like in the authentication information storage part 1077.

Also, the control part 1070 transmits the service session ID information and the like issued to the client terminal 1002 by the authentication processing part 1075 via the communication control part 1072 and the network interface 1073 in succession to the client terminal 1002.

At step SP1023, the control part 1023 of the client terminal 1002 receives the service session ID information and the like transmitted from the music data distribution server 1004 via the network interface 1033 and the communication control part 1032 in succession and temporarily stores the received service session ID information and the like in the authentication information storage part 1038 by the authentication processing part 1037.

Thereby, the control part 1023 transmits a page information acquisition request signal requesting the page information for distribution of music data, together with the service session ID information and the like received from the music data distribution server 1004 and temporarily stored in the authentication information storage part 1038, via the communication control part 1032 and the network interface 1033 in succession to the music data distribution server 1004.

At step SP1024, the control part 1070 of the music data distribution server 1004 receives the page information and the like acquisition request signal and the service session ID information transmitted from the client terminal 1002 via the network interface 1073 and the communication control part 1072 in succession, and sends out the received service session ID information and the like to the authentication processing part 1075.

Thereby, the authentication processing part 1075 performs the user authentication process by comparing the service session ID information and the like received from the client terminal 1002 and the service session ID information and the like already issued to the client terminal 1002 and temporarily stored in the authentication information storage part 1077 at step SP1022 under the control of the control part 1070.

Consequently, the authentication processing part 1075 determines that the acquisition request for the page information for distribution of music data from the client terminal 1002 is valid, if the user using the client terminal 1002 is authenticated as the regular user, because the available period of the service session ID information and the like received from the client terminal 1002 has not yet expired, for example.

Then the control part 1070 goes to the next step SP1025, if the user using the client terminal 1002 is authenticated as the regular user by the authentication processing part 1075.

At step SP1025, the control part 1070 reads the page information for distribution of music data requested to acquire by the user from the page information storage part 1076, and extends the available period of the service session ID information and the like issued to the client terminal 1002 by the authentication processing part 1075.

Then the control part 1070 transmits the page information for distribution of music data read from the page information storage part 1076, together with the service session ID information and the like having the available period extended by the authentication processing part 1075, via the communication control part 1072 and the network interface 1073 in succession to the client terminal 1002.

At step SP1026, the control part 1023 of the client terminal 1002 receives the page information for distribution of music data transmitted from the music data distribution server 1004, and the service session ID information and the like having the available period extended via the network interface 1033 and the communication control part 1032 in succession, and sends out the received page information for distribution of music data to the page information generation part 1036, and the service session ID information and the like received from the music data distribution server 1004 to the authentication processing part 1037.

Thereby, the authentication processing part 1037 temporarily stores the service session ID information and the like having the available period extended that has been received from the music data distribution server 1004 in the authentication information storage part 1038 to overwrite on the service session ID information and the like before the available period is extended under the control of the control part 1023, and thereby updates the service session ID information and the like temporarily stored at step SP1023 with the service session ID information and the like having the available period extended.

Also, the page information generation part 1036 generates the video data based on the page information for distribution of music data, and sends out the generated video data to the display control part 1024.

Thereby, the display control part 1024 performs the digital-analog conversion process for the video data given from the page information generation part 1036, and displays the page for distribution of music data as the video based on the analog video signal on the display part 1025 by sending out the obtained analog video signal to the display part 1025.

(3-7-3) Music Related Service Providing Process

Referring to FIGS. 23 to 26, a music related service providing process will be described below in which the client terminal 1002 receives the music data distribution service, the physical sale service and the radio broadcast information distribution service that is provided, employing the page information for distribution of music data, the page information for sales of package media, or the page information for distribution of on-air list information, and the like, acquired from the music data distribution server 1004, the physical sale server 1005 or the radio broadcast information distribution server 1006 in the user authentication procedure, after the user authentication procedure performed between the client terminal 1002 and the music data distribution server 1004, the physical sale server 1005 or the radio broadcast information distribution server 1006 as described above and shown in FIG. 22.

(3-7-3-1) Music Data Distribution Service Providing Procedure

Figure 23:
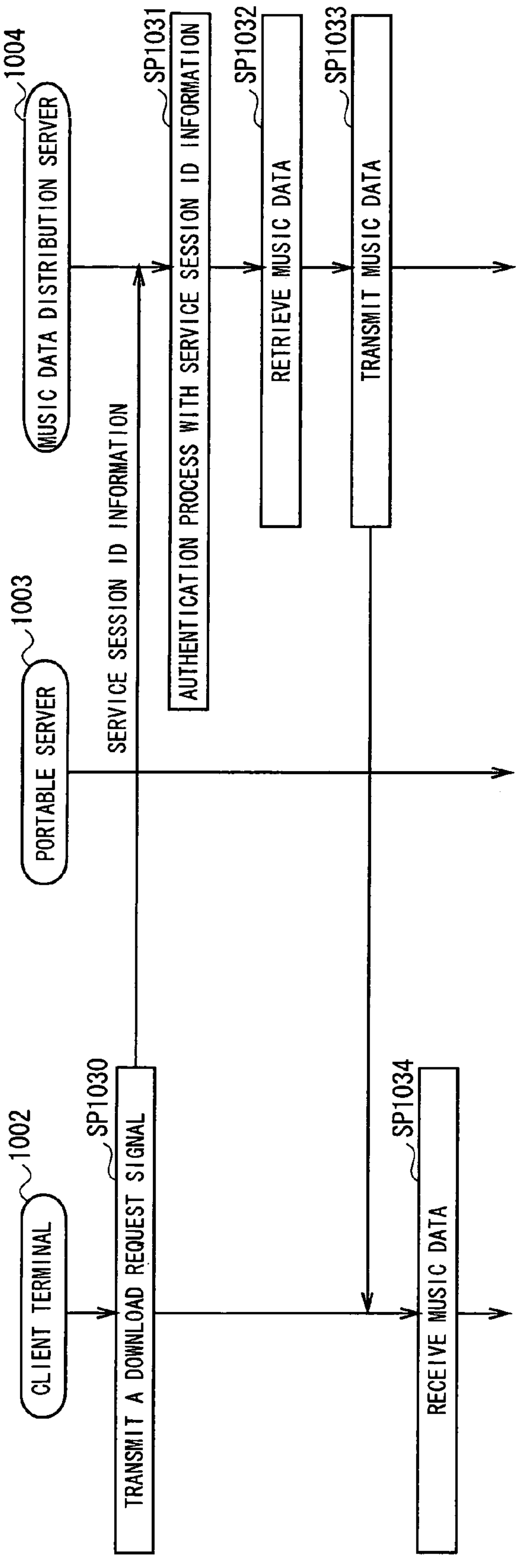
FIG. 23 is a sequence chart showing a music data distribution service providing procedure.

Referring to FIG. 23, a music data distribution service providing procedure when the client terminal 1002 receives a music data distribution service provided from the music data distribution server 1004 will be firstly described.

At step SP1030, if a control command for selecting a part of the page for distribution of music data displayed as the video on the display part 1025 is input from the input processing part 1021, the control part 1023 of the client terminal 1002 generates a download request signal for requesting to download the music data desired to download in accordance with the input control command.

Then the control part 1023 transmits the download request signal, together with the service session ID information and the like already issued from the music data distribution server 1004 and temporarily stored in the authentication information storage part 1038, via the communication control part 1032 and the network interface 1033 in succession to the music data distribution server 1004.

At step SP1031, the control part 1070 of the music data distribution server 1004 receives the download request signal transmitted from the client terminal 1002 and the service session ID information and the like via the network interface 1073 and the communication control part 1072 in succession, and sends out the received service session ID information and the like to the authentication processing part 1075.

Thereby, the authentication processing part 1075 performs the user authentication process by comparing the service session ID information and the like received from the client terminal 1002 and the service session ID information and the like already temporarily stored in the authentication information storage part 1077 under the control of the control part 1070.

Consequently, the control part 1070 goes to step SP1032, if the user using the client terminal 1002 and requesting to download the music data is authenticated as the regular user by the authentication processing part 1075.

At step SP1032, the retrieval part 1079 retrieves the music data desired to download, according to the retrieval conditions indicated by the retrieval key, from among a plurality of music data within the music data storage part 1078, based on the retrieval key stored in the download request signal.

Then the control part 1070 extends the available period of the service session ID information and the like issued to the client terminal 1002 by the authentication processing part 1075, and then goes to the next step SP1033, if the music data is retrieved by the retrieval part 1079.

At step SP1033, the control part 1070 reads the music data desired to download, which has been retrieved by the retrieval part 1079, from the music data storage part 1078, and transmits the read music data desired to download, together with the service session ID information and the like having the available period extended by the authentication processing part 1075, via the communication control part 1072 and the network interface 1073 in succession to the client terminal 1002.

At step SP1034, the control part 1023 of the client terminal 1002 receives the music data desired to download and transmitted from the music data distribution server 1004 and the service session ID information and the like having the available period extended via the network interface 1033 and the communication control part 1032 in succession to store the received music data in the storage medium 1029, and sends out the service session ID information and the like received from the music data distribution server 1004 to the authentication processing part 1037.

The authentication processing part 1037 temporarily stores the service session ID information and the like having the available period extended that has been received from the music data distribution server 1004 in the authentication information storage part 1038 to overwrite on the service session ID information and the like before the available period is extended under the control of the control part 1023, and thereby updates the substance of the service session ID information and the like already temporarily stored in the authentication information storage part 1038.

In this way, the client terminal 1002 can download the music data desired to acquire by the user, employing the music data distribution service provided by the music data distribution server 1004.

(3-7-3-2) Physical Sale Service Providing Procedure

Figure 24:
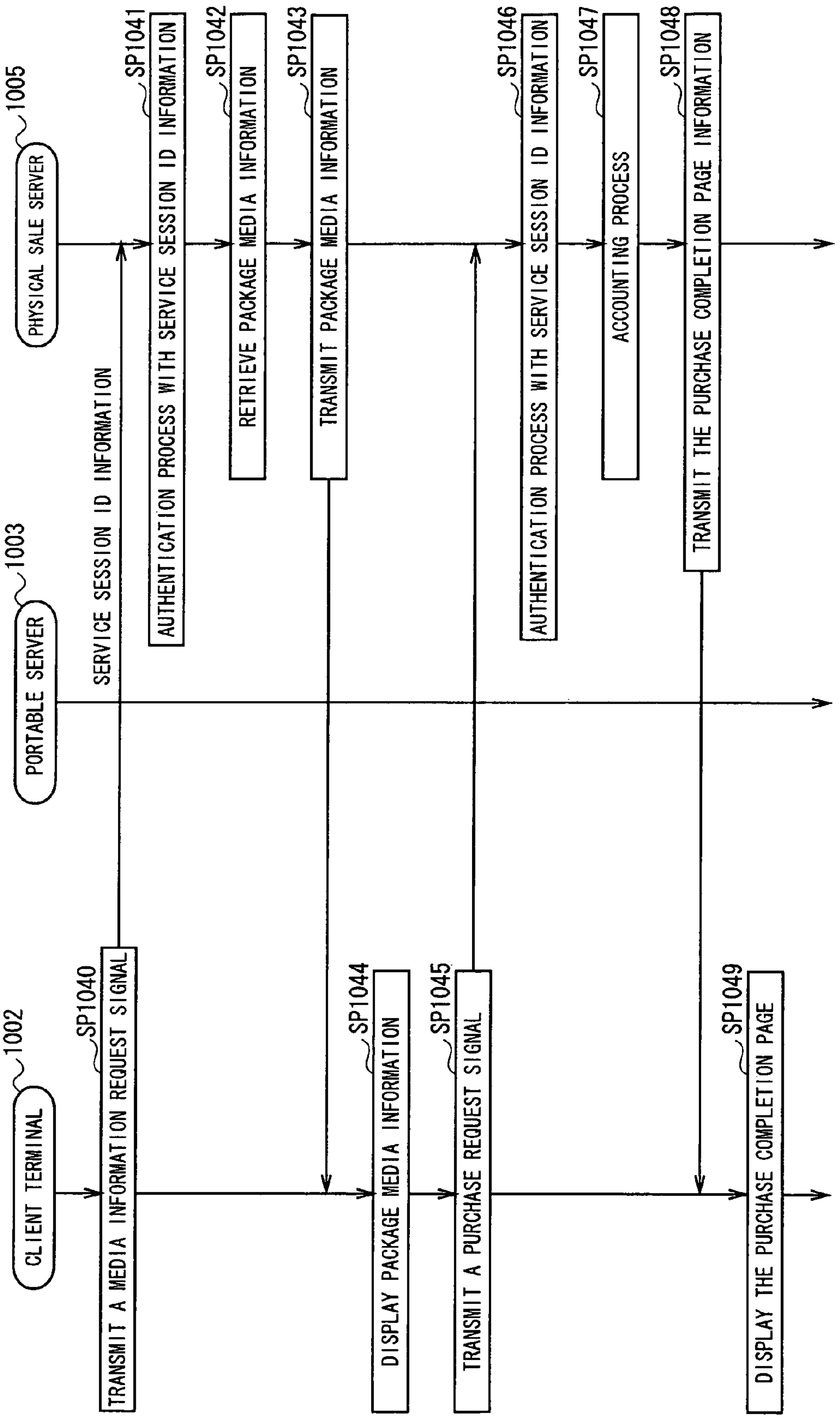
FIG. 24 is a sequence chart showing a physical distribution service providing procedure.

Referring to FIG. 24, a physical sale service providing procedure when the client terminal 1002 receives a physical sale service provided from the physical sale server 1005 will be described below.

At step SP1040, if a control command for selecting a part of the page for sales of package media displayed as the video on the display part 1025 is input from the input processing part 1021, the control part 1023 of the client terminal 1002 generates a media information request signal for requesting the package media information regarding the specific package media in accordance with the input control command.

Then the control part 1023 transmits the media information request signal, together with the service session ID information and the like already issued by the physical sale server 1005 and temporarily stored in the authentication information storage part 1038, via the communication control part 1032 and the network interface 1033 in succession to the physical sale server 1005.

At step SP1041, the control part 1090 of the physical sale server 1005 receives the media information request signal transmitted from the client terminal 1002 and the service session ID information and the like via the network interface 1093 and the communication control part 1092 in succession, and sends out the received service session ID information and the like to the authentication processing part 1095.

The authentication processing part 1095 performs the user authentication process by comparing the service session ID information and the like received from the client terminal 1002 and the service session ID information and the like already temporarily stored in the authentication information storage part 1097 under the control of the control part 1090.

Consequently, the control part 1090 goes to step SP1042, if the user using the client terminal 1002 and requesting the package media information regarding the package media is authenticated as the regular user by the authentication processing part 1095.

At step SP1042, the retrieval part 1099 retrieves the package media information of the specific package media according to the retrieval conditions indicated by the retrieval key from among a plurality of package media information within the package media information storage part 1098, based on the retrieval key stored in the media information request signal.

Then the control part 1090 extends the available period of the service session ID information and the like issued to the client terminal 1002 by the authentication processing part 1095, and then goes to the next step SP1043, if the package media information is retrieved by the retrieval part 1099.

At step SP1043, the control part 1090 reads the package media information retrieved by the retrieval part 1099 from the package media information storage part 1098, and transmits the read package media information, together with the service session ID information and the like having the available period extended by the authentication processing part 1095, via the communication control part 1092 and the network interface 1093 in succession to the client terminal 1002.

At step SP1044, the control part 1023 of the client terminal 1002 receives the package media information transmitted from the physical sale server 1005 and the service session ID information and the like having the available period extended via the network interface 1033 and the communication control part 1032 in succession, and sends out the received package media information to the page information generation part 1036, and the service session ID information and the like received from the physical sale server 1005 to the authentication processing part 1037.

The authentication processing part 1037 temporarily stores the service session ID information and the like having the available period extended that has been received from the physical sale server 1005 in the authentication information storage part 1038 to overwrite on the service session ID information and the like before the available period is extended under the control of the control part 1023, and thereby updates the substance of the service session ID information and the like already temporarily stored in the authentication information storage part 1038.

Also, the page information generation part 1036 generates the video data based on the package media information given from the control part 1023, and converts the generated video data into an analog video signal through the display control part 1024 to send out the analog video signal to the display part 1025.

In this way, the control part 1023 displays the package media information as the video based on the analog video signal on the display part 1025, and then goes to the next step SP1045.

At step SP1045, if a control command for requesting to purchase the package media corresponding to the package media information displayed as the video on the display part 1025 is input from the input processing part 1021, the control part 1023, generates a purchase request signal for requesting to purchase the package media according to the input control command.

And the control part 1023 transmits its purchase request signal, together with the service session ID information and the like (i.e., service session ID information and the like having the available period extended) already received from the physical sale server 1005 and temporarily stored in the authentication information storage part 1038 via the communication control part 1032 and the network interface 1033 in succession to the physical sale server 1005.

At step SP1046, the control part 1090 of the physical sale server 1005 receives the purchase request signal transmitted from the client terminal 1002 and the service session ID information and the like via the network interface 1093 and the communication control part 1092 in succession, and sends out the received service session ID information and the like to the authentication processing part 1095.

The authentication processing part 1095 performs the user authentication process by comparing the service session ID information and the like received from the client terminal 1002 and the service session ID information and the like already temporarily stored in the authentication information storage part 1097.

Consequently, the control part 1090 goes to the next step SP1047, if the user using the client terminal 1002 and requesting to purchase the package media is authenticated as the regular user, by the authentication processing part 1095.

At step SP1047, the control part 1090 performs a purchase processing procedure for delivering the package media requested to purchase and the like to the user using the client terminal 1002, and controls the accounting server 1008 to perform an accounting process for the user to purchase the package media by transmitting the accounting information for accounting operation for the user to purchase the package media via the communication control part 1092 and the network interface 1093 in succession to the accounting server 1008.

Also, the control part 10.90 extends the available period of the service session ID information and the like issued to the client terminal 1002 in the authentication processing part 1095.

At step SP1048, the control part 1090 transmits the purchase completion page information indicating that the purchase process of package media is completed, together with the service session ID information and the like having the available period extended by the authentication processing part 1095, via the communication control part 1092 and the network interface 1093 to the client terminal 1002, after the end of the accounting process.

At step SP1049, the control part 1023 of the client terminal 1002 receives the purchase completion page information transmitted from the physical sale server 1005 and the service session ID information and the like having the available period extended via the network interface 1033 and the communication control part 1032 in succession, and sends out the received purchase completion page information to the page information generation part 1036, and the service session ID information and the like received from the physical sale server 1005 to the authentication processing part 1037.

The authentication processing part 1037 temporarily stores the service session ID information and the like having the available period extended that has been received from the physical sale server 1005 in the authentication information storage part 1038 to overwrite on the service session ID information and the like before the available period is extended under the control of the control part 1023, and thereby updates the substance of the service session ID information and the like temporarily stored in the authentication information storage part 1038.

Also, the page information generation part 1036 generates the video data based on the purchase completion page information given from the control part 1023, converts the generated video data into an analog video signal by the display control part 1024, and sends out it to the display part 1025.

Thereby, the control part 1023 displays the purchase completion page as the video based on the analog video signal on the display part 1025.

In this way, the client terminal 1002 enables the user to purchase the desired package media, employing the physical sale service provided by the physical sale server 1005.

(3-7-3-3) On-Air List Information Distribution Service Providing Procedure

Figure 25:
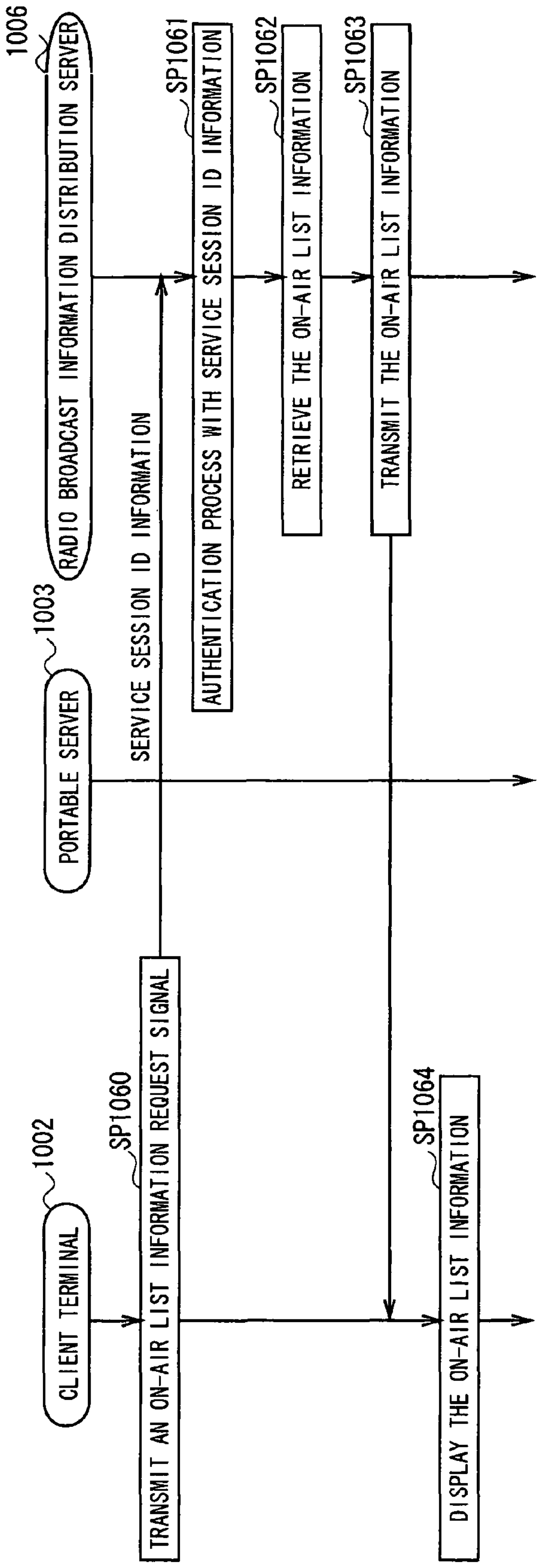
FIG. 25 is a sequence chart showing a radio broadcast information (on-air list information) distribution service providing procedure (1)

Referring to FIG. 25, a radio broadcast information distribution service providing procedure when the client terminal 1002 receives a radio broadcast information distribution service, especially an on-air list information distribution service, provided from the radio broadcast information distribution server 1006 will be described below.

At step SP1060, if a retrieval key for retrieval of on-air list information desired to acquire is input into the input box on the page for distribution of on-air list information displayed as the video on the display part 1025 and a control command corresponding to a character string indicating the input retrieval key is input from the input processing part 1021, the control part 1023 of the client terminal 1002 generates an on-air list information request signal for requesting to download the on-air list information in accordance with the input control command.

Then the control part 1023 transmits the on-air list information request signal, together with the service session ID information and the like already issued from the radio broadcast information distribution server 1006 and temporarily stored in the authentication information storage part 1038, via the communication control part 1032 and the network interface 1033 in succession to the radio broadcast information distribution server 1006.

At step SP1061, the control part 1110 of the radio broadcast information distribution server 1006 receives the on-air list information request signal transmitted from the client terminal 1002 and the service session ID information and the like via the network interface 1113 and the communication control part 1112 in succession, and sends out the received service session ID information and the like to the authentication processing part 1115.

The authentication processing part 1115 performs the user authentication process by comparing the service session ID information and the like received from the client terminal 1002 and the service session ID information and the like already temporarily stored in the authentication information storage part 1120 under the control of the control part 1110.

Consequently, the control part 1110 goes to the next step SP1062, if the user using the client terminal 1002 and requesting the on-air list information is authenticated as the regular user by the authentication processing part 1115.

At step SP1062, the retrieval part 1118 retrieves, as the on-air list information desired to acquire, a predetermined range portion according to the retrieval conditions indicated by the retrieval key of the entire on-air list information within the on-air list information storage part 1117, based on the retrieval key stored in the on-air list information request signal.

Then the control part 1110 extends the available period of the service session ID information and the like issued to the client terminal 1002 by the authentication processing part 1115, and then goes to the next step SP1063, if the on-air list information is retrieved by the retrieval part 1118.

At step SP1063, the control part 1110 reads the on-air list information retrieved by the retrieval part 1118 from the on-air list information storage part 1117, and transmits the read on-air list information, together with the service session ID information and the like having the available period extended by the authentication processing part 1115, via the communication control part 1112 and the network interface 1113 in succession to the client terminal 1002.

At step SP1064, the control part 1023 of the client terminal 1002 receives the on-air list information transmitted from the radio broadcast information distribution server 1006 and the service session ID information and the like having the available period extended via the network interface 1033 and the communication control part 1032 in succession, and sends out the received on-air list information to the page information generation part 1036, and the service session ID information and the like received from the radio broadcast information distribution server 1006 to the authentication processing part 1037.

The authentication processing part 1037 temporarily stores the service session ID information and the like having the available period extended that has been received from the radio broadcast information distribution server 1006 in the authentication information storage part 1038 to overwrite on the service session ID information and the like before the available period is extended under the control of the control part 1023, and thereby updates the substance of the service session ID information and the like already temporarily stored in the authentication information storage part 1038.

Also, the page information generation part 1036 generates the video data based on the on-air list information given from the control part 1023, converts the generated video data into an analog video signal by the display control part 1024, and sends out it to the display part 1025 to display the on-air list information as the video based on the analog video signal on the display part 1025.

In this way, the client terminal 1002 enables the user to acquire the desired on-air list information, employing the radio broadcast information distribution service provided by the radio broadcast information distribution server 1006.

(3-7-3-4) Now-on-Air Information Distribution Service Providing Procedure

Figure 26:
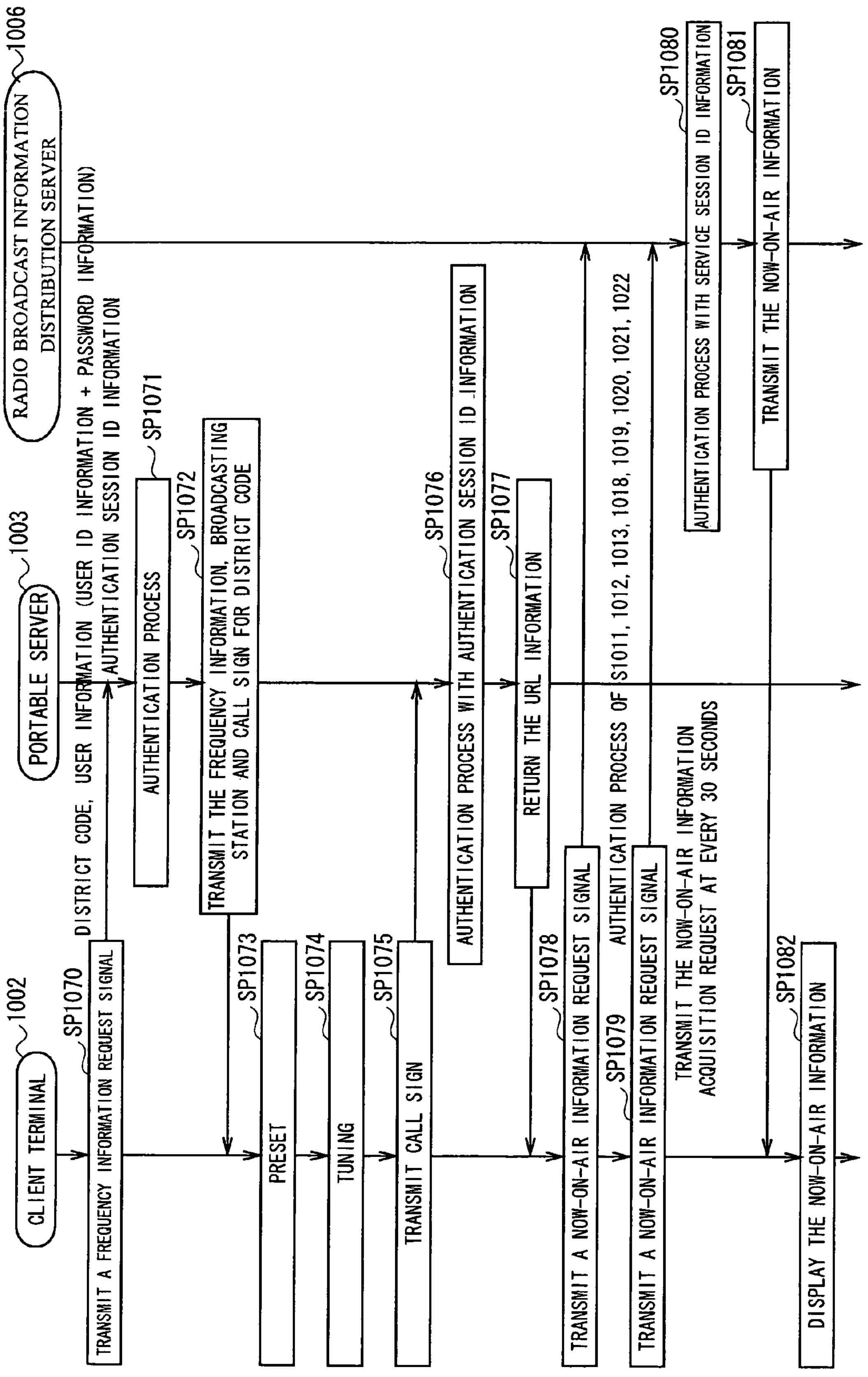
FIG. 26 is a sequence chart showing a radio broadcast information (now-on-air information) distribution service providing procedure (2).

Referring to FIG. 26, a radio broadcast information distribution service providing procedure when the client terminal 1002 receives a radio broadcast information distribution service, especially a now-on-air information distribution service, provided from the radio broadcast information distribution server 1006 will be described below.

The radio broadcast information distribution server 1006 for providing the now-on-air information is provided for every radio station (call sign).

At the client terminal 1002, the URL information of the radio broadcast information distribution server 1006 corresponding to each radio station in the initial state may not be stored in some cases.

Therefore, the following radio broadcast information distribution service providing procedure will be described with an instance where the URL information of each radio broadcast information distribution server 1006 is managed for each call sign of the radio station by the portable server 1003.

Also, in this radio broadcast information distribution service providing procedure, it is supposed that the authentication session ID information and the like is not temporarily stored in the authentication information storage part 1038 when the client terminal 1002 requests the portable server 1003 for the frequency information indicating the broadcast frequency to automatically preset the broadcast frequency for each broadcasting station. Therefore, first of all, the client terminal 1002 transmits the user ID information and password information and the like to the portable server 1003.

At step SP1070, if an operation command for requesting to automatically preset the broadcast frequency of each radio station is input from the input processing part 1021, the control part 1023 of the client terminal 1002 transmits a frequency information request signal for requesting to acquire the frequency information of the receivable broadcast frequency for each radio station, together with a district code input by the user, the user ID information and password information and the like stored in the authentication information storage part 1038, via the communication control part 1032 and the network interface 1033 in succession to the portable server 1003.

At step SP1071, the control part 1050 of the portable server 1003 receives the frequency information request signal, district code, user ID information and password information and the like that have been transmitted from the client terminal 1002 via the network interface 1053 and the communication control part 1052 in succession, and sends out the user ID information and password information and the like received from the client terminal 1002 to the authentication processing part 1056.

The authentication processing part 1056 performs the user authentication process by comparing the user ID information and password information and the like received from the client terminal 1002 and the customer information registered in the customer database part 1054 under the control of the control part 1050.

Consequently, the authentication processing part 1056 issues the authentication session ID information and the like for the communication connection state between the client terminal 1002 and the portable server 1003 at the present time and temporarily stores the issued authentication session ID information and the like in the authentication information storage part 1057 under the control of the control part 1050, if the user using the client terminal 1002 is authenticated as the regular user, and the acquisition request for frequency information from the client terminal 1002 is determined to be valid.

Then the control part 1050 goes to the next step SP1072, if the user is authenticated as the regular user by the authentication processing part 1056.

At step SP1072, the control part 1050 retrieves the frequency information, radio station name and call sign corresponding to the district code from among a list of a plurality of frequency information, radio station names and call signs within the frequency information storage part 1058, based on the district code received from the client terminal 1002, and reads them in the list.

Thereby, the control part 1050 transmits the frequency information, radio station name and call sign read in the list from the frequency information storage part 1058, together with the authentication session ID information and the like issued to the client terminal 1002 by the authentication processing part 1056 at step SP1071, via the communication control part 1052 and the network interface 1053 in succession to the client terminal 1002.

At step SP1073, the control part 1023 of the client terminal 1002 receives the list of frequency information, radio station name and call sign transmitted from the portable server 1003 and the authentication session ID information and the like via the network interface 1033 and the communication control part 1032 in succession, and sends out the authentication session ID information and the like received from the portable server 1003 to the authentication processing part 1037, and the list of frequency information, radio station name and call sign to the display control part 1024.

Thereby, the authentication processing part 1037 temporarily stores the authentication session ID information and the like received from the portable server 1003 in the authentication information storage part 1038 under the control of the control part 1023.

Also, the display control part 1024 sends out the list of frequency information, radio station name and call sign given from the control part 1023 to the display part 1025 and displays the list on the display part 1025.

Moreover, the control part 1023 stores the selected frequency information, radio station name and call signal as preset in the storage medium 1029, based on a selection command inputted from the input processing part 1021 at this time, and goes to the next step SP1074.

At step SP1074, the control part 1023 controls the tuner part 1031 to extract the radio broadcast signal of radio program broadcast at the broadcast frequency corresponding to a tuning control command from the radio broadcast wave in response to the tuning control command inputted from the input processing part 1021.

Thereby, the tuner part 1031 extracts the radio broadcast signal broadcast at the broadcast frequency from the radio broadcast wave received by the broadcast signal receiving part 30, and sends out the resulted audio data to the audio control part 1026.

Accordingly, the audio control part 1026 converts the audio data given from the tuner part 1031 into an analog audio signal and sends out it to the speaker 1027 to output the audio of the selected radio program.

At step SP1075, the radio broadcast display control part 1039 reads the call sign stored in relation with the frequency information indicating the broadcast frequency corresponding to the tuning control command, and transmits the read call sign, together with the authentication session ID information and the like temporarily stored in the authentication information storage part 1038, via the communication control part 1032 and the network interface 1033 in succession to the portable server 1003, under the control of the control part 1023.

At step SP1076, the control part 1050 of the portable server 1003 receives the call sign and the authentication session ID information and the like transmitted from the client terminal 1002 via the network interface 1053 and the communication control part 1052 in succession, and sends out the received authentication session ID information and the like to the authentication processing part 1056.

The authentication processing part 1056 performs the user authentication process by comparing the authentication session ID information and the like received from the client terminal 1002 and the authentication session ID information and the like already temporarily stored in the authentication information storage part 1057 under the control of the control part 1050.

Consequently, the control part 1050 goes to the next step SP1077, if the authentication session ID information and the like received from the client terminal 1002 is within the available period, and the user using the client terminal 1002 and transmitting the call sign is authenticated as the regular user by the authentication processing part 1056.

At step SP1077, the control part 1050 retrieves the URL information associated with the call sign from among a plurality of pieces of URL information within the URL storage part 1059, based on the call sign received from the client terminal 1002.

Also, the control part 1050 controls the authentication processing part 1056 to extend the available period of the authentication session ID information and the like issued to the client terminal 1002.

Then the control part 1050 reads the retrieved URL information from the URL storage part 1059, and transmits the read URL information, together with the authentication session ID information and the like having the available period extended by the authentication processing part 1056, via the communication control part 1052 and the network interface 1053 in succession to the client terminal 1002.

At step SP1078, the control part 1023 of the client terminal 1002 receives the URL information transmitted from the portable server 1003 and the authentication session ID information and the like having the available period extended via the network interface 1033 and the communication control part 1032 in succession, and sends out the received authentication session ID information and the like to the authentication processing part 1037 and the URL information to the radio broadcast display control part 1039.

The authentication processing part 1037 temporarily stores the authentication session ID information and the like having the available period extended that has been received from the portable server 1003 in the authentication information storage part 1038 to overwrite on the authentication session ID information and the like before the available period is extended under the control of the control part 1023, and thereby updates the substance of the authentication session ID information and the like already temporarily stored in the authentication information storage part 1038.

Also, the radio broadcast display control part 1039 temporarily stores the URL information given from the control part 1023 in the storage medium 1029 to be associated with the call sign stored in the storage medium 1029 or the like under the control of the control part 1023.

Then the radio broadcast display control part 1039 transmits a now-on-air information request signal requesting to acquire the now-on-air information, together with the service session ID information and the like already received from the radio broadcast information distribution server 1006 and temporarily stored in the authentication information storage part 1038, in accordance with the URL information temporarily stored in the storage medium 1029 or the like, via the communication control part 1032 and the network interface 1033 in succession to the radio broadcast information distribution server 1006 under the control of the control part 1023.

In this radio broadcast information distribution service providing procedure, the processing at step SP1078 for transmitting the now-on-air information request signal and the service session ID information and the like from the client terminal 1002 to the radio broadcast information distribution server 1006 corresponds to the processing at step SP1010 as described above and shown in FIG. 22.

Accordingly, this radio broadcast information distribution service providing procedure, following the processing at step SP1078, performs the user authentication process at the client terminal 1002 and in the radio broadcast information distribution server 1006 and the portable server 1003 in the same way as at steps SP1011 to SP1013, step SP1018 and step SP1022 as described above and shown in FIG. 22, and then goes to step SP1079.

At step SP1079, the radio broadcast display control part 1039 of the client terminal 1002 transmits and the like the now-on-air information request signal, together with the service session ID information and the like already received from the radio broadcast information distribution server 1006 and temporarily stored in the authentication information storage part 1038, via the communication control part 1032 and the network interface 1033 in succession to the radio broadcast information distribution server 1006 in accordance with the URL information temporarily stored in the storage medium 1029 or the like under the control of the control part 1023.

At step SP1080, the control part 1110 of the radio broadcast information distribution server 1006 receives the now-on-air information request signal transmitted from the client terminal 1002 and the service session ID information and the like via the network interface 1113 and the communication control part 1112 in succession, and sends out the received authentication session ID information and the like to the authentication processing part 1115.

Thereby, the authentication processing part 1115 performs the user authentication process by comparing the service session ID information and the like received from the client terminal 1002 and the service session ID information and the like already temporarily stored in the authentication information storage part 1120 under the control of the control part 1110.

Consequently, the authentication processing part 1115 determines that the acquisition request for the now-on-air information from the client terminal 1002 is valid, if the user using the client terminal 1002 is authenticated as the regular user.

Then if the user using the client terminal 1002 is authenticated as the regular user by the authentication processing part 1115, the control part 1110 control the authentication processing part 1115 to extend the available period of the service session ID information and the like issued to the client terminal 1002, and then goes to the next step SP1081.

At step SP1081, the control part 1110 reads the now-on-air information from the now-on-air information storage part 1119, and transmits the read now-on-air information, together with the service session ID information having the available period extended by the authentication processing part 1115, via the communication control part 1112 and the network interface 1113 in succession to the client terminal 1002.

At step SP1082, the control part 1023 of the client terminal 1002 receives the now-on-air information transmitted from the radio broadcast information distribution server 1006 and the service session ID information and the like having the available period extended via the network interface 1033 and the communication control part 1032 in succession and sends out the received service session ID information and the like to the authentication processing part 1037 and the now-on-air information to the radio broadcast display control part 1039.

Thereby, the authentication processing part 1037 temporarily stores the service session ID information and the like having the available period extended that has been received from the radio broadcast information distribution server 1006 in the authentication information storage part 1038 to overwrite on the service session ID information and the like before the available period is extended under the control of the control part 1023, and thereby updates the substance of the service session ID information and the like already temporarily stored in the authentication information storage part 1038.

Also, the radio broadcast display control part 1039 sends out the now-on-air information given from the control part 1023 via the display control part 1024 to the display part 1025, and displays the now-on-air information regarding the radio program of radio broadcasting being currently received on the display part 1025.

Then in this radio broadcast information distribution service providing procedure, thereafter, the client terminal 1002 makes periodically and repeatedly the acquisition request for now-on-air information at step SP1079, and the radio broadcast information distribution server 1006 receives the acquisition request from the client terminal 1002 to perform the processings of step SP1080 and step SP1081 sequentially.

Thereby, at the client terminal 1002, the program name, program broadcasting start time and program broadcasting end time of radio program being currently received, and the title, artist name, and musical composition broadcasting start time of musical composition being currently on the air within the radio program, and the like can be displayed as the now-on-air information on the display part 1025 of the client terminal 1002 while being updated from one minute to the next.

In this embodiment, the sequence chart as shown in FIG. 25 corresponds to the service for providing the program list, or on-air list, which is performed by the broadcasting station server 32 in the first embodiment.

Also, the sequence chart from the steps SP1078 to SP1082 as described above and shown in FIG. 26 corresponds to the matters of description in the claims.

With the above configuration, the music related service providing system 1000 precisely authenticates the user registered to accept the music related services provided by the music related system 1000, and enables the client terminal 2 of the user to acquire the relevant information (now-on-air information or on-air list information) related with the contents of the musical composition and the like included in the broadcast information of radio broadcasting or the like.

Accordingly, this music related service providing system 1000 securely can prevent the third party from acquiring the relevant information for illegal use.

In the second embodiment, the client terminal 1002 as described above and shown in FIG. 15 corresponds to the terminal unit 1 of the invention and the terminal unit 10 of the first embodiment. The portable server 1003 as described above and shown in FIG. 17 corresponds to the total service server 36 of the first embodiment. Furthermore, the radio broadcast information distribution server 1006 as described above and shown in FIG. 20 corresponds to the broadcasting station server 32 of the first embodiment.

In addition, the music data distribution server 1004 as described above and shown in FIG. 18 corresponds to the music distribution server 33 of the first embodiment. Also, the physical sale server 1005 as described above and shown in FIG. 19 corresponds to the CD shop server 34 of the first embodiment.

By the way, in the program module of the terminal unit 10 as described above and shown in FIG. 6, the HTTP message program 111 and the communicator program 112 can implement the same functions of the communication control part 1032 at the client terminal 1002 as described above and shown in FIG. 15.

Also, the contents reproduction module 113 can implement the same functions of the encoder/decoder part 1034 at the client terminal 1002 as described above and shown in FIG. 15.

Moreover, the copyright protection information management module 114 can implement the same functions of the copyright management part 1035 at the client terminal 1002 as described above and shown in FIG. 15.

Moreover, the internet radio tuning reproduction module 118 can implement the same functions of the control part 1023 and the audio control part 1026 at the client terminal 1002 as described above and shown in FIG. 15.

Moreover, the musical composition purchase reproduction module 119 can implement the same functions of the control part 1023 and the audio control part 1026 at the client terminal 1002 as described above and shown in FIG. 15.

Moreover, the XML browser 151 can implement the same functions of the input processing part 1021 and the page information generation part 1036 at the client terminal 1002 as described above and shown in FIG. 15.

Moreover, the hardware contents controller 117, the database access module 115 and the contents data access module 116 can implement the same functions of the control part 1023 at the client terminal 1002 as described above and shown in FIG. 15.

Moreover, the authentication library 131 of the library 130 can implement the same functions of the authentication processing part 1037 and the authentication information storage part 1038 at the client terminal 1002 as described above and shown in FIG. 15.

Moreover, the clip library 132 of the library 130 can implement the same functions of the control part 1023 at the client terminal 1002 as described above and shown in FIG. 15.

Moreover, the related-information display module 120 can implement the same functions of the radio broadcast display control part 1039 at the client terminal 1002 as described above and shown in FIG. 15.

Moreover, the tuner tuning reproducing/recording module 121 can implement the same functions of the control part 1023, the audio control part 1026 and the tuner part 1031 at the client terminal 1002 as described above and shown in FIG. 15.

Moreover, the audio user interface 152 can implement the same functions of the input processing part 1021, the control part 1023 and the display control part 1024 at the client terminal 1002 as described above and shown in FIG. 15.

Moreover, the CD reproduction module 141 can implement the same functions of the audio control part 1026 and the external recording medium recording/reproducing part 1028 at the client terminal 1002 as described above and shown in FIG. 15.

Moreover, the HDD reproduction module 142 can implement the same functions of the control part 1023 and the audio control part 1026 at the client terminal 1002 as described above and shown in FIG. 15.

Accordingly, the CPU 11 for the terminal unit 10 having the hardware configuration with the hardware circuit blocks as described above and shown in FIG. 5 is able to perform the same processes under various program modules as for the client terminal 1002 having the hardware configuration with the functional circuit blocks as described above and shown in FIG. 15.

And the client terminal 1002 is able to produce the same effect as obtained in the first embodiment, because each functional block covers the function that can be implemented by the program module of the terminal unit 10.

Though in the above embodiment, the client terminal 1002 can receive the radio broadcasting from the radio station, the client terminal 1002 may receive the internet radio broadcasting or satellite radio broadcasting to acquire the relevant information and the radio broadcast information, or receive the television broadcasting from the television broadcasting station to acquire various kinds of broadcast information related with the television program of the television broadcasting from the server on the network NT 1000.

Moreover, though in the above embodiment, the display device of the invention is applied to the terminal unit 10 and the client terminal 1002, the display device of the invention may be applied to the information processing apparatus, such as personal computer, portable telephone, PDA (Personal Digital Assistance) and game machine, television receiver, radio broadcasting receiver, DVD (Digital Versatile Disc) recorder, hard disk recorder and others.

That is, though in the above embodiment, the hardware circuit blocks, the functional circuit blocks and the program modules are packaged on the terminal unit 10 or the client terminal 1002, they may be packaged on various terminals such as the portable telephone and personal computer other than the terminal unit 10 and the client terminal 1002, whereby the terminals on which the hardware circuit blocks, the functional circuit blocks and the program modules are packaged implement the same processings as the terminal unit 10 and the client terminal 1002.

Moreover, though in the above embodiment, the display control program of the invention is applied to the program module as described above and shown in FIG. 6, it may be applied to various other display control programs.

Moreover, though in the above embodiment, the on-air list is applied as the information regarding the broadcast contents acquired through the communication line, the invention may be widely applied to various other information such as now-on-air and television broadcasting electronic program guide.

Moreover, though in the above embodiment, the communication processing part 22 and the network interface 23 of the terminal unit 10 or the communication control part 1032 of the client terminal 1002 as described in FIGS. 1 to 26 are applied as the transmitting means for transmitting the retrieval key for specifying a part of the list information from the list information of the broadcast contents, the invention may be applied to various other transmitting means according to the communication method for use with the display device.

Moreover, though in the above embodiment, the communication processing part 22 and the network interface 23 of the terminal unit 10 or the communication control part 1032 of the client terminal 1002 as described in FIGS. 1 to 26 are applied as the receiving means for receiving at least a part of the list information according to the retrieval key, the invention may be applied to various other receiving means according to the communication method for use with the display device.

Moreover, though in the above embodiment, the display processing part 16 and the display 17 of the terminal unit 10 or the display control part 1024 and the display part 1025 of the client terminal 1002 as described in FIGS. 1 to 26 are applied as the display means for displaying a part of the list information received by the receiving means and the directive items for requesting to display the list information corresponding to the programs broadcast before and after the part of the list information, the invention may be widely applied to various other display means such as cathode ray tube and the control part for displaying the information.

Moreover, though in the above embodiment, the operation input part 15 and the remote controller 40 of the terminal unit 10 or the operation input part 1020 of the client terminal 1002 as described in FIGS. 1 to 26 are applied as the selection means for selecting the display information on the display means, the invention may be widely applied to various other selection means such as a touch pad.

Moreover, though in the above embodiment, the CPU 11 and the hard disk drive 21 of the terminal unit 10 or the control part 1023 and the storage medium 1029 of the client terminal 1002 as described in FIGS. 1 to 26 are applied as the temporary storage means for temporarily storing the information received by the receiving means, the invention may be widely applied to various other temporary storage means for temporarily storing the relevant information of the contents, such as an optical magnetic disk and a semiconductor memory.

Moreover, though in the above embodiment, the operation input part 15 and the remote controller 40 of the terminal unit 10 or the operation input part 1020 of the client terminal 1002 as described in FIGS. 1 to 26 are applied as the selection means for selecting the display information on the display means, the invention may be widely applied to various other selection means such as a touch pad.

Moreover, though in the above embodiment, the tuner 27 of the terminal unit 10 or the tuner part 1031 of the client terminal 1002 as described in FIGS. 1 to 26 are applied as the broadcast receiving means for receiving the broadcast contents, the invention may be widely applied to various other broadcast receiving means such as a receiving circuit capable of receiving the television broadcast or internet radio broadcast.

Moreover, though in the above embodiment, the display processing part 16 and the display 17 of the terminal unit 10 or the display control part 1024 and the display part 1025 of the client terminal 1002 as described in FIGS. 1 to 26 are applied as the broadcast output means for outputting the broadcast contents received by the broadcast receiving means, the invention may be widely applied to various other broadcast outputting means such as a cathode ray tube.

Moreover, though in the above embodiment, the total service server 36 and the portable server 1003 as described in FIGS. 1 to 26 are applied as the authentication server having the authentication function, the invention may be widely applied to various other authentication servers such as a server having the authentication function alone.

Moreover, though in the above embodiment, the broadcasting station server 32 and the radio broadcast information distribution server 1006 as described in FIGS. 1 to 26 are applied as the list information providing server for providing the list information, the invention may be widely applied to various other list information providing servers such as the CD title information providing server 31 and the server operated by the television broadcasting station, as far as the list information can be provided.

Moreover, though in the above embodiment, the shop code as described in FIGS. 1 to 26 is applied as the service identification information for identifying the list information providing server that transmits data to the terminal unit, together with the information indicating the authentication error from the list information providing server, the invention may be widely applied to various other service identification information, as far as the list information providing server can be identified.

INDUSTRIAL APPLICABILITY

This invention is applicable to the display device for the personal computer, the portable telephone and the like.

DESCRIPTION OF REFERENCE NUMERALS

1, 10 . . . TERMINAL UNITS, 1A . . . DISPLAY PART, 1B . . . SELECTION PART, 1C . . . TUNER, 14 . . . SCREEN, 2 . . . INFORMATION SERVER, 2A . . . DATABASE, 2B . . . RETRIERVAL ENGINE, 3, NT1000 . . . NETWORKS, 11 . . . CPU, 16 . . . DISPLAY PROCESSING PART, 17 . . . DISPLAY, 21 . . . HARD DISK DRIVE, 22. . . COMMUNICATION PROCESSING PART, 23 . . . NETWORK INTERFACE, 27 . . . TUNER, 31 . . . CD TITLE INFORMATION PROVIDING SERVER, 32 . . . BROADCASTING STATION SERVER, 36 . . . TOTAL SERVICE SERVER, 1002 . . . CLIENT TERMINAL, 1003 . . . PORTABLE SERVER, 1006 . . . RADIO BROADCAST INFORMATION DISTRIBUTION SERVER, 1023 . . . CONTROL PART, 1024 . . . DISPLAY CONTROL PART, 1025 . . . DISPLAY PART, 1031 . . . TUNER PART, 1032 . . . COMMUNICATION CONTROL PART, 1029 . . . STORAGE MEDIUM

The invention claimed is:

1. A display device for displaying information related to broadcast contents acquired through a communication line, comprising:

a transmitter configured to transmit a retrieval key to a list information providing server, the retrieval key including a target input time or a designated time zone;

a receiver configured to receive list information according to said retrieval key from the list information providing server;

a display configured to display the list information received by said receiver from the list information providing server, the list information including a first and a second directive item; and a selector configured to select a display type mode for the list information of the broadcast contents, the display type mode being a program list display mode or a time zone list display mode, so that the retrieval key includes the target input time or the designated time zone, and for selecting the first or the second directive item on the display, wherein said transmitter is configured to transmit the retrieval key to retrieve the list information corresponding to the first and the second directive item that correspond to a program scheduled to broadcast before and after the target input time, respectively, or a program scheduled to broadcast in a time zone before and after said designated time zone, respectively, and the first directive item being a user-selectable item for requesting display of list information of broadcast contents scheduled to broadcast before the target input time, or broadcast contents scheduled to broadcast before said designated time zone, and the second directive item being a user-selectable item for requesting display of list information of broadcast contents scheduled to broadcast after the target input time, or broadcast contents scheduled to broadcast after said designated time zone, wherein if the first or second directive item is selected by the selector, the transmitter transmits a second retrieval key to the list information providing server including a target time or a designated time zone according to the selected first or second directive item.

2. The display device according to claim 1, wherein said receiver is configured to receive the list information of a musical composition broadcast within a program on the designated time zone, as a result of retrieval, and said display is configured to display the list information of said musical composition received by said receiver.

3. The display device according to claim 1, wherein said receiver is configured to receive the list information of a program broadcast in the designated time zone as a result of retrieval, and said display is configured to display the list information of said program received by said receiver.

4. The display device according to claim 1, further comprising:

a broadcast receiver configured to receive said broadcast contents; and a broadcast output unit configured to output said broadcast contents received by said broadcast receiver.

5. The display device according to claim 1, wherein the broadcast contents are radio broadcast contents.

6. The display device according to claim 1, further comprising:

a unit configured to clip relevant information of the broadcast contents according to a user's preference; and a clip information storage device configured to store the clipped relevant information as clip information, wherein the display displays the broadcast contents information of the content being reproduced concurrently with the clip information of the broadcast contents.

7. The display device according to claim 1, wherein the clipped relevant information includes at least one of a name of the broadcast contents, an artist name of the broadcast contents, an album name of the broadcast contents, and an identification number ID of the album.

8. A display method for displaying the information related to broadcast contents acquired through a communication line on a display, comprising:

selecting a display type mode for list information of the broadcast contents, the display type mode being a program list display mode or a time zone list display mode;

transmitting a retrieval key to a list information providing server, the retrieval key including a target input time or a designated time zone, based on said selected display type mode;

receiving the list information according to said retrieval key from said list information providing server;

displaying the list information received from said list information providing server, the list information including a first and a second directive item; and selecting the first or the second directive item on the display, wherein said step of transmitting further transmits a second retrieval key to retrieve list information corresponding to the selected first or second directive item that correspond to a program scheduled to broadcast before and after the target input time, respectively, or a program scheduled to broadcast in a time zone before and after said designated time zone, respectively, the second retrieval key includes a target time or designated time zone according to the selected first or second directive item, the first directive item being a user-selectable item for requesting display of list information of broadcast contents scheduled to broadcast before the target input time, or broadcast contents scheduled to broadcast before said designated time zone, and the second directive item being a user-selectable item for requesting display of list information of broadcast contents scheduled to broadcast after the target input time, or broadcast contents scheduled to broadcast after said designated time zone.

9. The display method according to claim 8, wherein, at a terminal unit communicably linked with an authentication server having an authentication function and the list information providing server for providing the list information and for displaying information concerning said broadcast contents, said step of transmitting said retrieval key further comprises:

transmitting said retrieval key, together with a service session ID defining a session ID between said terminal unit and said list information providing server, to said list information providing server;

receiving information indicating an authentication error and service identification information identifying said list information providing server from said list information providing server;

transmitting an authentication ticket issuance request for an authentication ticket for gaining access to said list information providing server, together with an authentication session ID defining a session ID between said terminal unit and said authentication server, to said authentication server;

receiving said authentication ticket issued by said authentication server, and transmitting the authentication request information, together with said authentication ticket, to said list information providing server, when authentication is performed by said authentication server;

receiving a service session ID defining a session ID between said terminal unit and said list information providing server, when the user is authenticated by said list information providing server;

transmitting said retrieval key, together with said service session ID received, to said list information providing server; and receiving said list information according to said retrieval key, when authentication is performed by said list information providing server.

10. The display method according to claim 9, wherein said step of transmitting said retrieval key transmitting further comprises:

receiving information indicating an authentication error and transmitting a user ID and a password to said authentication server;

receiving an authentication session ID defining a session ID between said terminal unit and said authentication server, when authentication for said user ID and said password by said authentication server is performed; and transmitting said authentication ticket issuance request information, together with said authentication session ID, to said authentication server.

11. The display method according to claim 8, further comprising:

transmitting the request information requesting the relevant information of said broadcast contents being received at regular intervals;

receiving said relevant information according to said request information; and displaying said received relevant information on said display.

12. The display method according to claim 8, wherein the broadcast contents are radio broadcast contents.

13. The display method according to claim 8, further comprising:

acquiring relevant information regarding the broadcast contents already broadcast or scheduled to broadcast by gaining access to a broadcasting station server corresponding to the broadcasting station broadcasting the broadcast contents during reception, at a regular interval;

clipping the relevant information as clip information according to a user's preference; and displaying the broadcast contents information of the content being reproduced concurrently with the clip information of the broadcast contents.

14. A non-transitory computer readable storage medium encoded with a computer readable program configured to cause an information processing apparatus to execute a method for displaying information related to broadcast content, the method comprising:

selecting a display type mode for list information of the broadcast contents, the display type mode being a program list display mode or a time zone list display mode;

transmitting a retrieval key to a list information providing server, the retrieval key including a target input time or a designated time zone, based on said selected display type mode;

receiving list information according to said retrieval key from said list information providing server;

displaying the list information received from said list information providing server, the list information including a first and a second directive item; and selecting the first or the second directive item on the display, wherein said step of transmitting further transmits a second retrieval key to retrieve list information corresponding to the selected first or second directive item that correspond to a program scheduled to broadcast before and after the target input time, respectively, or a program scheduled to broadcast in a time zone before and after said designated time zone, respectively, the second retrieval key includes a target time or designated time zone according to the selected first or second directive item, the first directive item being a user-selectable item for requesting display of list information of broadcast contents scheduled to broadcast before the target input time, or broadcast contents scheduled to broadcast before said designated time zone, and the second directive item being a user-selectable item for requesting display of list information of broadcast contents scheduled to broadcast after the target input time, or broadcast contents scheduled to broadcast after said designated time zone.

15. A display device for displaying list information related to broadcast contents acquired through a communication line, comprising:

a first selector configured to select a display type mode for the list information of the broadcast contents, the display type mode being a program list display mode or a time zone list display mode;

a transmitter configured to transmit a retrieval key to a list information providing server, the retrieval key including a target input time or a designated time zone, depending on the selected display type mode;

a receiver configured to receive list information according to said retrieval key from the list information providing server;

a display configured to display the list information received by said receiver from the list information providing server, the list information including a first and a second directive item; a temporary storage unit for temporarily storing the list information received by said receiver; and a second selector configured to select the first or the second directive item on the display, the first directive item being a user-selectable item for requesting display of list information of broadcast contents scheduled to broadcast before the target input time, or broadcast contents scheduled to broadcast before said designated time zone, and the second directive item being a user-selectable item for requesting display of list information of broadcast contents scheduled to broadcast after the target input time, or broadcast contents scheduled to broadcast after said designated time zone, wherein if the first or second directive item is selected by the selector, the transmitter transmits a second retrieval key to the list information providing server including a target time or a designated time zone according to the selected first or second directive item.

16. A display device for displaying list information related to broadcast contents acquired through a communication line, comprising:

first selector means for selecting a display type mode for the list information of the broadcast contents, the display type mode being a program list display mode or a time zone list display mode;

transmission means for transmitting a retrieval key to a list information providing server, the retrieval key including a target input time or a designated time zone, depending on the selected display type mode;

receiving means for receiving list information according to said retrieval key from the list information providing server;

storage means for temporarily storing the list information received by said receiving means;

display means for displaying the list information received by said receiving means from the list information providing server, the list information including a first and a second directive item; and second selector means for selecting the first or the second directive item on the display means, wherein the first directive item being a user-selectable item for requesting display of list information of broadcast contents scheduled to broadcast before the target input time, or broadcast contents scheduled to broadcast before said designated time zone, the second directive item being a user-selectable item for requesting display of list information of broadcast contents scheduled to broadcast after the target input time, or broadcast contents scheduled to broadcast after said designated time zone, and if the first or second directive item is selected by the selector, the transmission means transmits a second retrieval key to the list information providing server including a target time or a designated time zone according to the selected first or second directive item.

17. An audio apparatus, comprising:

a tuner configured to receive a broadcast;

an audio output processing part configured to reproduce the broadcast received by the tuner; and the display device according to claim 1.

* * * * *